United States Patent
Chu et al.

(10) Patent No.: US 9,629,127 B2
(45) Date of Patent: Apr. 18, 2017

(54) MULTIPLE USER ALLOCATION SIGNALING IN A WIRELESS COMMUNICATION NETWORK

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US); Lei Wang, San Diego, CA (US); Yakun Sun, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/702,480

(22) Filed: May 1, 2015

(65) Prior Publication Data

US 2015/0319747 A1 Nov. 5, 2015

Related U.S. Application Data

(60) Provisional application No. 61/987,751, filed on May 2, 2014.

(51) Int. Cl.
*H04W 72/04* (2009.01)
*H04W 56/00* (2009.01)
(Continued)

(52) U.S. Cl.
CPC ....... *H04W 72/0406* (2013.01); *H04L 5/0007* (2013.01); *H04L 5/0023* (2013.01);
(Continued)

(58) Field of Classification Search
None
See application file for complete search history.

(56) References Cited

U.S. PATENT DOCUMENTS

| 5,933,787 A | 8/1999 | Gilhousen et al. |
| 6,175,743 B1 | 1/2001 | Alperovich et al. |

(Continued)

FOREIGN PATENT DOCUMENTS

| EP | 907263 A2 | 4/1999 |
| EP | 1168877 | 1/2002 |

(Continued)

OTHER PUBLICATIONS

Liu, Yong, "VHT BSS Channel Selection," Mar. 11, 2011, IEEE, all pages.*

(Continued)

*Primary Examiner* — Kwang B Yao
*Assistant Examiner* — Adam Duda

(57) ABSTRACT

A respective primary sub-channel block is statically allocated to each of the two or more communication devices in an orthogonal frequency division multiple access (OFDMA) group of communication devices. The respective statically allocated primary sub-channel blocks remain allocated to the second communication devices for transmission of at least two PHY data units. At least some of remaining sub-channel blocks are dynamically allocated among the two or more communication devices for transmission of each of the at least two PHY data units. Indications of the respective sub-channel blocks allocated to the two or more communication devices. A physical layer (PHY) data unit is transmitted to the two or more communication devices or is received from the two or more communication devices. The PHY data unit includes respective orthogonal frequency division multiplexing (OFDM) data units transmitted using respective sub-channel blocks allocated to the two or more communication devices.

26 Claims, 25 Drawing Sheets

(51) Int. Cl.
*H04L 5/00* (2006.01)
*H04L 27/26* (2006.01)
*H04W 84/12* (2009.01)

(52) U.S. Cl.
CPC .......... *H04L 5/0039* (2013.01); *H04L 5/0094* (2013.01); *H04L 27/2602* (2013.01); *H04W 56/00* (2013.01); *H04L 5/0078* (2013.01); *H04L 5/0089* (2013.01); *H04W 84/12* (2013.01)

(56) References Cited

U.S. PATENT DOCUMENTS

| | | |
|---|---|---|
| 6,377,813 B1 | 4/2002 | Kansakoski et al. |
| 6,519,229 B1 | 2/2003 | Arai et al. |
| 6,862,440 B2 | 3/2005 | Sampath |
| 6,947,388 B1 | 9/2005 | Wagner |
| 7,206,354 B2 | 4/2007 | Wallace et al. |
| 7,430,168 B2 | 9/2008 | Yamaura et al. |
| 7,478,314 B1 | 1/2009 | Cheong et al. |
| 7,486,740 B2 | 2/2009 | Inanoglu |
| 7,599,332 B2 | 10/2009 | Zelst et al. |
| 7,729,439 B2 | 6/2010 | Zhang et al. |
| 7,742,390 B2 | 6/2010 | Mujtaba |
| 7,804,800 B2 | 9/2010 | Li et al. |
| 7,904,519 B2 | 3/2011 | Czotscher et al. |
| 7,917,107 B2 | 3/2011 | Gu et al. |
| 8,068,455 B2 | 11/2011 | Utsunomiya et al. |
| 8,074,056 B1 | 12/2011 | Chen et al. |
| 8,111,609 B2 | 2/2012 | Wei et al. |
| 8,144,647 B2 | 3/2012 | Nabar et al. |
| 8,149,811 B2 | 4/2012 | Nabar et al. |
| 8,155,138 B2 | 4/2012 | van Nee |
| 8,194,604 B2 | 6/2012 | Gault et al. |
| 8,201,065 B1 | 6/2012 | Cheong et al. |
| 8,270,909 B2 | 9/2012 | Zhang et al. |
| 8,289,869 B2 | 10/2012 | Sawai |
| 8,331,309 B2 | 12/2012 | Marsh et al. |
| 8,331,398 B2 | 12/2012 | Lim et al. |
| 8,339,978 B2 | 12/2012 | Sawai et al. |
| 8,363,578 B1 | 1/2013 | Ramamurthy et al. |
| 8,379,757 B1 | 2/2013 | Zhang et al. |
| 8,395,997 B2 | 3/2013 | Banerjea et al. |
| 8,472,383 B1 | 6/2013 | Banerjea et al. |
| 8,483,152 B1 | 7/2013 | Mueller |
| 8,526,351 B2 | 9/2013 | Fischer et al. |
| 8,571,010 B1 | 10/2013 | Zhang et al. |
| 8,599,803 B1 | 12/2013 | Zhang et al. |
| 8,599,804 B2 | 12/2013 | Erceg et al. |
| 8,605,569 B2 | 12/2013 | Olszewski et al. |
| 8,611,322 B2 | 12/2013 | Kwon |
| 8,619,907 B2 | 12/2013 | Mujtaba et al. |
| 8,644,368 B1 | 2/2014 | Zhang et al. |
| 8,660,497 B1 | 2/2014 | Zhang et al. |
| 8,670,399 B2 | 3/2014 | Liu et al. |
| 8,675,575 B2 | 3/2014 | Gong et al. |
| 8,724,546 B2 | 5/2014 | Zhang et al. |
| 8,724,720 B2 | 5/2014 | Srinivasa et al. |
| 8,737,405 B2 | 5/2014 | Liu et al. |
| 8,787,338 B2 | 7/2014 | Liu et al. |
| 8,787,385 B2 | 7/2014 | Liu et al. |
| 8,811,203 B1 | 8/2014 | Liu et al. |
| 8,842,614 B2 | 9/2014 | Liu et al. |
| 8,855,053 B2 | 10/2014 | Chen et al. |
| 8,867,653 B2 | 10/2014 | Zhang et al. |
| 8,886,755 B1 | 11/2014 | Liu et al. |
| 8,891,640 B2 | 11/2014 | Nabar et al. |
| 8,923,118 B1 | 12/2014 | Liu et al. |
| 8,923,217 B2 | 12/2014 | Liu et al. |
| 8,971,350 B1 | 3/2015 | Liu |
| 8,976,877 B2 | 3/2015 | Stacey et al. |
| 9,131,528 B2 | 9/2015 | Zhang et al. |
| 9,166,660 B2 | 10/2015 | Chu et al. |
| 9,209,837 B1 | 12/2015 | Cheong et al. |
| 9,226,294 B1 | 12/2015 | Liu et al. |
| 9,407,347 B2 | 8/2016 | Chu et al. |
| 9,414,432 B2 | 8/2016 | Zhang |
| 2002/0061768 A1 | 5/2002 | Liang et al. |
| 2002/0098860 A1 | 7/2002 | Pecen et al. |
| 2002/0145985 A1 | 10/2002 | Love et al. |
| 2003/0056043 A1 | 3/2003 | Kostadinov |
| 2003/0064728 A1 | 4/2003 | Speight |
| 2003/0128684 A1 | 7/2003 | Hirsch et al. |
| 2004/0001429 A1 | 1/2004 | Ma et al. |
| 2004/0057530 A1 | 3/2004 | Tarokh et al. |
| 2004/0066766 A1 | 4/2004 | Shiu et al. |
| 2005/0044473 A1 | 2/2005 | Huang et al. |
| 2005/0058151 A1 | 3/2005 | Yeh |
| 2005/0135284 A1 | 6/2005 | Nanda et al. |
| 2005/0135318 A1 | 6/2005 | Walton et al. |
| 2005/0226198 A1 | 10/2005 | Barak et al. |
| 2006/0014554 A1 | 1/2006 | Gerlach |
| 2006/0023669 A1 | 2/2006 | Yamaura et al. |
| 2006/0045048 A1 | 3/2006 | Kwon et al. |
| 2006/0063492 A1 | 3/2006 | Iacono et al. |
| 2006/0120395 A1 | 6/2006 | Xing et al. |
| 2007/0004440 A1 | 1/2007 | Breuer et al. |
| 2007/0017754 A1 | 1/2007 | Kakinuma et al. |
| 2007/0060149 A1 | 3/2007 | Lim et al. |
| 2007/0086370 A1 | 4/2007 | Jang et al. |
| 2007/0153754 A1 | 7/2007 | Shapira et al. |
| 2007/0171808 A1 | 7/2007 | Wu et al. |
| 2007/0206534 A1 | 9/2007 | Kwun et al. |
| 2007/0223469 A1 | 9/2007 | Chandra et al. |
| 2007/0237181 A1 | 10/2007 | Cho et al. |
| 2008/0075058 A1 | 3/2008 | Mundarath et al. |
| 2008/0080449 A1 | 4/2008 | Huang et al. |
| 2008/0084837 A1 | 4/2008 | Watanabe et al. |
| 2008/0084941 A1 | 4/2008 | Mohanty et al. |
| 2008/0117867 A1 | 5/2008 | Yin et al. |
| 2008/0119194 A1 | 5/2008 | Kim et al. |
| 2008/0130483 A1 | 6/2008 | Khandekar et al. |
| 2008/0192644 A1 | 8/2008 | Utsunomiya et al. |
| 2008/0292015 A1 | 11/2008 | Lee |
| 2008/0299962 A1 | 12/2008 | Kasher |
| 2008/0310363 A1 | 12/2008 | McBeath et al. |
| 2008/0316961 A1 | 12/2008 | Bertrand et al. |
| 2008/0318612 A1 | 12/2008 | Axnas et al. |
| 2009/0022093 A1 | 1/2009 | Nabar et al. |
| 2009/0022128 A1 | 1/2009 | Nabar et al. |
| 2009/0066577 A1 | 3/2009 | Kim et al. |
| 2009/0129304 A1 | 5/2009 | Kim et al. |
| 2009/0196163 A1 | 8/2009 | Du |
| 2009/0225710 A1 | 9/2009 | Gupta et al. |
| 2009/0232234 A1 | 9/2009 | Du |
| 2009/0262696 A1 | 10/2009 | Wei et al. |
| 2009/0316585 A1 | 12/2009 | Srinivasan et al. |
| 2010/0029325 A1 | 2/2010 | Wang et al. |
| 2010/0046358 A1 | 2/2010 | van Nee |
| 2010/0046656 A1 | 2/2010 | van Nee et al. |
| 2010/0061333 A1 | 3/2010 | Marsh et al. |
| 2010/0061334 A1 | 3/2010 | Gault et al. |
| 2010/0067589 A1 | 3/2010 | Schumacher et al. |
| 2010/0091675 A1 | 4/2010 | Sawai |
| 2010/0118829 A1 | 5/2010 | Lin et al. |
| 2010/0165959 A1 | 7/2010 | Park et al. |
| 2010/0220601 A1 | 9/2010 | Vermani et al. |
| 2010/0246498 A1 | 9/2010 | Lim et al. |
| 2010/0250159 A1 | 9/2010 | Hall |
| 2010/0260138 A1 | 10/2010 | Liu et al. |
| 2010/0260159 A1 | 10/2010 | Zhang et al. |
| 2010/0284393 A1 | 11/2010 | Abraham et al. |
| 2010/0309834 A1 | 12/2010 | Fischer et al. |
| 2010/0309868 A1 | 12/2010 | Yang et al. |
| 2011/0002219 A1 | 1/2011 | Kim et al. |
| 2011/0038332 A1 | 2/2011 | Liu et al. |
| 2011/0053527 A1 | 3/2011 | Hunzinger |
| 2011/0096796 A1 | 4/2011 | Zhang et al. |
| 2011/0096797 A1 | 4/2011 | Zhang et al. |
| 2011/0103280 A1 | 5/2011 | Liu et al. |
| 2011/0110348 A1 | 5/2011 | Lee et al. |
| 2011/0116485 A1 | 5/2011 | Olszewski et al. |
| 2011/0128929 A1 | 6/2011 | Liu et al. |
| 2011/0128947 A1 | 6/2011 | Liu et al. |

(56) References Cited

U.S. PATENT DOCUMENTS

| | | | |
|---|---|---|---|
| 2011/0194475 A1 | 8/2011 | Kim et al. |
| 2011/0194644 A1 | 8/2011 | Liu et al. |
| 2011/0235596 A1 | 9/2011 | Wentink |
| 2011/0310827 A1 | 12/2011 | Srinivasa et al. |
| 2012/0033753 A1 | 2/2012 | Hamaguchi |
| 2012/0039196 A1 | 2/2012 | Zhang |
| 2012/0044906 A1 | 2/2012 | Chen et al. |
| 2012/0082040 A1 | 4/2012 | Gong et al. |
| 2012/0201316 A1 | 8/2012 | Zhang et al. |
| 2012/0275409 A1 | 11/2012 | Han et al. |
| 2012/0294294 A1 | 11/2012 | Zhang |
| 2012/0300874 A1 | 11/2012 | Zhang |
| 2012/0315938 A1 | 12/2012 | Van Nee et al. |
| 2012/0327871 A1 | 12/2012 | Ghosh et al. |
| 2013/0202001 A1 | 8/2013 | Zhang |
| 2013/0259017 A1 | 10/2013 | Zhang et al. |
| 2013/0286959 A1 | 10/2013 | Lou et al. |
| 2013/0287131 A1 | 10/2013 | Hart et al. |
| 2013/0301551 A1 | 11/2013 | Ghosh et al. |
| 2013/0308524 A1 | 11/2013 | Tavildar et al. |
| 2014/0036811 A1 | 2/2014 | Zhang |
| 2015/0016379 A1 | 1/2015 | Nam et al. |
| 2015/0049727 A1 | 2/2015 | Wentink et al. |
| 2015/0063255 A1 | 3/2015 | Tandra et al. |
| 2015/0117227 A1 | 4/2015 | Zhang et al. |
| 2015/0131517 A1 | 5/2015 | Chu et al. |
| 2015/0146653 A1 | 5/2015 | Zhang et al. |
| 2015/0146654 A1 | 5/2015 | Chu et al. |
| 2015/0146807 A1 | 5/2015 | Zhang et al. |
| 2015/0146808 A1 | 5/2015 | Chu et al. |
| 2015/0146812 A1 | 5/2015 | Chu et al. |
| 2016/0242187 A1 | 8/2016 | Zhang et al. |
| 2016/0285600 A1 | 9/2016 | Sun et al. |

FOREIGN PATENT DOCUMENTS

| | | |
|---|---|---|
| EP | 2863696 A1 | 4/2015 |
| JP | 10-136446 | 5/1998 |
| JP | 11-069426 | 3/1999 |
| WO | WO-2008/025040 A2 | 2/2008 |
| WO | WO-2011/035204 A2 | 3/2011 |
| WO | WO-2011/130344 | 10/2011 |
| WO | WO-2012/051319 | 4/2012 |
| WO | WO-2012/111939 A2 | 8/2012 |
| WO | WO-2012/162576 A1 | 11/2012 |
| WO | WO-2012/173326 | 12/2012 |
| WO | WO-2014/014084 A1 | 1/2014 |
| WO | WO-2015/077223 A1 | 5/2015 |

OTHER PUBLICATIONS

Liu, Lingjia, "Downlink MIMO in LTE-Advanced: SU-MIMO vs MU-MIMO," Feb. 2012, IEEE, all pages.*
International Search Report and Written Opinion in International Application No. PCT/US2105/028920, dated Jul. 20, 2015 (18 pages).
Hart et al., "DL-OFDMA for Mixed Clients," IEEE 802.11-10/0317r1, slides 1-24 (Mar. 2010).
Seok et al., "Efficient Frequency Spectrum Utilization," IEEE 802.11-13/0539r0, slides 1-12 (May 2013).
Wang et al., "Wide Band OBSS Friendly PSMP," IEEE 802.11-10/1054-00, slides 1-14 (Sep. 13, 2010).
U.S. Appl. No. 14/538,573, filed Nov. 11, 2014.
U.S. Appl. No. 12/730,651, filed Mar. 24, 2010.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-83 (Sep. 1999).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 Ghz Band," *The Institute of Electrical and Electronics Engineers, Inc.*, pp. 1-89 (Sep. 1999).
IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band, "*The Institute of Electrical and Electronics Engineers, Inc.*, pp. 1-53 (May 2002).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, pp. 1-69 (Apr. 2003).
IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
Chen, "Home Network Basis: Transmission Environments and Wired/Wireless Protocols," *Prentice Hall*, pp. 1-26 (Jul. 2003).
Hiertz, et al., "The IEEE 802.11 Universe," *IEEE Communications Magazine*, pp. 62-70, (Jan. 2010).
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

(56) References Cited

OTHER PUBLICATIONS

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

van Nee et al. "The 802.11 n MIMO-OFDM Standard for Wireless LAN and Beyond," Wireless Personal Communications, vol. 37, pp. 445-453 (Jun. 2006).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009),The Institute of Electrical and Electronics Engineers, pp. 207-211 (2009).

Imashioya et al., "RTL Design of 1.2 Gbps MIMO WLAN System and Int'l Business Aspect," IEEE 9th Int'l Symposium on Communications and Information Technology (ISCIT 2009),The Institute of Electrical and Electronics Engineers, pp. 296-301 (2009).

Syafei et al., "A Design of Next Generation Gigabit MIMO Wireless LAN System ," IEEE 12th Int'l Conference on Advanced Communication Technology (ICACT 2010),The Institute of Electrical and Electronics Engineers, pp. 941-946 (2010).

Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, pp. 228-231 (2009).

Shi et al., "Phase Tracking During VHT-LTF," Doc. No. IEEE 802.11-10/07711-0, The Institute of Electrical and Electronics Engineers, Inc., pp. 1-19 (Jul. 2010).

van Zelst et al., "Pilot Sequence for VHT-DATA," Doc. No. IEEE 802.11-10/0811r1 , The Institute of Electrical and Electronics Engineers, Inc., pp. 1-10 (Jul. 2010).

Cariou et al., "Multi-channel Transmissions," Doc. No. IEEE 802.11-09/1022r0, *The Institute of Electrical and Electronics Engineers, Inc.*, pp. 1-13 (Sep. 2009).

Yuan et al., "Carrier Aggregation for LTE-Advanced Mobile Communication Systems," IEEE Communications Magazine, pp. 88-93 (Feb. 2010).

Pedersen et al., "Carrier Aggregation for LTE-Advanced: Functionality and Performance Aspects," IEEE Communications Magazine, vol. 49, No. 6, pp. 89-95, (Jun. 1, 2011).

Noh, et al., "Channel Selection and Management for 11ac," Doc. No. IEEE 802.11-10/0593r1, *The Institute of Electrical and Electronics Engineers, Inc.*, pp. 1-21 (May 20, 2010).

Redieteab et al., "Cross-Layer Multichannel Aggregation for Future Wlan Systems," 2010 IEEE Int'l Conf. on Communication Systems (ICCS), pp. 740-756 (Nov. 2010).

Park, "IEEE 802.11ac: Dynamic Bandwidth Channel Access," 2011 IEEE Int'l Conf. on Communications (ICC), pp. 1-5 (Jun. 2011).

Liu et al., "VHT BSS Channel Selection," *Institute of Electrical and Electronics Engineers, Inc.*, doc. No. IEEE 802.11-11/1433r0, pp. 1-10 (Nov. 2011).

Wannstrom, "Carrier Aggregation explained," pp. 1-6 (May 2012).

Liu et al, "Methods and Apparatus for Clear Channel Assessment," U.S. Appl. No. 13/034,421, filed Feb. 24, 2011 (47 pages).

Liu et al, "Accessing Channels in a Multi-Channel Communication System," U.S. Appl. No. 13/440,214, filed Apr. 5, 2012 (38 pages).

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 Ghz," *The Institute of Electrical and Electronics Engineers, Inc.*, pp. 1-292 (Apr. 1, 2003).

IEEE Std 802.16e-2005 and IEEE Std 802.16/2004/Cor1-2005 (Amendment and Corrigendum to IEEE Std 802.16/2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE P802.16Rev2/D5 (Jul. 2008) (Revision of IEEE Std 802.16/2004 and consolidates material from IEEE Std 802.16e-2005, Std 802.16/2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

IEEE Std 802.16-2009 (Revision of IEEE Std. 802.16/2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE 802.20-PD-06; IEEE P 802.20™V14, Draft 802.20 Permanent Document; <System Requirements for IEEE 802.20 Mobile Broadband Wireless Access Systems—Version 14>, 24 pages (Jul. 16, 2004).

IEEE Std 802.16/2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).

ITU-T Recommendation G.9960, "Unified high-speed wireline-based home networking transceivers—System architecture and physical layer specification," *Int'l Telecommunication Union*, pp. 1-160 (Dec. 2011).

ITU-T Recommendation G.9960, Erratum 1 to Recommendation ITU-T G.9960, *Int'l Telecommunication Union*, 1 page (Jul. 2012).

ITU-T Recommendation G.9960, Erratum 2 to Recommendation ITU-T G.9960, *Int'l Telecommunication Union*, 4 pages (Sep. 2012).

ITU-T Recommendation G.9961, "Unified high-speed wire-line based home networking transceivers—Data link layer specification," *Int'l Telecommunication Union*, pp. 1-220 (Jun. 2010).

ITU-T Recommendation G.9961, Corrigendum 1, "Unified high-speed wire-line based home networking transceivers—Data link layer specification," *Int'l Telecommunication Union*, pp. 1-158 (Dec. 2011).

ITU-T Recommendation G.9961, Amendment 1, "Unified high-speed wire-line based home networking transceivers—Data link layer specification," *Int'l Telecommunication Union*, pp. 1-80 (Sep. 2012).

ITU-T Recommendation G.9961, Corrigendum 2, "Unified high-speed wire-line based home networking transceivers—Data link layer specification," *Int'l Telecommunication Union*, pp. 1-122 (Jul. 2013).

ITU-T Recommendation G.9961, Amendment 2, "Unified high-speed wire-line based home networking transceivers—Data link layer specification," *Int'l Telecommunication Union*, pp. 1-44 (Apr. 2014).

ITU-T Recommendation G.9963, "Unified high-speed wireline-based home networking transceivers—Multiple input-multiple output specification" *Int'l Telecommunication Union*, pp. 1-90 (Dec. 2011).

IEEE Std 802.3ac-1998 (Supplement to IEEE Std 802.3, 1998 Edition) "Supplement to Carrier Sense Multiple Access with Collision Detectiong (CSMA/CD) Access Method and Physical Layer Specifications—Frame Extensions for Virtual Bridged Local Area Network (VLAN) Tagging on 802.3 Networks" *The Institute of Electrical and Electronics Engineers, Inc.*, pp. 1-89 (Sep. 1998).

IEEE Std 802.11a-1999 (R2003) (Supplement to IEEE Std 802.11-1999) "Supplement to IEEE Standard for Information technology—Telecommunications and information exchange between systems—

(56) References Cited

OTHER PUBLICATIONS

Local and metropolitan area networks—Specific requirements—Part 11: Wireless LAN Medium Access Control (MAC) and Physical Layer (PHY) specifications: High-Speed Physical Layer in the 5 Ghz Band," The Institute of Electrical and Electronics Engineers, Inc., pp. 1-92, (1999) Reaffirmed (Jun. 12, 2003).

Zhang et al. Exploiting Multi-Antennas for Opportunistic Spectrum Sharing in Cognitive Radio Networks, IEEE The 19th Annual IEEE International Symposium on Personal, Indoor and Mobile Radio Communications (PIMRC), 2007, 5 pages.).

International Search Report and Written Opinion for International Application No. PCT/US2014/065049, mailed Feb. 10, 2015.

Tomoya Tandai et al., "An efficient uplink multiuser MIMO protocol in IEEE 802.11 WLANs", IEEE 20th International Symposium on Personal, Indoor and Mobile Radio Communications (PIMRC 2009), IEEE, Piscataway, NJ, USA, Sep. 13, 2009, pp. 1153-1157.

Liu et al., "Summary and Discussions of Proposals on Potential PHY Technologies in HEW," IEEE 802.11-13/1375r1 Dec. 31, 2013 (15 pages).

U.S. Appl. No. 14/555,183, filed Nov. 26, 2014.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-394 (Oct. 2013).

Perahia et al., "Gigabit Wireless LANs: an overview of IEEE 802.11ac and 80211ad," ACM Sigmobile Mobile Computing and Communications Review, vo. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

Chu et al., "Uplink Multi-User Multiple Input Multiple Output Beamforming," U.S. Appl. No. 14/554,497, filed Nov. 26, 2014 (60 pages).

Chu et al., "Uplink Multi-User Multiple Input Multiple Output for Wireless Local Area Network," U.S. Appl. No. 14/553,982, filed Nov. 25, 2014 (47 pages).

Chu et al., "Medium Access Protection and Bandwidth Negotiation in a Wireless Local Area Network," U.S. Appl. No. 14/555,305, filed Nov. 26, 2014 (74 pages).

Zhang et al, "OFDMA with Block Tone Assignment for WLAN," U.S. Appl. No. 12/730,651, filed Mar. 24, 2010 (39 pages).

International Search Report and Written Opinion for International Application No. PCT/US2014/067728, mailed Mar. 17, 2015 (12 pages).

3GPP TS 36.213, V8.5.0, "3rd Generation Partnership Project; Technical Specification Group Radio Access Network; Evolved Universal Terrestrial Radio Access (E-UTRA); Physical layer procedures (Release 8)," 3rd Generation Partnership Project, 76 pages (Dec. 2008).

Eslami et al., "Net Throughput Maximization of Per-Chunk User Scheduling for MIMO-OFDM Downlink," IEEE Transactions on Vehicular Technology, vol. 60, No. 9, pp. 4338-4348 (Nov. 2011).

Jang et al., "Frame Design and Throughput Evaluation for Practice Multiuser MIMO OFDMA Systems," IEEE Transactions on Vehicular Technology, vol. 60, No. 7, pp. 3127-3141 (Sep. 2011).

Liu et al., "Downlink MIMO in LTE-Advanced: SU-MIMO vs. MU-MIMO," LTE Advance and 4G Wireless Communications, IEEE Communications Magazine, pp. 140-147 (Feb. 2012).

U.S. Appl. No. 14/555,305, filed Nov. 26, 2014.

U.S. Appl. No. 14/553,974, filed Nov. 25, 2014.

IEEE Std 802.16Tm-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, The Institute of Electrical and Electronics Engineers, Inc., 2558 pages (Aug. 17, 2012).

International Preliminary Report on Patentability in International Application No. PCT/US2015/028920 mailed Nov. 17, 2016 (13 pages).

Kumaradan, "Uplink Scheduling in CDMA Packet-Data Systems," Journal Wireless Networks, vol. 12, Issue 1, pp. 33-43 (Feb. 2006).

Lestable et al., "Uplink MIMO Schemes for 802.16m," IEEE 802.16 Broadband Wireless Access Working Group, IEEE C802.16m-08/534, 18 pages (Jul. 7, 2008).

Love et al., "An Overview of Limited Feedback in Wireless Communication Systems," IEEE J. on Selected Areas in Communications, vo. 26, No. 8, pp. 1341-1365 (Oct. 2008).

U.S. Appl. No. 15/225,225, Chu et al., "Uplink Multi-User Multiple Input Multiple Output Beamforming," filed Aug. 1, 2016.

(56) References Cited

OTHER PUBLICATIONS

U.S. Appl. No. 14/327,298, Srinivasa et al., "User Group Selection in Multiple User Multiple Input Multiple Output (MU-MIMO) Configurations," filed Jul. 9, 2014.
U.S. Appl. No. 15/231,376, Zhang et al., "Physical Layer Frame Format for WLAN," filed Aug. 8, 2016.
U.S. Appl. No. 14/707,898, filed May 8, 2015.
Kwon et al., "SIG Field Design Principle for 11ax," Institute for Electrical and Electronics Engineers, draft, 802.11-15/0344r2, 18 pages (Mar. 9, 2015).

* cited by examiner

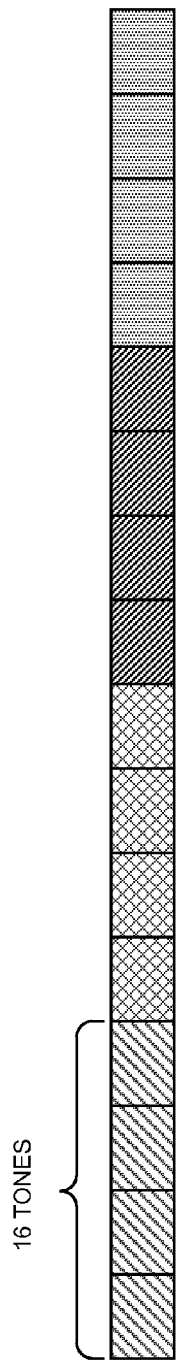
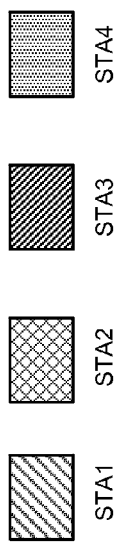
FIG. 2A
FIG. 2B
FIG. 2C
16 TONES
Legend for Figs. 2A-2C: STA1, STA2, STA3, STA4

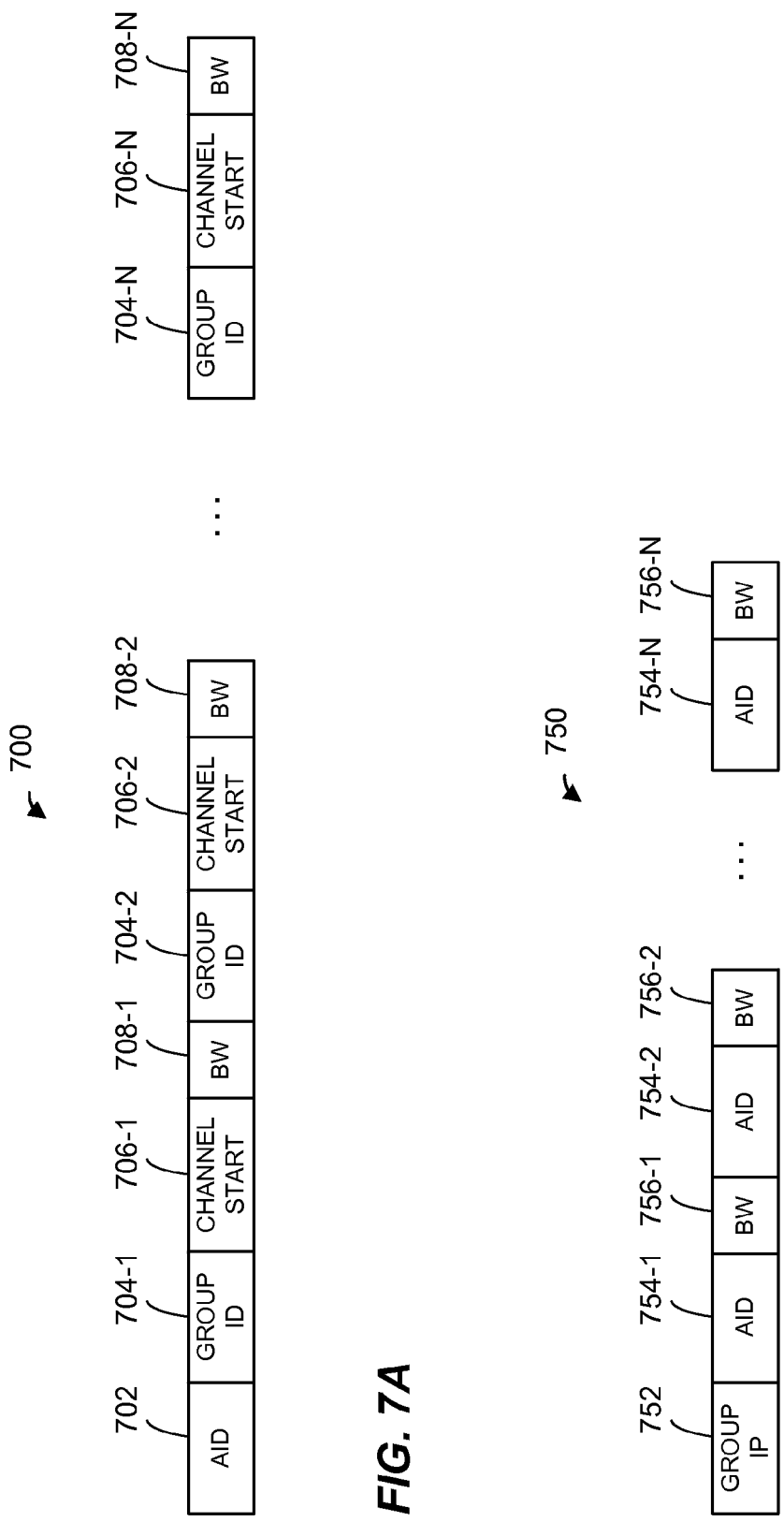

MULTIPLE USER ALLOCATION SIGNALING IN A WIRELESS COMMUNICATION NETWORK

CROSS-REFERENCE TO RELATED APPLICATION

This disclosure claims the benefit of U.S. Provisional Patent Application No. 61/987,751, filed May 2, 2014, entitled "SYNC of OFDMA, UL MIMO," the disclosure of which is hereby expressly incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.1 la and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

These WLANs operate in either a unicast mode or a multicast mode. In the unicast mode, the AP transmits information to one client station at a time. In the multicast mode, the same information is concurrently transmitted to a group of client stations.

SUMMARY

In an embodiment, a method for simultaneous communication in a wireless local area network that includes a first communication device and a plurality of second communication devices includes forming an orthogonal frequency division multiple access (OFDMA) group that includes two or more second communication devices of the plurality of second devices. The method also includes allocating, at the first communication device, respective sub-channel blocks to the two or more second communication devices, including statically allocating a respective primary sub-channel block to each of the two or more second communication devices, wherein the respective statically allocated primary sub-channel blocks remain allocated to the second communication devices for transmission of at least two PHY data units, and dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units. The method additionally includes providing, from the first communication device to the two or more second communication devices, indications of the respective sub-channel blocks allocated to the two or more second communication devices. The method further includes performing, at the first communication device, one of (i) transmitting a physical layer (PHY) data unit to the two or more second communication devices or (ii) receiving a physical layer (PHY) from the two or more second communication devices, wherein the PHY data unit includes respective orthogonal frequency division multiplexing (OFDM) data units transmitted using respective sub-channel blocks allocated to the two or more second communication devices.

In another embodiment, an apparatus configured to operate in a wireless local area network (WLAN) includes a network interface device configured to form an orthogonal frequency division multiple access (OFDMA) group that includes two or more communication devices. The network interface is also configured to allocate respective sub-channel blocks to the two or more communication devices. Allocating the sub-channel blocks includes statically allocating a respective primary sub-channel block to each of the two or more second communication devices, wherein the respective statically allocated primary sub-channel blocks remain allocated to the second communication devices for transmission of at least two PHY data units, and dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units. The network interface device is further configure to provide, to the two or more communication devices, indications of the respective sub-channel blocks allocated to the two or more second communication devices. The network interface device is further configured to perform one of (i) transmit an OFDMA data unit to the two or more second communication devices or (ii) receive an OFDMA data unit from the two or more second communication devices, wherein the PHY data unit includes respective orthogonal frequency division multiplexing (OFDM) data units transmitted using respective sub-channel blocks allocated to the two or more second communication devices.

BRIEF DESCRIPTION OF THE DRAWINGS

FIGS. 2A-2C are diagrams of example channel allocation schemes, according to various embodiments.

FIGS. 7A-7B are diagrams of OFDMA sub-channel allocation fields, according to embodiments.

DETAILED DESCRIPTION

In embodiments described below, a wireless network device such as an access point (AP) of a wireless local area network (WLAN) simultaneously transmits independent data streams to multiple client stations and/or receives independent data streams simultaneously transmitted by multiple client stations. In some embodiments, the AP transmits data for the multiple clients in different orthogonal frequency division multiplexing (OFDM) sub-channels of an orthogonal frequency division multiple access (OFDMA) transmission. Similarly, multiple client stations simultaneously transmit data to the AP, in particular, each client station transmits data in a different OFDM sub-channel of an OFDMA transmission, in an embodiment. Additionally or alternatively, in some embodiments and/or scenarios, the AP 14 transmits independent data streams to multiple client stations using multiple user (MU) OFDM transmission that utilizes respective one or more spatial streams to transmit respective data streams to multiple client stations. Similarly, the AP receives an MU OFDM transmission transmitted by multiple client stations, wherein each client station utilizes respective one or more spatial streams to simultaneously transmit to the AP, in some embodiments and/or scenarios.

The AP is configured to operate with client stations according to at least a first communication protocol. The first communication protocol is sometimes referred to herein as "high efficiency WiFi," "high efficiency WLAN," "HEW" communication protocol, or 802.11ax communication protocol. The first communication protocol supports OFDMA communication between the AP and the client stations. In some embodiments, different client stations in the vicinity of the AP are configured to operate according to one or more other communication protocols that define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. The legacy communication protocols do not support OFDMA communication, in an embodiment.

In an embodiment, client stations that are configured to operate according to the HEW communication protocol generally support OFDMA communication initiated by the AP. In some embodiments, client stations that are configured to operate according to the HEW communication protocol optionally support OFDMA communication initiated by the client stations.

Figure 1:
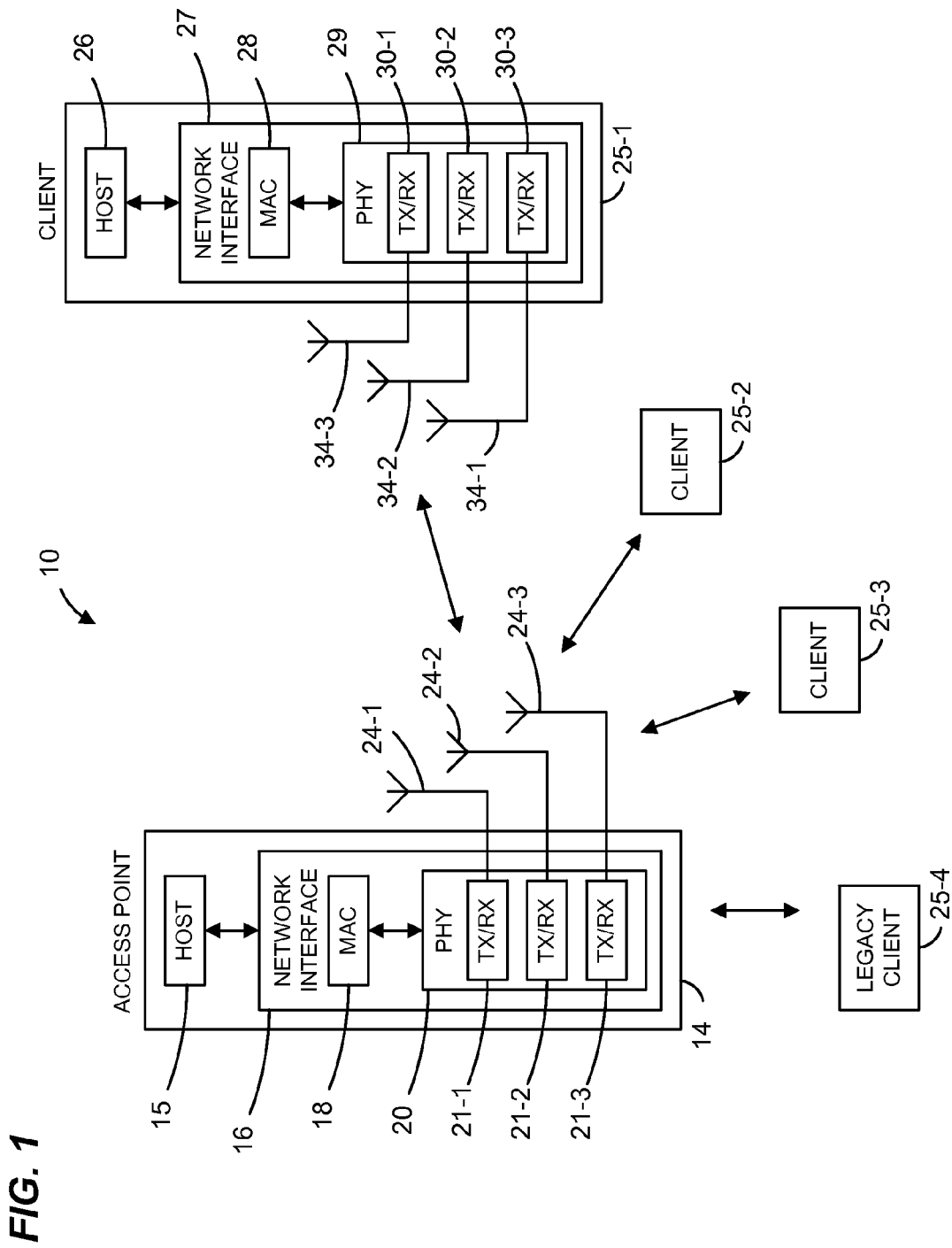
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 receives the data streams simultaneously.

A client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the AP 14 (e.g., the network interface device 16 of the AP 14) is configured to transmit independent data simultaneously to multiple client stations 25 via different spatial streams and/or via different orthogonal frequency division multiplexing (OFDM) sub-channels. In an embodiment, the AP 14 (e.g., the network interface device 16 of the AP 14) is configured to receive independent data simultaneously from multiple client stations 25 via different spatial streams and/or via different orthogonal frequency division multiplexing (OFDM) sub-channels. In some embodiments, two or more of the client stations 25 are configured to receive respective data streams that are transmitted simultaneously by the AP 14. In other embodiments, two or more of the client stations 25 additionally or alternatively are configured to transmit corresponding data streams to the AP 14 such that the AP 14 receives the data streams simultaneously. For example, in one embodiment, the network interface device 27 is configured to receive a data stream among a plurality of independent data streams transmitted simultaneously by the AP 14 to multiple client stations 25 via different spatial streams and/or via different OFDM sub-channels.

According to an embodiment, the client station 25-4 is a legacy client station that is not enabled to receive a data stream that is transmitted by the AP 14 simultaneously with other independent data streams as part of an OFDMA transmission to multiple client stations 25. Similarly, according to an embodiment, the legacy client station 25-4 is not enabled to transmit a data stream that to the AP 14 as part of OFDMA transmission from multiple client stations 25. According to an embodiment, the legacy client station 25-4 includes a PHY processing unit that is generally capable of receiving a data stream that is transmitted by the AP 14, as part of an OFDMA transmission, simultaneously with other independent data streams that are intended for other client stations 25. But the legacy client station 25-4 includes a MAC processing unit that is not enabled with MAC layer functions that support receiving the data stream that is transmitted by the AP 14, as part of an OFDMA transmission, simultaneously with other independent data streams that are intended for other client stations 25. According to an embodiment, the legacy client station 25-4 includes a PHY processing unit that is generally capable of transmitting a data stream to the AP 14, as part of an OFDMA transmission, at the same time that other client stations 25 transmit data to the AP 14. But the legacy client station 25-4 includes a MAC processing unit that is not enabled with MAC layer functions that support transmitting a data stream, as part of an OFDMA transmission, to the AP 14 at the same time that other client stations 25 transmit data to the AP 14.

In an embodiment, the AP 14 and the client stations 25 contend for communication medium using carrier sense multiple access with collision avoidance (CSMA/CA) protocol or another suitable medium access protocol. Further, in an embodiment, the AP 14 or a client station 25 dynamically selects a bandwidth for a transmission based on channels available for the transmission. In an embodiment, communication between the AP 14 and a legacy client station (e.g., the legacy client station 25-4) occurs in a primary channel of the WLAN 10, or in a wider channel that includes the primary channel of the WLAN 10. For example, the legacy communication protocol requires that each transmission includes the primary channel, in an embodiment. On the other hand, communication between the AP 14 and a non-legacy client station 25 (e.g., the client station 25-1) can occur in one or more channels of the WLAN 10 that do not include the primary channel of the WLAN 10, in an embodiment. For example, the non-legacy communication protocol, such as the HEW communication protocol, allows communication between the AP and the client stations to occur in a channel that does not include the primary channel, in an embodiment.

In an embodiment, the AP 14 is configured to transmit different OFDM units to different client stations 25 simultaneously by forming an OFDMA data unit that includes the different OFDM data units modulated in respective sub-channels of the OFDMA data unit. In an embodiment, each sub-channel includes one or more sub-channel blocks, each sub-channel block corresponding to a set of sub-carriers within the OFDMA data unit. In an embodiment, the AP 14 allocates different sub-channels to different client stations and forms the OFDMA data unit that includes OFDM data units directed to the different client stations in sub-channel blocks corresponding to the sub-channels allocated to the client stations. In an embodiment, when the one or more client stations include a legacy client station, the AP assigns a channel that includes a primary channel of the WLAN 10 to the legacy client station, and assigns one or more non-primary communication channels of the WLAN 10 to one or more non-legacy client stations. When the one or more client stations do not include any legacy client stations, the AP assigns the primary and the non-primary communication channels in any suitable manner to the one or more client stations, in various embodiments.

FIGS. 2A-2C are diagrams of example channel allocation schemes in an 80 MHz communication channel, according to various embodiments. In each of FIGS. 2A-2C, respective 20 MHz sub-channels are allocated to each of four client stations 25 (STA1, STA2, STA3 and STA4). In FIG. 2A, each of the sub-channels, allocated to a particular one of STA1, STA2, STA3 and STA4, consists of a single sub-channel block of adjacent sub-carriers allocated to the particular station. In FIG. 2B, each of the sub-channels, allocated to a particular one of STA1, STA2, STA3 and STA4, consists of four respective sub-channel blocks uniformly spaced over the entire 80 MHz channel. In FIG. 2C, each of the sub-channels consists of four respective non-uniformly (e.g., randomly) spaced over the entire 80 MHz channel. In each of FIGS. 2B and 2C, each of the sub-channel blocks allocated to a particular client station includes a block of adjacent sub-carriers, wherein the block of adjacent sub-carriers includes a subset of sub-carriers, of the 80 MHz channel, allocated to the particular client station, according to an embodiment.

In some embodiments, a sub-channel having a suitable bandwidth less than the smallest bandwidth of the WLAN can be allocated to a client station. For example, in some embodiments in which the smallest channel bandwidth of the WLAN 10 is 20 MHz, sub-channel having bandwidth less than 20 MHz, such as sub-channels having bandwidths of 10 MHz and/or 5 MHz can be allocated to client stations, in at least some scenarios.

Figure 3A:
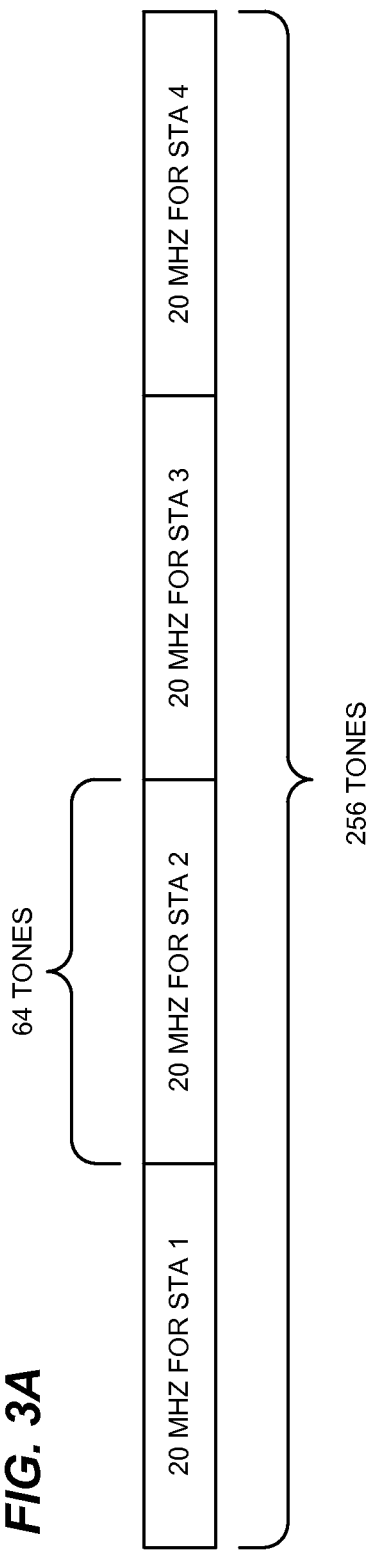
FIGS. 3A-3D are diagrams illustrating example orthogonal frequency division multiplexing (OFDM) sub-channel blocks for a communication channel, according to an embodiment.
Figure 3B:
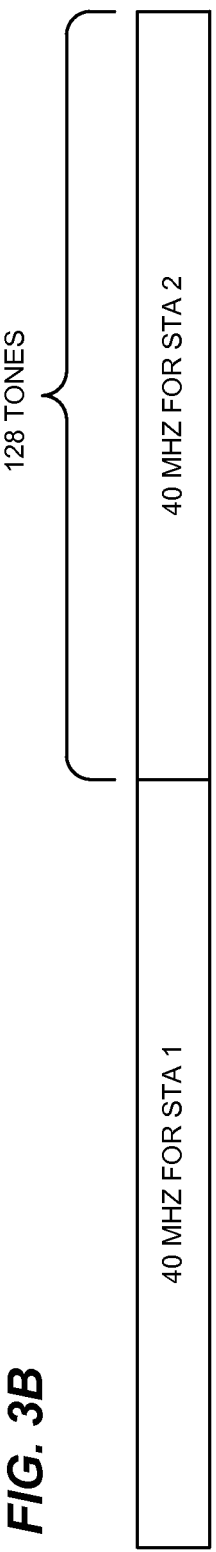
Figure 3C:
Figure 3D:
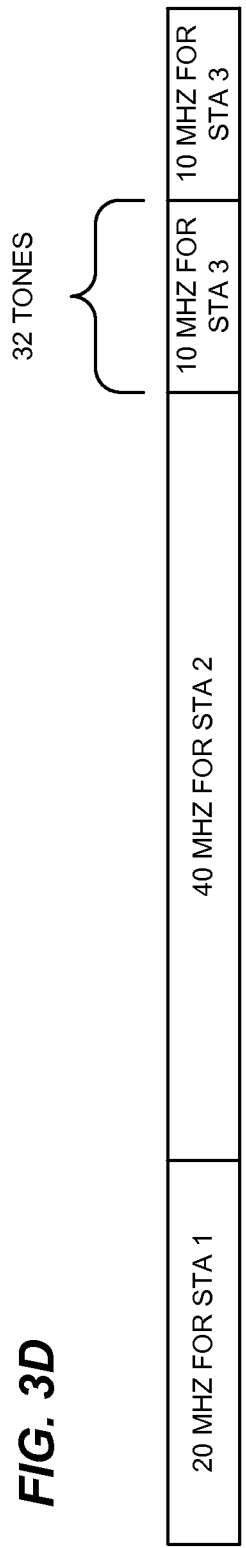

FIGS. 3A, 3B, 3C and 3D are diagrams illustrating example OFDM sub-channels of an 80 MHz communication channel, according to various embodiments. In FIG. 3A, the communication channel is partitioned into four contiguous sub-channels, each having a bandwidth of 20 MHz. The OFDM sub-channels include independent data streams for four client stations. In FIG. 3B, the communication channel is partitioned into two contiguous sub-channel channels, each having a bandwidth of 40 MHz. The OFDM sub-channels include independent data streams for two client stations. In FIG. 3C, the communication channel is partitioned into three contiguous OFDM sub-channels. Two OFDM sub-channels each have a bandwidth of 20 MHz. The remaining OFDM sub-channel has a bandwidth of 40 MHz. The OFDM sub-channels include independent data streams for three client stations. In FIG. 3D, the communication channel is partitioned into four contiguous OFDM sub-channels. Two OFDM sub-channels each have a bandwidth of 10 MHz, one OFDM sub-channel has a bandwidth of 20 MHz, and one OFDM sub-channel has a bandwidth of 40 MHz. The OFDM sub-channels include independent data streams for three client stations.

Although in FIGS. 3A, 3B, 3C, and 3D the OFDM sub-channels are contiguous across the communication channel, in other embodiments the OFDM sub-channels are not contiguous across the communication channel (i.e., there are one or more gaps between the OFDM sub-channels). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In an embodiment, different OFDM sub-channel blocks are transmitted in different channels defined by the IEEE 802.11a, 802.11n and/or 802.11ac Standards. In one embodiment, the AP includes a plurality of radios and different OFDM sub-channel blocks are transmitted using different radios.

In FIGS. 3A, 3B, 3C and 3D, each sub-channel corresponds to a single sub-channel block of adjacent sub-carriers allocated to a particular client station. In other embodiments, each of at least some sub-channels of an 80 MHz channel corresponds to several sub-channel blocks, each having adjacent sub-carriers, where the several sub-channel blocks collectively comprise the sub-carriers allocated to a particular client station. The several sub-channel blocks corresponding to a particular client station are uniformly or non-uniformly distributed over the 80 MHz channel, for example as described above with respect to FIGS. 3B and 3C, in some embodiments. In such embodiments, an independent data stream for the particular client station is accordingly distributed over the 80 MHz channel.

Figure 4:
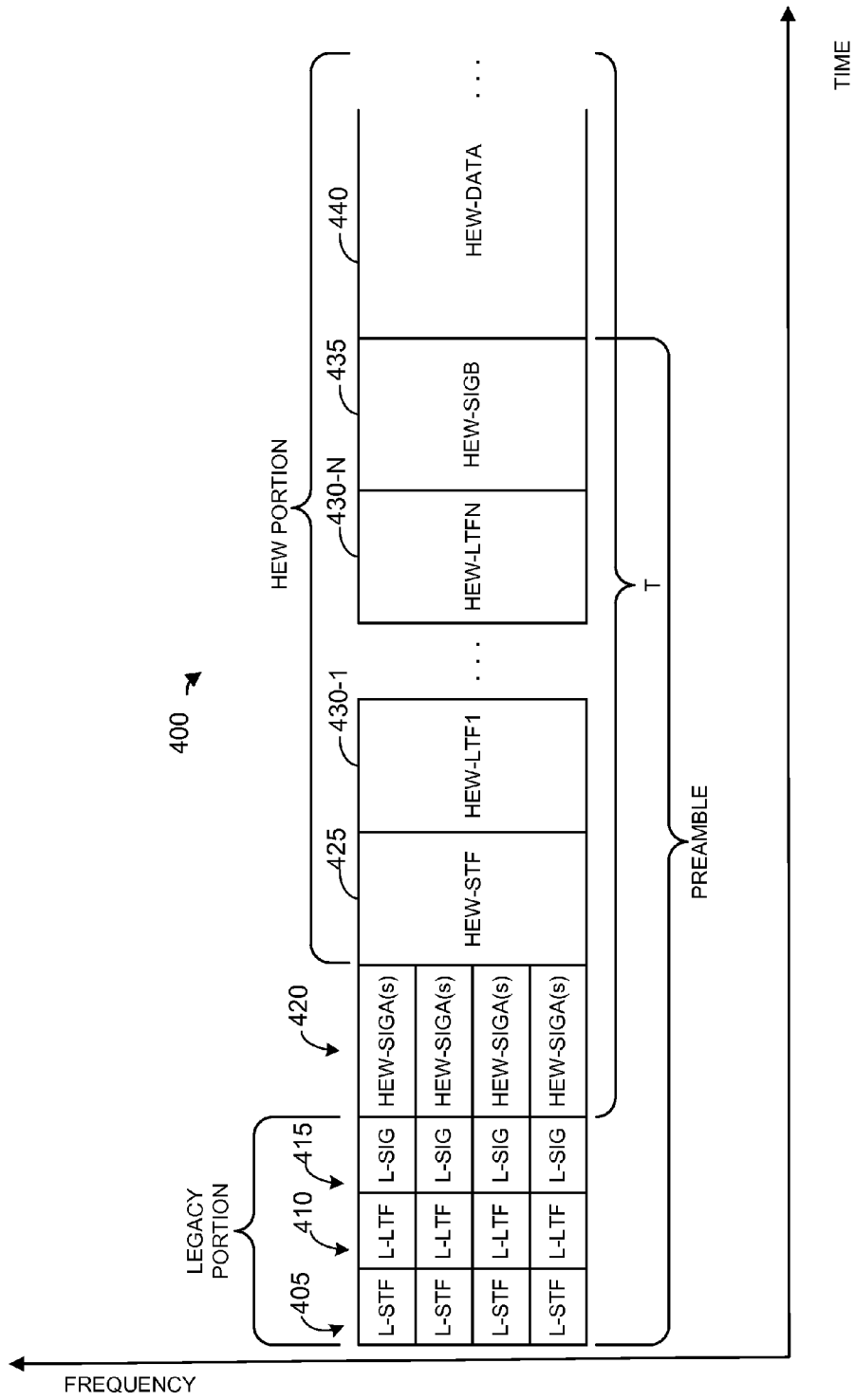
FIG. 4 is a diagram of an example orthogonal frequency division multiplexing (OFDM) data unit, according to an embodiment.

FIG. 4 is a diagram of an OFDM data unit 400, according to an embodiment. In an embodiment, an AP (e.g., the AP 14) is configured to transmit to a client station (e.g., the client station 25-1) using orthogonal frequency division multiplexing (OFDM) modulation, according to an embodiment. In an embodiment, a client station (e.g., the client station 25-1) is configured to transmit the data unit 400 to an AP (e.g., the AP 14). The data unit 400 conforms to the HEW protocol and occupies an 80 MHz band. In other embodiments, data units similar to the data unit 400 occupy different bandwidths such as 20 MHz, 40 MHz, 120 MHz, 160 MHz, or any suitable bandwidth. The data unit 400 is suitable for "mixed mode" situations, such as when the WLAN 10 includes a client station (e.g., the legacy client station 25-4) that conforms to the legacy protocol, but not the HEW protocol. The data unit 400 can be utilized in other situations as well.

The data unit 400 includes a preamble having four legacy short training fields (L-STFs) 405; four legacy long training fields (L-LTFs) 410; four legacy signal fields (L-SIGs) 415; four first high efficiency WLAN signal fields (HEW-SIGAs) 420; a high efficiency WLAN short training field (HEW-STF) 425; N very high efficiency WLAN long training fields (HHT-LTFs) 430, where N is an integer; and a second high efficiency WLAN signal field (HEW-SIGB) 435. The data unit 400 also includes a high efficiency WLAN data portion (HEW-DATA) 440. The L-STFs 405, the L-LTFs 410, and the L-SIGs 415 form a legacy portion. The HEW-SIGA 420, HEW-STF 425, the HEW-LTFs 430, the HEW-SIGB 435, and the HEW-DATA 440 form a high efficiency WLAN (HEW) portion.

Each of the L-STFs 405, each of the L-LTFs 410, each of the L-SIGs 415, and each of the HEW-SIGAs 420 occupy a 20 MHz band, in one embodiment. The data unit 400 is described as having an 80 MHz contiguous bandwidth for the purposes of illustrating an example frame format, but such frame format is applicable to other suitable bandwidths (including noncontiguous bandwidths). For instance, although the preamble of the data unit 400 includes four of each of the L-STFs 405, the L-LTFs 410, the L-SIGs 415, and the HEW-SIGAs 420, in other embodiments in which an OFDM data unit occupies a cumulative bandwidth other than 80 MHz, such as 20 MHz, 40 MHz, 120 MHz, 160 MHz, etc., a different suitable number of the L-STFs 405, the L-LTFs 410, the L-SIGs 415, and the HEW-SIGAs 420 are utilized accordingly. For example, for an OFDM data unit occupying a 20 MHz cumulative bandwidth, the data unit includes one of each of the L-STFs 405, the L-LTFs 410, the L-SIGs 415, and the HEW-SIGAs 420; a 40 MHz bandwidth OFDM data unit includes two of each of the fields 405, 410, 415, and 420; a 120 MHz bandwidth OFDM data unit includes six of each of the fields 405, 410, 415, and 420; a 160 MHz bandwidth OFDM data unit includes eight of each of the fields 405, 410, 415, and 420, and so on, according to some embodiments.

In the example data unit 400, each of the HEW-STF 425, the HEW-LTFs 430, the HEW-SIGB 435, and the HEW-DATA 440 occupy the entire 80 MHz cumulative bandwidth of the data unit 400. Similarly, in the case of an OFDM data unit conforming to the HEW protocol and occupying a cumulative bandwidth such as 20 MHz, 40 MHz, 120 MHz, or 160 MHz, each of the HEW-STF 425, the HEW-LTFs 430, the HEW-SIGB 435, and the HEW-DATA 440 occupy the corresponding entire cumulative bandwidth of the data unit, in some embodiments.

In some embodiments, the 80 MHz band of the data unit 400 is not contiguous, but includes two or more smaller bands, such as two 40 MHz bands, separated in frequency. Similarly, for other OFDM data units having different cumulative bandwidths, such as a 160 MHz cumulative bandwidth, in some embodiments the band is not contiguous in frequency. Thus, for example, the L-STFs 405, the L-LTFs 410, the L-SIGs 415, and the HEW-SIGAs 220 occupy two or more bands that are separated from each other in frequency, and adjacent bands are separated in frequency by at least one MHz, at least five MHz, at least 10 MHz, at least 20 MHz, for example, in some embodiments.

According to an embodiment, each of the L-STFs 405 and each of the L-LTFs 410 have a format as specified in a legacy protocol such as the IEEE 802.11a Standard, the IEEE 802.11n Standard, and/or the IEEE 802.11ac Standard. In an embodiment, each of the L-SIGs 415 has a format at least substantially as specified in legacy protocol (e.g., the IEEE 802.11a Standard, the IEEE 802.11n Standard, and/or the IEEE 802.11ac Standard). In such embodiments, the length and rate subfields in the L-SIGs 415 is set to indicate the duration T corresponding to the remainder of the data unit 400 after the legacy portion. This permits client stations that are not configured according to the HEW protocol to determine an end of the data unit 400 for carrier sense multiple access/collision avoidance (CSMA/CA) purposes, for example. For example, the legacy client stations determine the duration of the remainder of the data unit 400 and refrain from accessing the medium (or at least transmitting in the medium) for the duration of the remainder of the data unit 400, in an embodiment. In other embodiments, each of the L-SIGs 415 has a format at least substantially as specified in legacy protocol (e.g., the IEEE 802.11a Standard, the IEEE 802.11n Standard, and/or the IEEE 802.11ac Standard) but with length field in the L-SIGs 425 set to indicate a duration of the time remaining in a transmission opportunity during which the data unit 400 is transmitted. In such embodiments, client stations that are not configured according to the HEW protocol determine an end of the TXOP and refrain from accessing the medium (or at least transmitting in the medium) for the duration of the TXOP, in an embodiment.

In the data unit 400, the frequency domain symbols of the legacy portion are repeated over four 20 MHz subbands of the 80 MHz band. Legacy client stations that are configured to operate with 20 MHz bandwidth will recognize a legacy preamble in any of the 20 MHz subbands. In some embodiments, the modulations of the different 20 MHz subband signals are rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment.

In some embodiments, the modulations of the HEW-SIGAs 420 in the different 20 MHz subbands is rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment. In an embodiment, the same rotations utilized in the legacy portion are utilized for the HEW-SIGAs 420. In at least some examples, the HEW-SIGAs 420 are collectively referred to as a single high efficiency WLAN signal field (HEW-SIGA) 420.

In an embodiment, the data unit 400 is a single user data unit that includes data for only a single client station 25. In another embodiment, the data unit 400 is a multi-user data unit that includes independent data streams transmitted to multiple client stations 25 over respective spatial streams. In an embodiment in which the data unit 400 is a multi-user data unit, a portion of the data unit 400 (e.g., the L-STFs 405, the L-LTFs 410, the L-SIGs 415, and the HEW-SIGAs 420) is unsteered or omnidirectional (or "omnidirectional" or "pseudo-omnidirectional"; the terms "unsteered" and "omnidirectional" as used herein are intended to also encompass the term "pseudo-omnidirectional") and includes data that is common to all intended recipients of the data unit 400. The data unit 400 further includes a second portion (e.g., the HEW-SIF 425, the HEW-LTFs 430, the HEW-SIBB 435, and the HEW-DATA portion 440) in which beamforming is applied to different spatial streams to shape, or beamform, transmission over the corresponding spatial streams to particular client stations 25. In some such embodiments, the steered portion of the data unit 400 includes different (e.g., "user-specific") content transmitted over different spatial streams to different ones of the client stations 25.

In some embodiments, the AP 14 is configured to transmit respective OFDM data units, such as the OFDM data unit 400, simultaneously to multiple client stations 25 as parts of a downlink OFDMA transmission from the AP 14 to the multiple client stations 25. In an embodiment, the AP 14 transmits the respective OFDM data units in respective sub-channels allocated to the client stations. Similarly, in an embodiment, multiple client stations 25 transmit respective OFDM data units, such as the OFDM data unit 400, simultaneously to the AP 14 as parts of an uplink OFDMA transmission from the multiple client stations 25 to the AP 14. In an embodiment, the client stations 25 transmit the respective OFDM data units in respective sub-channels allocated to the client stations 25. In an embodiment, a sub-channel allocated to a particular client station corresponds to a single sub-channel block of adjacent sub-carriers of the communication channel (e.g., as illustrated in FIG. 2A). In an embodiment, a sub-channel allocated to a particular client station includes several sub-channel blocks of adjacent sub-carriers, each sub-channel block having a set of sub-carriers allocated to the particular client station. In an embodiment, the several sub-channel blocks corresponding to a particular client station are uniformly distributed over the communication channel (e.g., as illustrated in FIG. 2B). In another embodiment, the several sub-channel blocks are not necessarily uniformly distributed over the communication channel. For example, the several sub-channel blocks are randomly distributed over the communication channel (e.g., as illustrated in FIG. 2C), or are distributed according to another suitable distribution scheme over the communication channel, in some embodiments.

Figure 5:
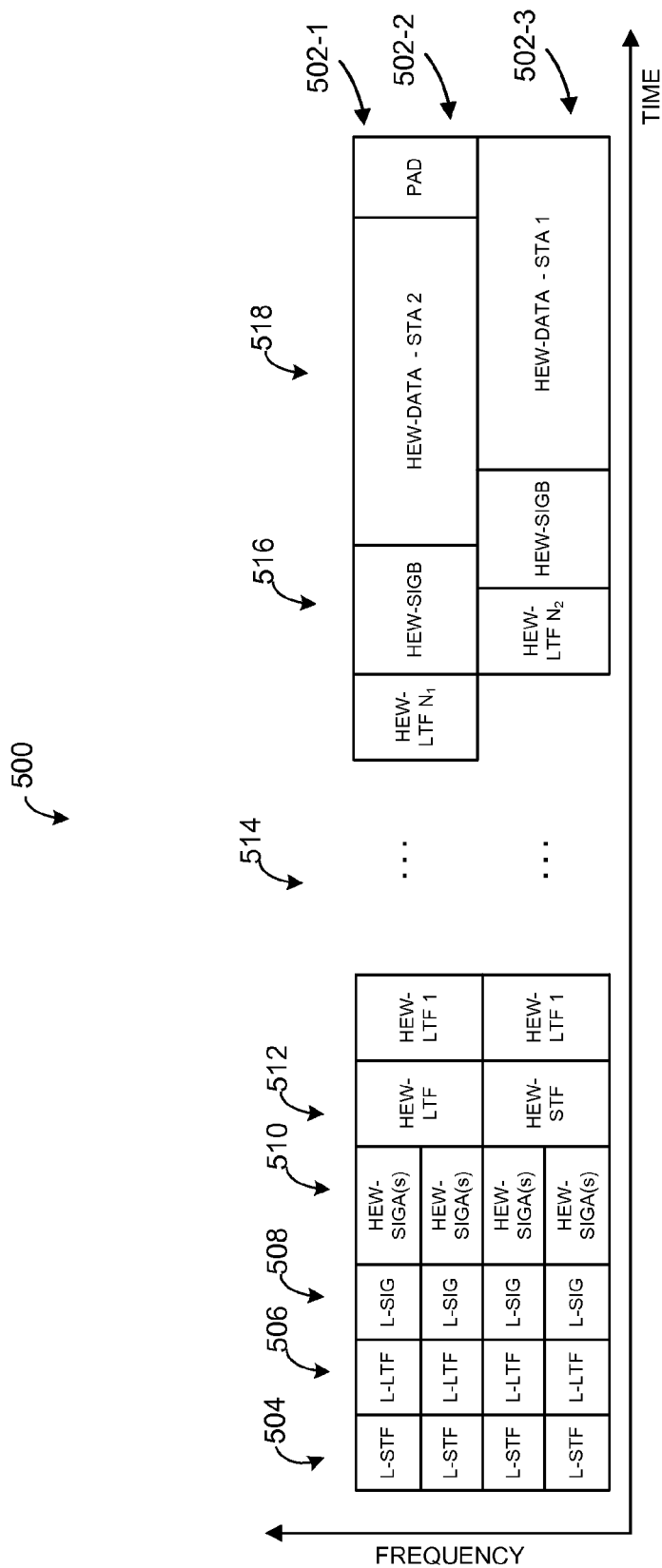
FIG. 5 is a diagram of an example orthogonal frequency division multiple access (OFDMA) data unit, according to an embodiment.

FIG. 5 is a diagram of an example OFDMA data unit 500, according to an embodiment. The OFDMA data unit 500 includes a plurality of OFDM data unit 502-1, 502-2. Respective ones of the data units 502-1 and 502-2 include independent data streams transmitted to, or received from, respective ones of two client stations 25. In an embodiment, each OFDM data unit 502 is the same as or similar to the OFDM data unit 200 of FIG. 2. In an embodiment, the AP 14 transmits the OFDM data units 502-1, 502-2 to different client stations 25 via respective OFDM sub-channels within the OFDMA data unit 500. In another embodiment, different client stations 25 transmit respective OFDM data units 502-1, 502-2 to the AP 14 in respective OFDM sub-channels within the OFDMA data unit 500. In this embodiment, The AP 14 receives the OFDM data units 502-1, 502-2 from the client stations 25 via respective OFDM sub-channels of within the OFDMA data unit 500, in this embodiment. Although the data unit 500 is illustrated in FIG. 5 as including only two data units 502 transmitted to, or received from, only two client stations 25, the data unit 500 includes more than two (e.g., 3, 4, 5, 6, etc.) data units 502 transmitted to, or received from, more than two (e.g., 3, 4, 5, 6, etc.) client stations 25, in other embodiments.

Each of the OFDM data units 502-1, 502-2 conforms to a communication protocol that defines OFDMA communication, such as the HEW communication protocol, in an embodiment. In an embodiment in which the OFDMA data unit 500 corresponds to a downlink OFDMA data unit, the OFDMA data unit 500 is generated by the AP 14 such that each OFDM data unit 502 is transmitted to a respective client station 25 via a respective sub-channel allocated for downlink transmission of the OFDMA data unit 500 to the client station. Similarly, an embodiment in which the OFDMA data unit 500 corresponds to an uplink OFDMA data unit, the AP 14 receives the OFDM data units 502 via respective sub-channels allocated for uplink transmission of the OFDM data units 502 from the client stations, in an embodiment. For example, the OFDM data unit 502-1 is transmitted via a first 20 MHZ sub-channel, and the OFDM data unit 502-2 is transmitted via a second 20 MHz sub-channel, in an embodiment.

Each of the OFDM data units 502 is the same as or similar to the OFDM data unit 500 of FIG. 5, in an embodiment. In an embodiment, each of the OFDM data units 502 includes a preamble including one or more legacy short training fields (L-STF) 504, one or more legacy long training fields (L-LTF) 506, one or more legacy signal fields (L-SIG) 508, one or more first high efficiency WLAN signal field (HEW-SIG-A) 510, N HEW long training fields (HEW-LTF) and a second HEW signal field (HEW-SIGB) 514. Additionally, each OFDM data unit 502 includes a high efficiency WLAN data portion (HEW-DATA) 518. In an embodiment, each L-LSF field 506, each L-LTF field 508, each L-SIG field 510 and each HEW-SIGA field 512 occupies a smallest bandwidth supported by the WLAN 10 (e.g., 20 MHz). In an embodiment, if an OFDM data unit 502 occupies a bandwidth that is greater than the smallest bandwidth channel of the WLAN 10, then each L-LSF field 506, each L-LTF field 508, each L-SIG field 510 and each HEW-SIGA field 512 is duplicated in each smallest bandwidth portion of the OFDM data unit 502 (e.g., in each 20 MHz portion of the data unit 502). On the other hand, each HEW-STF field 512, each HEW-LTF field 514, each HEW-SIGB field 516 and each HEW data portion 518 occupies an entire bandwidth of the corresponding OFDM data unit 502, in an embodiment.

In an embodiment, padding is used in one or more of the OFDM data units 502 to equalize lengths of the OFDM data units 502. Accordingly, the length of each of the OFDM data units 502 correspond to the length of the OFDMA data unit 502, in this embodiment. Ensuring that the OFDM data units 502 are of equal lengths synchronizes transmission of acknowledgment frames by client stations 25 that receive the data units 502, in an embodiment. In an embodiment, each of one or more of the OFDM data units 502 is an aggregate MAC service data units (A-MPDU) (e.g., a very high throughput (VHT) A-MPDU that includes multiple aggregated VHT MAC service data units (MPDUs), an HEW A-MPDU that includes multiple aggregated HEW MAC service data units (MPDUs), or another suitable aggregated data unit that includes multiple aggregated MAC service data units (MPDUs)), which is in turn included in a PHY protocol data unit (PPDU). In another embodiment, each of one or more of the OFDM data units 502 is a single MPDU (e.g., a single VHT MPDU, a single HEW MPDU, or another suitable non-aggregated data unit) which is in turn included in a PPDU. In an embodiment, padding (e.g., zero-padding) within one or more of the A-MPDUs 502 or single MPDUs 502 is used to equalize the lengths of the data units 502, and to synchronize transmission of acknowledgement frames corresponding to the OFDMA data unit 500.

In an embodiment, the AP 14 forms groups of client stations 25 for simultaneous downlink transmissions to a group of client stations 25 and/or simultaneous uplink transmissions by a group of client stations 25. To this end, the AP 14 allocates respective sub-channels to client stations 25 within a group of client stations 25 and/or allocates respective spatial streams to client stations 25, in embodiments. In an embodiment and/or scenario, the AP 14 then transmits one or more OFDMA data units to the client stations 25 in a group using the respective sub-channels allocated to the client stations 25 within the group and/or transmits one or more MU MIMO data units to client stations 25 in a group using respective spatial streams allocated to the client stations 25 within the group. Each group of client stations 25 includes two or more client stations 25, in an embodiment. A particular client station 25 belongs to one or more groups of the client stations 25, in an embodiment. Thus, for example, a first group of client stations 25 includes the client station 25-1 and the client station 25-2, and a second group of client stations 25 includes the client station 25-1 and the client stations 25-3, in an example embodiment and/or scenario. Accordingly, the client station 25-1 belongs to the first group of client stations 25 and to the second group of client stations 25, in this example embodiment and/or scenario.

In various embodiments, the AP 14 employs static allocation, semi-dynamic allocation or dynamic allocation to allocate respective sub-channel blocks to client stations 25 in a group of client stations 25 and/or to allocate spatial streams to client stations 25 in a group of client stations 25. In an embodiment in which the AP 14 employs static allocation, the AP 14 allocates respective sub-channel blocks and/or respective spatial streams to client stations 25 in a group when the AP 14 forms the group, and the sub-channel block allocation and/or spatial stream allocation persists for the life of the group. In an embodiment, upon forming a group and determining sub-channel allocation and/or spatial stream allocation for the group, the AP 14 transmits one or more group management frames or control frames to the client stations 25 in the group to inform the client stations 25 that the client stations 25 are member of the group and to indicate to the client stations 25 the particular sub-channels and/or spatial streams allocated to the client stations 25 within the group. The group assignment and sub-channel allocation and/or spatial stream allocation is subsequently used for OFDMA and/or MU downlink transmissions to the client stations 25 in the group and/or for OFDMA and/or MU uplink transmissions by the client stations 25 for the life duration of the group, in an embodiment.

In an embodiment and/or scenario in which the AP 14 employs semi-dynamic allocation to allocate sub-channels and/or spatial streams to client stations 25 in a group, allocation can change during the life of the group. For example, the AP 14 periodically obtains, for each of the client stations 25 in a group, one or more quality indicators corresponding to one or more sub-channel blocks of the channel associated with the client stations 25 in the group, and determines a suitable sub-channel block allocation to the client stations of the group each time new quality indicators are obtained for the client stations 25 in the group. For example, in an embodiment, the AP 14 utilizes a suitable sounding procedure to periodically "sound" the communication channel between the AP 14 and the client stations 25 to obtain quality indicators corresponding to one or more sub-channel blocks of the channel associated with the client stations 25, and performs sub-channel block allocation based on quality indicators obtained from the sounding procedure. Similarly, the AP 14 periodically obtains, from each client station 25 in a group, indications of channel characteristics of the communication channel associated with the client station 25, and determines a suitable spatial stream allocation to the client stations 25 in the group based on the indications of channel characteristics obtained from the client stations 25 in the group, in an embodiment. For example, in an embodiment, the AP 14 utilizes a suitable sounding procedure to periodically "sound" the communication channel between the AP 14 and the client stations 25 to obtain and/or to obtain indications of channel characteristics of the communication channels associated with the client stations 25, and performs spatial stream allocation based on channel characteristics obtained from the sounding procedure. In an embodiment, the AP transmits one or more group management frames or control frames to the client stations 25 in the group to inform the client stations 25 of new sub-channel blocks allocated to the client stations 25 and/or new spatial streams allocated to the client stations 25 each time the AP 14 completes a sounding procedure and reallocation of sub-channel blocks and/or spatial streams based on the sounding procedure.

In an embodiment in which the AP 14 employs dynamic sub-channel block allocation, the AP 14 allocates sub-channel blocks and/or spatial streams to client stations 25 in a group of client stations 25 on packet-per-packet basis, for example prior to transmission of each data unit to the client stations 25 of the group. In an embodiment in which the AP 14 employs dynamic sub-channel block allocation, the AP 14 indicates sub-channel blocks and/or spatial streams allocation for a particular transmission by including the indications in a preamble of the particular transmission. For example, in an embodiment, the sub-channel block and/or the spatial stream allocation indications are included in a signal field of the transmission to the client stations 25. With reference to FIG. 4, the sub-channel block allocation indications are included in the HEW-SIGA fields 410, in an example embodiment. With reference to FIG. 5, the sub-channel block allocation indications are included in the HEW-SIGA fields 510, in an example embodiment. In an embodiment, the signal field of the OFDMA transmission includes a group number subfield that identifies a group of client stations 25, and respective sub-channel allocation subfields corresponding to the client stations 25 of the identified group. In an embodiment, the sub-channel allocation subfields in the signal field are provided in the order corresponding to client station position within the group, wherein the client station position corresponds to the client station position determined by each client station 25 based on a group management frame previously received by the client station 25. When receiving a data unit directed to a group of client stations 25, each client station 25 that is a member of the group determines, based on a signal field of a preamble of the data, which sub-channel block(s) and/or which spatial stream(s) within the data unit are allocated to the client station 25, in an embodiment.

Figure 6A:
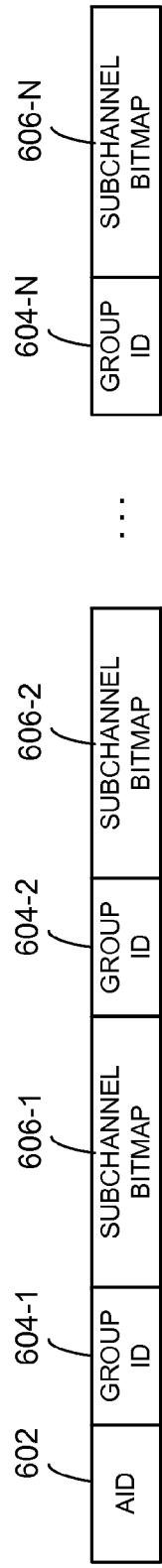
FIG. 6A is a diagram of an OFDMA sub-channel allocation field, according to an embodiment.

FIG. 6A is a diagram of an OFDMA sub-channel allocation field 600, according to an embodiment. The OFDMA sub-channel allocation field 600 is used in some embodiments in which static or semi-dynamic OFDMA sub-channel allocation is used to allocate one or more sub-channels to a client station 25 within one or more groups of client stations 25. In an embodiment, one or more OFDMA sub-channel allocation fields such as the OFDMA sub-channel allocation field 600 are included in a management frame (e.g., a group management frame or a sub-channel management frame) that the AP 14 transmits to one or more client stations 25 to provide user grouping and channel allocation information to the one or more client stations 25. In an embodiment, the AP 14 transmits a management frame (e.g., a group management frame) that includes the OFDMA sub-channel allocation field 600 each time an OFDMA group is formed by the AP 14 and/or each time one or more members of an OFDM group are removed from the OFDMA group and/or one or more new members are added to the OFDMA group. In an embodiment, the AP 14 additionally or alternatively transmits a management frame (e.g., a sub-channel allocation management frame) that includes the OFDMA sub-channel allocation field 600 each time sub-channels are re-allocated among the members of the OFDMA group. The OFDMA sub-channel allocation field 600 is used to indicate non-adjacent sub-channel channel allocation, such non-adjacent sub-channel allocation of FIG. 2C, in an embodiment.

In an embodiment, the OFDMA sub-channel allocation field 600 indicates to a client station 25 one or more OFDMA groups to which the client station 25 has been assigned by the AP 14, and, for each of the one or more OFDMA groups, indicates which sub-channel block or which sub-channel blocks is/are allocated to the client station 25 within the OFDMA group. The OFDMA sub-channel allocation field 600 includes an association identifier (AID) subfield 602, one or more group identifier (Group ID) subfields 604, and corresponding one or more sub-channel bitmap subfields 606, in the illustrated embodiment. The AID subfield 602 includes at least a partial association identifier associated with a client station 25, and each of the one or more group ID subfields 604 includes an identifier of a group to which the client station 25 identified by the AID subfield 602 is assigned, in an embodiment. Further, each corresponding sub-channel allocation bitmap subfield 606 includes a bitmap that indicates which sub-channel block(s) are allocated to the client station 25 within the group identified by the corresponding group ID subfield 604, in an embodiment. In an embodiment, each bit of a bitmap subfield 606 corresponds to a particular sub-channel block, and indicates whether the particular sub-channel block is allocated to the client station 25 within the group identified by the corresponding group ID subfield 604. As an example, a value of logic one (1) of a bit of the bitmap sub-field 606 indicates that the corresponding sub-channel block is allocated to the client station 25 with the group, while a value of logic one (0) of a bit of the bitmap sub-field 606 indicates that the corresponding sub-channel block is not allocated to the client station 25 within the group, or vice versa, in an embodiment. In an embodiment, the number of group ID subfields 604, and the corresponding number of bitmap subfields 606, included in the OFDMA sub-channel allocation field 600 corresponds to the number of OFDMA groups to which the client station 25 identified by the AID subfield 602 has been assigned.

In an embodiment, each bitmap subfield 606 includes a number of bits that corresponds to the number of sub-channel blocks in the communication channel for which the group definition field 600 is generated. Thus, for example, for a 160 MHz channel sub-divided into 5 MHz sub-channel blocks, each bitmap subfield 606 includes 32 bits, in an embodiment. As another example, for a 160 MHz channel sub-divided into 10 MHz sub-channel blocks, each bitmap subfield 606 includes 16 bits, in an embodiment. As still another example, in another embodiment, for a 160 MHz channel sub-divided into 20 MHz sub-channel blocks, each bitmap subfield 606 includes 8 bits. In other embodiments, the bitmap subfields 606 are used with other suitable channel bandwidths and/or other suitable sub-channel blocks, and/or each of the bitmap subfields 606 includes other suitable number of bits. Further, the OFDMA sub-channel allocation field 600 indicates sub-channel allocation in a suitable manner other than a bitmap, in some embodiments.

Figure 6B:
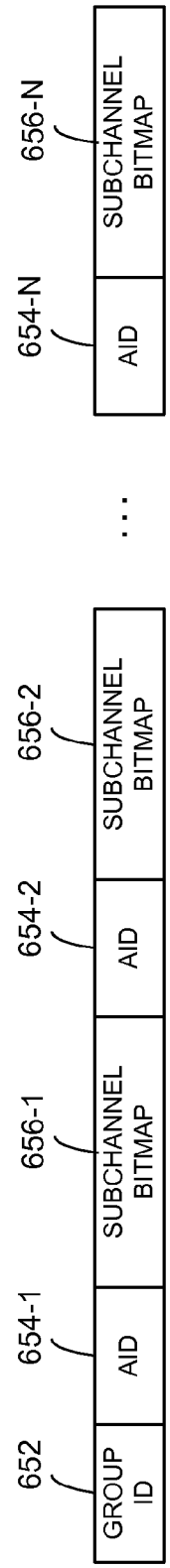
FIG. 6B is a diagram of an OFDMA sub-channel allocation field, according to another embodiment.

FIG. 6B is a diagram of an OFDMA sub-channel allocation field 650, according to an embodiment. The OFDMA sub-channel allocation field 650 is used in some embodiments in which static or semi-dynamic OFDMA sub-channel allocation is used to allocate one or more sub-channel blocks to client stations 25 within a group of client stations 25. In an embodiment, one or more OFDMA sub-channel allocation fields such as the OFDMA sub-channel allocation field 650 are included in a management frame (e.g., a group management frame or a sub-channel management frame) that the AP 14 transmits to client stations 25 within one or more groups of client stations 25 to provide user grouping and channel allocation information to the client stations 25. In an embodiment, the AP 14 transmits a management frame (e.g., a group management frame) that includes the OFDMA sub-channel allocation field 650 each time an OFDMA group is formed by the AP 14 and/or each time one or more members of an OFDM group are removed from the OFDMA group and/or one or more new members are added to the OFDMA group. In an embodiment, the AP 14 additionally or alternatively transmits a management frame (e.g., a sub-channel allocation management frame) that includes the OFDMA sub-channel allocation field 650 each time sub-channels are re-allocated among the members of the OFDMA group. The OFDMA sub-channel allocation field 650 is used to indicate non-adjacent sub-channel channel allocation, such non-adjacent sub-channel allocation of FIG. 2C, in an embodiment.

In an embodiment, the OFDMA sub-channel allocation field 650 indicates to client stations 25 assigned to an OFDMA group that the client stations 25 are members of the OFDMA group and which OFDMA sub-channel block(s) are allocated to each of the client stations 25 within the OFDMA group. The OFDMA sub-channel allocation field 650 includes a group identifier (Group ID) subfields 652, one or more AID subfields 654, and corresponding one or more sub-channel bitmap subfields 656, in the illustrated embodiment. In an embodiment, the group ID subfields 652 includes an identifier of an OFDMA group, and each of the AID sub-fields 654 includes at least a partial AID associated with a respective client station 25 assigned to the OFDMA group identified by the group ID subfield 652. Further, each corresponding sub-channel allocation bitmap subfield 656 includes a bitmap that indicates which one or more sub-channel blocks are allocated to the client station 25 within the group identified by the group ID subfield 652, in an embodiment. In an embodiment, each bit of a bitmap subfield 656 corresponds to a particular sub-channel block, and indicates whether the particular sub-channel block is allocated to the client station 25 within the group identified by the group ID subfield 652. As an example, a value of logic one (1) of a bit of the bitmap sub-field 656 indicates that the corresponding sub-channel block is allocated to the client station 25 with the group, while a value of logic one (0) of a bit of the bitmap sub-field 656 indicates that the corresponding sub-channel block is not allocated to the client station 25 within the group, or vice versa, in an embodiment. In an embodiment, the number of the AID subfields 654, and the number of corresponding bitmap subfields 656, included in the OFDMA sub-channel allocation field 650 corresponds to the number of client stations 25 assigned to the OFDMA group identified by the group ID subfield 652.

In an embodiment, each bitmap subfield 656 includes a number of bits that corresponds to the number of sub-channel blocks in the communication channel for which the OFDMA sub-channel allocation field 650 is generated. Thus, for example, for a 160 MHz channel sub-divided into 5 MHz sub-channel blocks, each bitmap subfield 606 includes 32 bits, in an embodiment. Further, in an embodiment, the OFDMA sub-channel allocation field 650 is configured to support a maximum number of OFDMA group members, which corresponds to the number of sub-channel blocks in the communication channel for which the OFDMA sub-channel allocation field 650 is generated. Accordingly, the number of bitmap subfields 656 included in the OFDMA sub-channel allocation field 650 corresponds to the number of sub-channel blocks in the communication channel, in this embodiment. Accordingly, continuing with the example 160 MHz channel sub-divided into 5 MHz sub-channel blocks, the OFDMA sub-channel allocation 650 includes 32 bitmap subfields 656 collectively spanning 1024 bits, or 128 bytes, in an embodiment.

As another example, for a 160 MHz channel sub-divided into 10 MHz sub-channel blocks, the OFDMA sub-channel allocation field 650 includes 16 bitmap subfields 656, and each bitmap subfield 656 includes 16 bits, in an embodiment. Accordingly, the bitmap subfields 656 collectively span 256 bits, or 32 bytes, in this embodiment. As yet another example, for a 160 MHz channel sub-divided into 20 MHz sub-channel blocks, the OFDMA sub-channel allocation field 650 includes 8 bitmap subfields 656, and each bitmap subfield 656 includes 8 bits, in an embodiment. Accordingly, the bitmap subfields 656 collectively span 64 bits, or 8 bytes, in this embodiment. In other embodiments, the bitmap subfields 656 are used with other suitable channel bandwidths and/or other suitable sub-channel blocks, and/or each of the bitmap subfields 656 includes other suitable number of bits. Similarly, the OFDMA sub-channel allocation field 650 is configured to support other suitable numbers of OFDMA users that is less than or greater than the number of OFDMA sub-channel in the communication channel, in some embodiments. Further, the OFDMA sub-channel allocation field 650 indicates sub-channel allocation in a suitable manner other than a bitmap, in some embodiments.

Figure 6C:
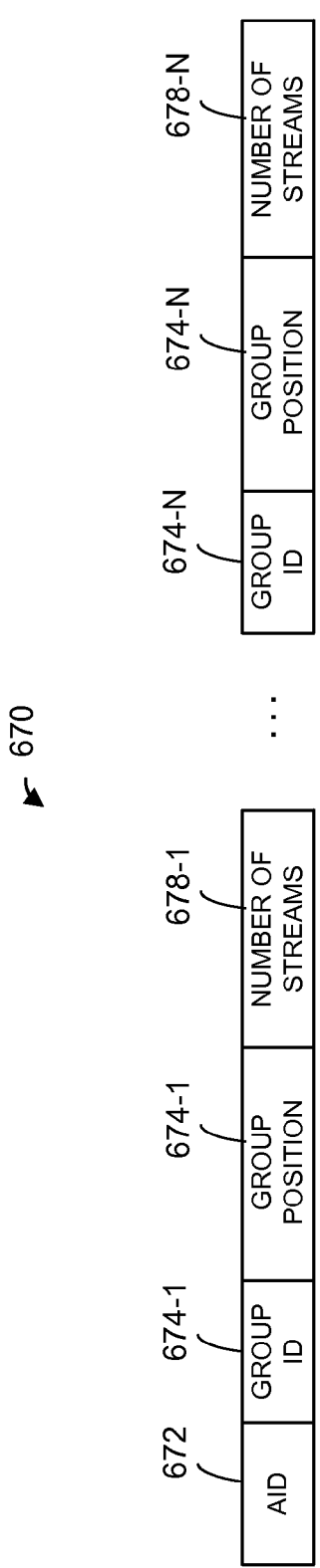
FIG. 6C is a diagram of an MU MIMO spatial stream allocation field, according to an embodiment.

FIG. 6C is a diagram of an MU MIMO spatial stream allocation field 670, according to an embodiment. The MU MIMO spatial stream allocation field 670 is used in some embodiments in which static or semi-dynamic spatial stream allocation is used to allocate one or more spatial streams to a client station 25 within one or more MU MIMO groups of client stations 25. In an embodiment, one or more MU MIMO spatial stream allocation fields such as the MU MIMO spatial stream allocation field 670 are included in a management frame (e.g., a group management frame) that the AP 14 transmits to one or more client stations 25 to provide user grouping and spatial stream allocation information to the one or more client stations 25. In an embodiment, the AP 14 transmits a management frame (e.g., a group management frame) that includes the MU MIMO spatial stream allocation field 670 each time an MU MIMO group is formed by the AP 14 and/or each time one or more members of an MU MIMO group are removed from the OFDMA group and/or one or more new members are added to the MU MIMO group. In an embodiment, the AP 14 additionally or alternatively transmits a management frame (e.g., a spatial stream allocation management frame) that includes the MU MIMO spatial stream allocation field 670 each time spatial streams are re-allocated among the members of the MU MIMO group.

In an embodiment, the MU MIMO spatial stream allocation field 670 indicates to a client station 25 one or more MU MIMO groups to which the client station 25 has been assigned by the AP 14, and, for each of the one or more MU MIMO groups, indicates which spatial stream or spatial streams is/are allocated to the client station 25 within the MU MIMO group. The MU MIMO spatial stream allocation field 670 includes an association identifier (AID) subfield 672, one or more group identifier (Group ID) subfields 674, corresponding one or more group position subfields 676, and corresponding one or more number of stream indication subfields 678 in the illustrated embodiment. The AID subfield 672 includes at least a partial association identifier associated with a client station 25, and each of the one or more group ID subfields 674 includes an identifier of a group to which the client station 25 identified by the AID subfield 672 is assigned, in an embodiment. Each corresponding group position subfield 676 indicates a position, or a sequence number, of the client station 25 identified by the AID subfield 672 within the group identified by the corresponding group ID subfield 674, in an embodiment. Each corresponding number of streams indication subfield 678 includes an indication of a number of spatial streams allocated to the client station 25 within the group identified by the corresponding group ID subfield 674, in an embodiment.

Figure 6D:
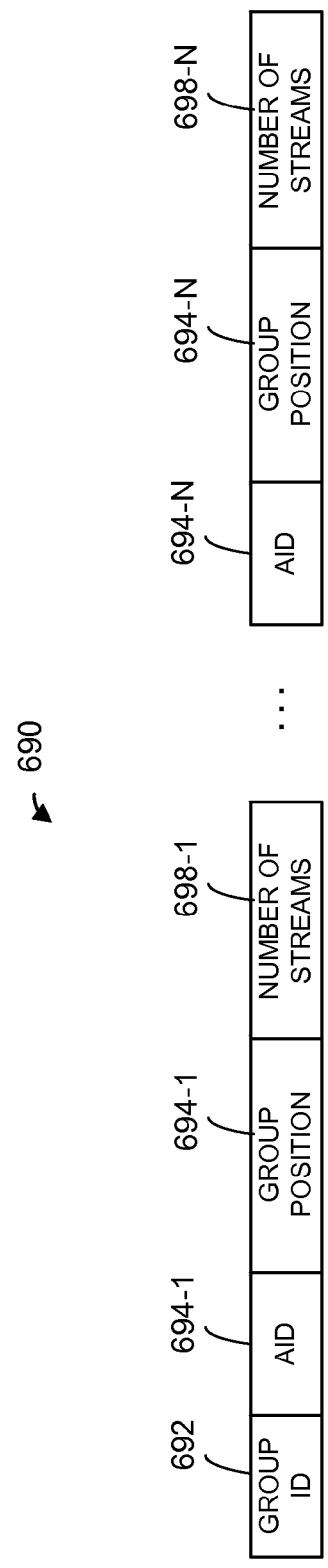
FIG. 6D is a diagram of an MU MIMO spatial stream allocation field, according to another embodiment.

FIG. 6D is a diagram of an MU MIMO spatial stream allocation field 690, according to an embodiment. The MU MIMO spatial stream allocation field 690 is used in some embodiments in which static or semi-dynamic spatial stream allocation is used to allocate one or more spatial streams to a client station 25 within one or more groups of client stations 25. In an embodiment, one or more MU MIMO spatial stream allocation fields such as the MU MIMO spatial stream allocation field 690 is included in a management frame (e.g., a group management frame) that the AP 14 transmits to one or more client stations 25 to provide user grouping and spatial stream allocation information to the one or more client stations 25. In an embodiment, the AP 14 transmits a management frame (e.g., a group management frame) that includes the MU MIMO spatial stream allocation field 690 each time an MU MIMO group is formed by the AP 14 and/or each time one or more members of an MU MIMO group are removed from the MU MIMO group and/or one or more new members are added to the MU MIMO group. In an embodiment, the AP 14 additionally or alternatively transmits a management frame (e.g., a spatial stream allocation management frame) that includes MU MIMO spatial stream allocation field 690 each time spatial streams are re-allocated among the members of the MU MIMO group.

In an embodiment, the MU MIMO spatial stream allocation field 690 indicates to client stations 25 assigned to an MU MIMO group that the client stations 25 are members of the MU MIMO group and which spatial stream or spatial streams is/are allocated to the client stations 25 within the MU MIMO group. The MU MIMO spatial stream allocation field 690 includes a group identifier (Group ID) subfields 692, one or more AID subfields 694, corresponding one or more group position subfields 696, and corresponding one or more number of stream indication subfields 698, in the illustrated embodiment. In an embodiment, the group ID subfield 692 includes an identifier of an MU MIMO group, and each of the AID sub-fields 694 includes at least a partial AID associated with a respective client station 25 assigned to the MU MIMO group identified by the group ID subfield 692. Each corresponding group position subfield 676 indicates a position, or a sequence number, of the client station 25 identified by the AID subfield 672 within the group identified by the corresponding group ID subfield 674, in an embodiment. Each corresponding number of streams indication subfield 678 includes an indication of a number of spatial streams allocated to the client station 25 within the group identified by the corresponding group ID subfield 674, in an embodiment.

FIG. 7A is a diagram of an OFDMA sub-channel allocation field 700, according to an embodiment. The OFDMA sub-channel allocation field 700 is used in some embodiments in which static or semi-dynamic OFDMA sub-channel allocation is used to allocate one or more sub-channels to a client station 25 within one or more groups of client stations 25. In an embodiment, one or more OFDMA sub-channel allocation fields such as the OFDMA sub-channel allocation field 700 are included in a management frame (e.g., a group management frame or a sub-channel management frame) that the AP 14 transmits to one or more client stations 25 to provide user grouping and channel allocation information to the one or more client stations 25. In an embodiment, the AP 14 transmits a management frame (e.g., a group management frame) that includes the OFDMA sub-channel allocation field 700 each time an OFDMA group is formed by the AP 14 and/or each time one or more members of an OFDM group are removed from the OFDMA group and/or one or more new members are added to the OFDMA group. In an embodiment, the AP 14 additionally or alternatively transmits a management frame (e.g., a sub-channel allocation management frame) that includes the OFDMA sub-channel allocation field 700 each time sub-channels are re-allocated among the members of the OFDMA group. The OFDMA sub-channel allocation field 700 is used to indicate adjacent sub-channel channel allocation, such as adjacent sub-channel allocation of FIG. 2A, in an embodiment.

In an embodiment, the OFDMA sub-channel allocation field 700 indicates to a client station 25 one or more OFDMA groups to which the client station 25 has been assigned by the AP 14, and, for each of the one or more OFDMA groups, indicates which sub-channel(s) are allocated to the client station 25 within the OFDMA group. The OFDMA sub-channel allocation field 700 includes an association identifier (AID) subfield 702, one or more group identifier (Group ID) subfields 604, and corresponding one or more channel start subfields 706 and bandwidth subfields 708, in the illustrated embodiment. The AID subfield 702 includes at least a partial association identifier associated with a client station 25, and each of the one or more group ID subfields 704 includes an identifier of a group to which the client station 25 identified by the AID subfield 702 is assigned, in an embodiment. Further, each corresponding channel start subfield 706 indicates a beginning location of the adjacent one or more sub-channel blocks (e.g., first sub-channel block) allocated to the client station 25 within the group identified by the group ID subfield 704, and each corresponding bandwidth subfield 708 indicates the bandwidth allocated to the client station 25 within the group.

FIG. 7B is a diagram of an OFDMA sub-channel allocation field 750, according to an embodiment. The OFDMA sub-channel allocation field 750 is used in some embodiments in which static or semi-dynamic OFDMA sub-channel allocation is used to allocate one or more sub-channels to a client station 25 within one or more groups of client stations 25. In an embodiment, one or more OFDMA sub-channel allocation fields such as the OFDMA sub-channel allocation field 750 are included in a management frame (e.g., a group management frame or a sub-channel management frame) that the AP 14 transmits to one or more client stations 25 to provide user grouping and channel allocation information to the one or more client stations 25. In an embodiment, the AP 14 transmits a management frame (e.g., a group management frame) that includes the OFDMA sub-channel allocation field 750 each time an OFDMA group is formed by the AP 14 and/or each time one or more members of an OFDM group are removed from the OFDMA group and/or one or more new members are added to the OFDMA group. In an embodiment, the AP 14 additionally or alternatively transmits a management frame (e.g., a sub-channel allocation management frame) that includes the OFDMA sub-channel allocation field 750 each time sub-channels are re-allocated among the members of the OFDMA group. The OFDMA sub-channel allocation field 750 is used to indicate adjacent sub-channel channel allocation, such as adjacent sub-channel allocation of FIG. 2A, in an embodiment.

In an embodiment, the OFDMA sub-channel allocation field 750 indicates to client stations 25 assigned to an OFDMA group that the client stations 25 are members of the OFDMA group and which OFDMA sub-channels are allocated to each client station 25 within the OFDMA group. The OFDMA sub-channel allocation field 750 includes a group identifier (Group ID) subfields 752, one or more AID subfields 754, and corresponding one or more bandwidth sub-fields 756, in the illustrated embodiment. In an embodiment, the group ID subfields 752 includes an identifier of an OFDMA group, and each of the AID sub-fields 754 includes at least a partial AID associated with a respective client station 25 assigned to the OFDMA group identified by the group ID subfield 752. Further, each corresponding bandwidth subfield indicates a bandwidth allocated to the client station 25 within the group indicated by the group ID subfield 752. In an embodiment, the AID subfields 754 are arranged in an order corresponding to the order of sub-channels allocated to the client stations 25 associated with the AIDs. Thus, at least a partial AID associated with the client station 25 to which the AP 14 has allocated one or more lowest frequency sub-channel blocks is included in the first AID sub-field 754-1, at least a partial AID associated with the client station 25 to which the AP 14 has allocated one or more next lowest frequency sub-channel blocks is included in the second AID sub-field 754-2, and so on, in an embodiment. Accordingly, a respective indication of a starting locations of the one or more sub-channels allocated to each client station 25 is not necessarily needed, and is omitted from the OFDMA sub-channel allocation field 750, in the illustrated embodiment. Each client station 25 determines the starting location of the one or more sub-channels allocated to the client station 25 based on the placement of the AID field 754 that identifies the client station 25 and based on bandwidths indicated for other client station or client stations 25 indicated by BW sub-fields 756 that precede the AID subfield corresponding to the current client station 25, if any, in an embodiment.

In some embodiments that utilize dynamic or semi-dynamic allocation, upon forming one or more groups of client stations 25, the AP 14 designates a respective primary sub-channel block to each member of the group, and the primary sub-channel block designated to a member of the group remains allocated to the member for life duration of the group. The AP 14 then dynamically or semi-dynamically allocates the remaining sub-channel blocks to the members of the group. In some other embodiments, however, the AP 14 dynamically or semi-dynamically allocates all available sub-channel blocks among the member of the group, without necessarily assigning any sub-channel block for persistent use by any particular member of the group.

Figure 8A:
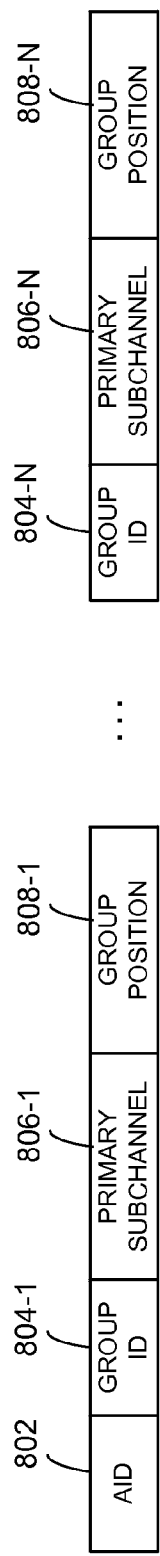
FIGS. 8A-8B are diagrams of group management fields, according to some embodiments.

FIG. 8A is a diagram of a group management field 800, according to an embodiment. The group management field 800 is used in some embodiments in which dynamic or semi-dynamic OFDMA sub-channel allocation is used to allocate sub-channels to client stations 25 within one or more groups of client stations 25. In an embodiment, one or more group management fields such as the group management field 800 are included in a management frame (e.g., a group management frame or a sub-channel management frame) that the AP 14 transmits to one or more client stations 25 to provide user grouping and primary channel allocation information to the one or more client stations 25. In an embodiment, the AP 14 transmits a management frame (e.g., a group management frame) that includes the group management field 800 each time an OFDMA group is formed by the AP 14 and/or each time one or more members of an OFDM group are removed from the OFDMA group and/or one or more new members are added to the OFDMA group. In an embodiment, the AP 14 additionally or alternatively transmits a management frame (e.g., a sub-channel allocation management frame) that includes the group management field 800 each time primary sub-channels are re-allocated among the members of the OFDMA group. The group management field 800 is used to indicate non-adjacent sub-channel channel allocation, such non-adjacent sub-channel allocation of FIG. 2C, in an embodiment.

In an embodiment, the group management field 800 indicates to a client station 25 one or more OFDMA groups to which the client station 25 has been assigned by the AP 14, and, for each of the one or more OFDMA groups, indicates a primary sub-channel block that is statically, or persistently, allocated to the client station 25 within each OFDMA group. The group management field 800 includes an association identifier (AID) subfield 802, one or more group identifier (Group ID) subfields 804, corresponding one or more primary sub-channel block indication subfields 806, and corresponding one or more group position subfields 808, in the illustrated embodiment. The AID subfield 802 includes at least a partial association identifier associated with a client station 25, and each of the one or more group ID subfields 804 includes an identifier of a group to which the client station 25 identified by the AID subfield 802 is assigned, in an embodiment. Further, each corresponding primary sub-channel block indication subfields 806 indicates a primary sub-channel block allocated to the client station 25 within the group identified by the corresponding group ID subfield 804, in an embodiment. Similarly, each corresponding group position subfield 808 indicates a position, or a sequence number, of the client station 25 identified by the AID subfield 802 within the group identified by the corresponding group ID subfield 804, in an embodiment.

Figure 8B:
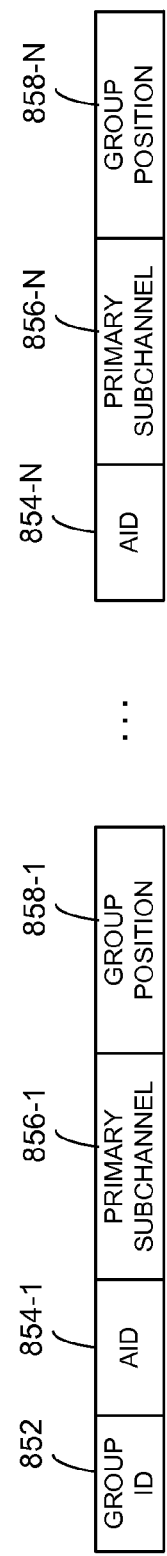

FIG. 8B is a diagram of a group management field 850, according to an embodiment. The group management field 850 is used in some embodiments in which dynamic or semi-dynamic OFDMA sub-channel allocation is used to allocate sub-channel blocks to client stations 25 within one or more groups of client stations 25. In an embodiment, one or more group management fields such as the group management field 850 are included in a management frame (e.g., a group management frame or a sub-channel management frame) that the AP 14 transmits to one or more client stations 25 to provide user grouping and primary channel allocation information to the one or more client stations 25. In an embodiment, the AP 14 transmits a management frame (e.g., a group management frame) that includes the group management field 850 each time an OFDMA group is formed by the AP 14 and/or each time one or more members of an OFDM group are removed from the OFDMA group and/or one or more new members are added to the OFDMA group. In an embodiment, the AP 14 additionally or alternatively transmits a management frame (e.g., a sub-channel allocation management frame) that includes the group management field 850 each time primary sub-channels are re-allocated among the members of the OFDMA group. The group management field 850 is used to indicate non-adjacent sub-channel channel allocation, such non-adjacent sub-channel allocation of FIG. 2C, in an embodiment.

In an embodiment, the group management field 850 indicates to client stations 25 assigned to an OFDMA group that the client stations 25 are members of the OFDMA group, and further indicates a respective primary sub-channel block assigned to each client station 25 within the group. The group management field 850 includes a group identifier (Group ID) subfields 852, one or more AID subfields 654, corresponding one or more primary sub-channel block indication subfields 856, and corresponding one or more channel position subfields 858, in the illustrated embodiment. In an embodiment, the group ID subfield 652 includes an identifier of an OFDMA group, and each of the AID sub-fields 854 includes at least a partial AID associated with a respective client station 25 assigned to the OFDMA group. Further, each corresponding primary channel indication subfields 856 indicates a primary sub-channel block allocated to the client station 25 within the group identified by the corresponding group ID subfield 854, in an embodiment. Similarly, each corresponding group position subfield 858 indicates a position, or a sequence number, of the client station 25 identified by the AID subfield 854 within the group identified by the corresponding group ID subfield 852, in an embodiment.

Figures 9A, 9B:
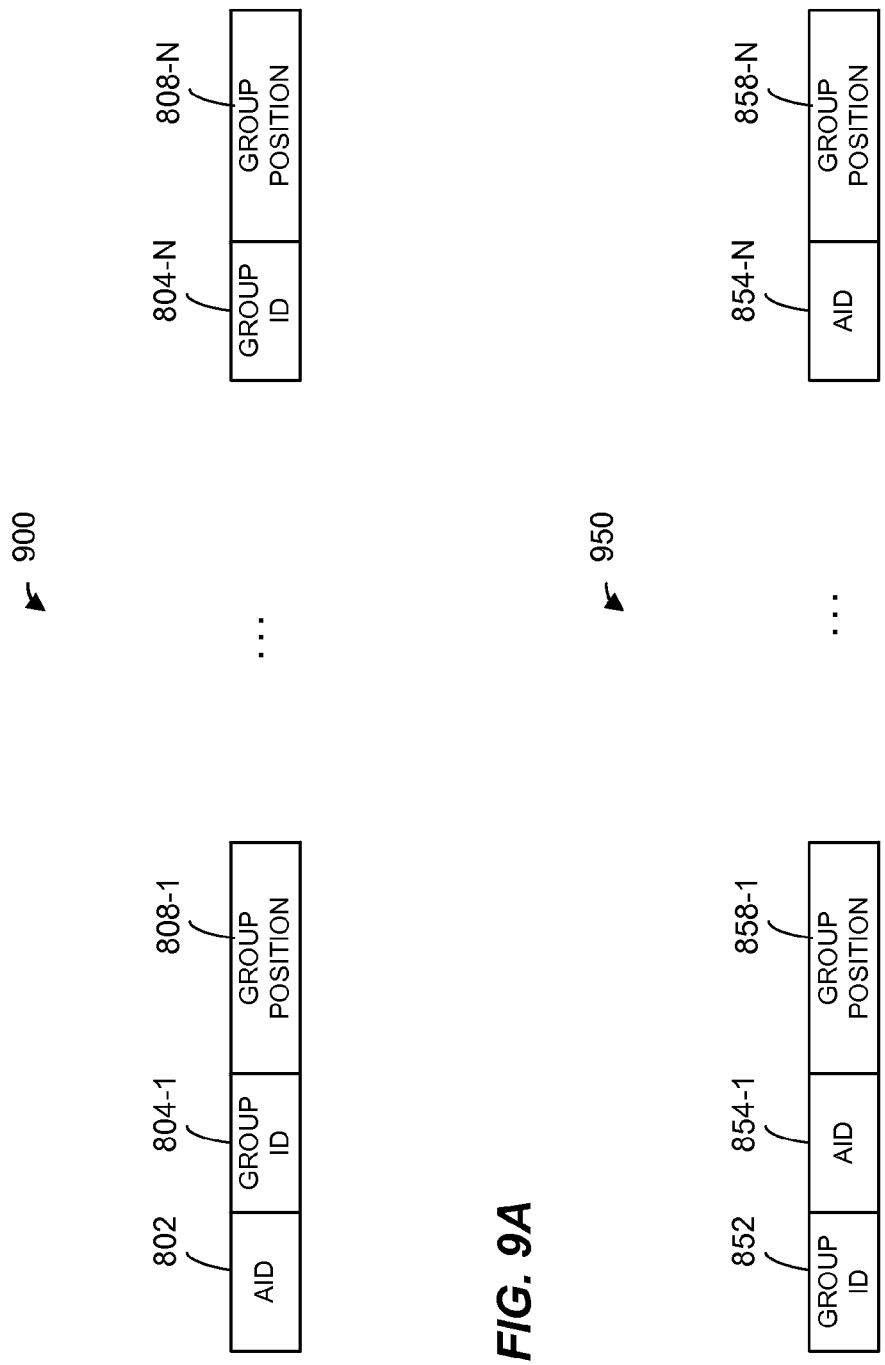
FIGS. 9A-9B are diagrams of group management fields, according to some other embodiments.

FIGS. 9A-9B are diagrams of group management fields 900, 950, according to several embodiments. A group management field such as the group management field 900 or the group management field 950 is used in some embodiments in which dynamic or semi-dynamic OFDMA sub-channel allocation is used to allocate sub-channels to client stations 25 within one or more OFDMA groups of client stations 25. Similarly, a group management field such as the group management field 900 or the group management field 950 is used in some embodiments in which dynamic or semi-dynamic spatial stream allocation is used to allocate spatial streams to client stations 25 within one or more MU MIMO groups of client stations 25. In an embodiment, one or more group management fields such as the group management field 900 or the group management field 950 are included in a management frame (e.g., a group management frame or a sub-channel management frame) that the AP 14 transmits to one or more client stations 25 to provide group information to the one or more client stations 25. In an embodiment, the AP 14 transmits a management frame (e.g., a group management frame) that includes a group management field such as the group management field 900 or the group management field 950 each time an OFDMA group, or MU MIMO group, is formed by the AP 14 and/or each time one or more members of an OFDM group are removed from the OFDMA group and/or one or more new members are added to the OFDMA group. In an embodiment, the AP 14 additionally or alternatively transmits a management frame (e.g., a sub-channel allocation management frame) that includes a group management field such as the group management field 900 or the group management field 950 each time primary sub-channels are re-allocated among the members of the OFDMA group. A group management field such as the group management field 900 or the group management field 950 is used to indicate non-adjacent sub-channel channel allocation, such non-adjacent sub-channel allocation of FIG. 2C, in an embodiment.

The group management fields 900 and 950 are similar to the group management fields 800 and 850 of FIGS. 8A-8B and include like-numbered elements with the group management fields 800 and 850, respectively, in an embodiment. However, the group management fields 900, 950 are used in embodiments and/or scenarios in which the AP 14 dynamically allocates sub-channels to client stations 25 in an OFDMA group without assigning primary sub-channels to the client stations 25 in the OFDMA group, to indicate group membership and group position to members of the OFDMA group. Accordingly, the group management fields 900, 950 omit primary sub-channel subfields, in the illustrated embodiment. Similarly, the group management fields 900, 950 are used in embodiments and/or scenarios in which the AP 14 dynamically allocates spatial streams to client stations 25 in an MU MIMO group, to indicate group membership and group position to members of the MU MIMO group, in some embodiments.

Figure 10:
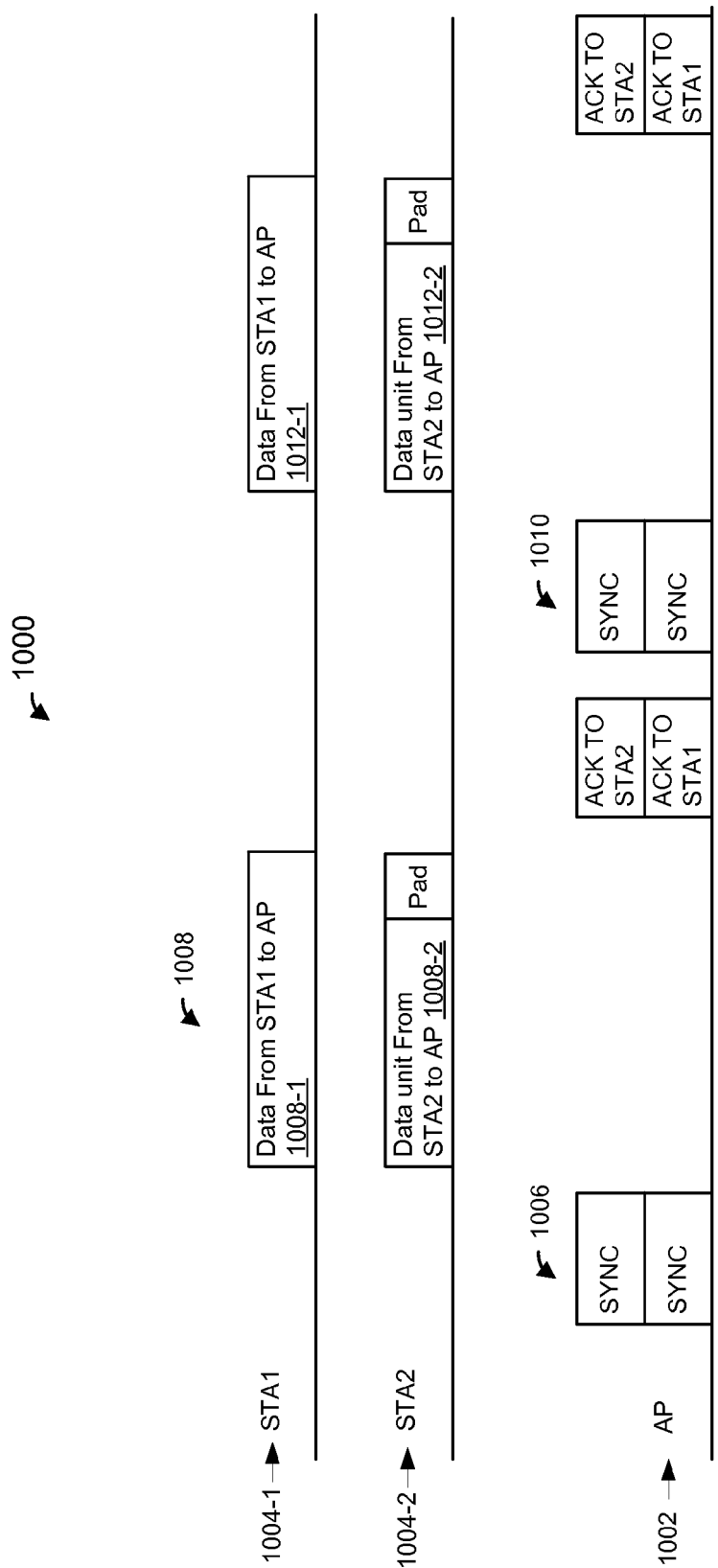
FIG. 10 is diagram illustrating a frame exchange between an AP and a plurality of client stations, according to an embodiment.

FIG. 10 is diagram illustrating a frame exchange 1000 between an AP and a plurality of client stations during a transmit opportunity (TxOP) obtained or scheduled for uplink OFDMA transmission by a plurality of client stations 1004 to an AP 1002, according to an embodiment. In particular, during the schedule or obtained TxOP, the AP 1002 receives one or more OFDMA data units, each including OFDM data unit simultaneously transmitted by a plurality of client stations 1004, including a first client station STA1 1004-1 and a second client station STA2 1004-2, in the illustrated embodiment. With reference to FIG. 1, the AP 1002 corresponds to the AP 14 and the client stations 1004 correspond to different ones of the client stations 25, in an embodiment.

In an embodiment, at the beginning of the TXoP, the AP 1002 transmits a synchronization (SYNC) frame 1006 to the plurality of client stations 1004. In some embodiments, a SYNC frame is transmitted in each smallest bandwidth OFDM channel (e.g., each 20 MHZ OFDM channel) of the network, such as the WLAN 10 in FIG. 1, in which the AP 1002 communicates with the client stations 1004. For example, the SYNC frame 1006 is duplicated in each smallest bandwidth OFDM channel of the network, in an embodiment. Further, as will be explained in more detail below, in another embodiment, such as in an embodiment in which different ones of the smallest bandwidth OFDM channels cover different primary sub-channels allocated to different client stations 1004, different SYNC frames 1006 are transmitted in the different smallest bandwidth OFDM channels, each SYNC frame 1006 directed to the specific client stations 1004 with allocated primary sub-channels covered by the corresponding smallest bandwidth OFDM channel.

In an embodiment, transmission of the SYNC frame 1006 is subsequent to transmission of a group management frame and/or a sub-channel allocation frame, such as one of the group management frames and/or one of the sub-channel allocation frames described above. For example, in some embodiments in which static or semi-dynamic allocation is utilized to allocate respective sub-channel blocks to the client stations 1004, the SYNC frame is transmitted subsequent to transmission of a group management frame that includes a group management field such the group management field 600 of FIG. 6A, the group management field 650 of FIG. 6B, the group management field 700 of FIG. 7A, or the group management field 750 of FIG. 7B. In such embodiments, the SYNC frame 1006 prompts the client stations 1004 to transmit one or more OFDM data units to the AP 14 as part of an OFDMA transmission to the AP 14, wherein respective OFDM data units are to be transmitted by the client stations 1004 in respective sub-channel blocks allocated to the client stations 1004 as indicated by a group management frame and/or sub-channel allocation frame previously transmitted to the client stations 1004 by the AP 1002. In one such embodiment, the SYNC frame 1002 includes a group ID field that includes a group ID corresponding to a group that includes the client station 1004-1 and the client station 1004-2, as indicated to the client stations 1004-1 and 1002-2 by the group management frame previously transmitted to the client stations 1004-1 and 1004-2.

As another example, in some embodiments in which dynamic or semi-dynamic allocation is utilized to allocate respective sub-channels to the client stations 1004, the SYNC frame is transmitted subsequent to transmission of a group management frame that includes a group management field such the group management field 800 of FIG. 8A, the group management field 850 of FIG. 8B, the group management field 900 of FIG. 9A, or the group management field 950 of FIG. 9B. In such embodiments, the SYNC frame 1002 includes a sub-channel allocation field, such as the sub-channel allocation field 650 of FIG. 6B or the sub-channel allocation field 750 of FIG. 7B, wherein the group ID subfield (e.g., the group ID subfield 652 in FIG. 6B or the group ID subfield 752 in FIG. 7B) includes the group ID indicated to the client stations 1004-1 and 1004-2 by the group management frame previously transmitted to the client stations 1004-1 and 1004-2, in an embodiment. In some such embodiments, the sub-channel allocation field in the SYNC frame 1002 omits AID subfields that identify the client stations 1004-1 and 1004-2. For example, the sub-channel allocation field 650, when included in the SYNC frame 1002, omits the AID subfields 654, in some embodiments. As another example, the sub-channel allocation field 750, when included in the SYNC frame 1002, omits the AID subfields 754, in some embodiments. In such embodiments, the client station 1004-1, 1004-2 identifies allocation sub-fields directed to the client station 1004-1, 1004-2 based on a position of the client station 1004-1, 1004-2 within the group. For example, client station 1004-1, 1004-2 identifies allocation sub-fields directed to itself based on a position, or a sequence, indicator provided to the client station 1004-1, 1004-2 by the group management frame previously transmitted to the client station 1004-1, 1004-2 (e.g., the corresponding group position indicator 808 in FIGS. 8A, 9A or the corresponding group position indicator 858 in FIG. 8B, 9B), in an embodiment.

In some embodiments, the SYNC frame 1006, in addition to identifying a group of client stations that includes the client stations 1004-1, 1004-2, and, in some cases, providing sub-channel allocation to the client stations 1004-1, 1004-2, the SYNC frame 1002 includes one or more of (i) an indication of a length of a data unit to be transmitted as part of the OFDMA transition to the A 1002, (ii) an indication of a number of OFDMA transmissions that can follow the SYNC frame 1006 during the TXoP corresponding to the SYNC frame 1006, and (iii) an indication of whether or not a client station 1004-1, 1004-2 can transmit an uplink data unit in a portion of the sub-channel allocated to the client station 1004-1, 1004-2 in case that the other portion of the sub-channel allocated to the client station 1004-1, 1004-2 is not available for transmission (e.g., due to busy medium).

In response to receiving the SYNC frame 1006, the client stations 1004-1, 1004-2 transmit OFDM data units 1008 to the AP 1002 as parts of an OFDMA transmission to the AP 1002. In an embodiment, if a client station 1004 wishes to transmit an OFDM data unit having a shorter length than the length indicated in the SYNC frame 1006 pads the data unit (e.g., adds padding bits after the end of data in the data unit) to ensure that the length of the transmitted data unit corresponds to the length indicated by the SYNC frame 1006. For example, the client station 1004-2 adds padding to the data unit 1008-2 to ensure that the length of the data unit 1008-2 corresponds to the length indicated by the SYNC frame 1006, in the illustrated embodiment.

After receiving the OFDMA transmission that includes the OFDM data units 1008, the AP 1002 transmits acknowledgement (Ack) frames or block acknowledgement (BlkAck) frames to the client stations 1004 to acknowledge successful reception of the OFDM data units 1006, in an embodiment. The AP 1002 then transmits a second SYNC frame 1010 to the client stations 1004 to prompt the client stations 1004 to transmit a second OFDMA transmission to the AP 1002, in an embodiment. The second SYNC frame 1010 is the same as or different from the initial SYNC frame 1006, in various embodiments. In response to receiving the SYNC frame 1100, the client stations 1004-1, 1004-2 transmit OFDM data units 1012 to the AP 1002 as parts of a second OFDMA transmission to the AP 1002. In another embodiment, for example, when the SYNC frame 1006 includes an indication of a number (e.g., 2) of OFDMA transmissions that can follow the SYNC frame 1006 during the TXoP corresponding to the SYNC frame 1006, transmission of the second SYNC frame 1010 is omitted from the frame exchange 1000. In this embodiment, the client stations 1004 transmit the second OFDM data units 1012 without being prompted by the AP 1002. In either case, reception of the OFDMA transmission that includes the OFDM data units 1012 is followed by transmission of acknowledgement (Ack) frames or block acknowledgement (BlkAck) frames to the client stations 1004 to acknowledge successful reception of the OFDM data units 1012, in an embodiment.

In an embodiment, client stations 1004-1, 1004-2 receive the SYNC frame 1006 in the primary smallest bandwidth channel (e.g., the primary 20 MHZ OFDM channel) of the network in which the AP 1002 communicates with the client stations 1004 (such as the network 10 in FIG. 1). In another embodiment, such as in an embodiment in which sub-channel selective transmission (SST) and target wakeup time (TWT) and/or restricted access window (RAW) techniques are utilized to indicate to the client stations 1004-1, 1004-2 the scheduled time at which to expect transmission of the SYNC frame 1006 and respective sub-channels in which to receive the SYNC frame 1006, the client stations 1004-1, 1004-2 receive respective SYNC frames 1006 in the respective sub-channels indicated to the client stations 1004-1, 1004-2. In such embodiments, OFDMA communication with a client station 1004 that operates in a non-primary sub-channel is indicated for reception of the SYNC frame 1006 can occur even when the primary channel of the network is not available for transmission (e.g., due to busy medium).

Figure 11:
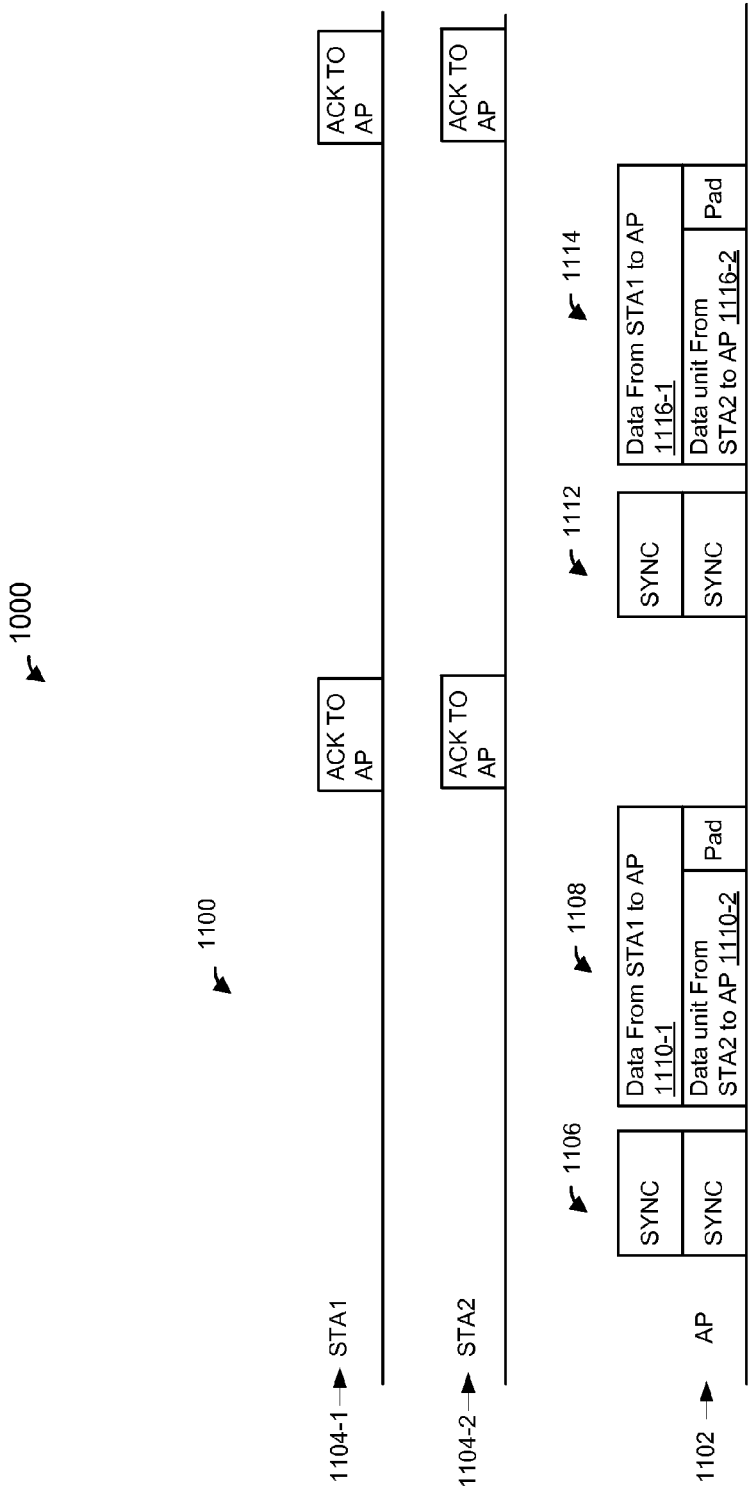
FIG. 11 is diagram illustrating a frame exchange between an AP and a plurality of client stations, according to another embodiment.

FIG. 11 is diagram illustrating a frame exchange 1100 between an AP and a plurality of client stations during a transmit opportunity (TxOP) obtained or scheduled for downlink OFDMA transmission to a plurality of client stations 1104 from an AP 1102, according to an embodiment. In particular, during the schedule or obtained TxOP, the AP 1102 transmits one or more OFDMA data units, each including OFDM data unit simultaneously transmitted to a plurality of client stations 1104, including a first client station STA1 1104-1 and a second client station STA2 1104-2, in the illustrated embodiment. With reference to FIG. 1, the AP 1102 corresponds to the AP 14 and the client stations 1104 correspond to different ones of the client stations 25, in an embodiment.

The frame exchange 1100 is generally similar to the frame exchange 1000 of FIG. 10, in an embodiment. For example, similar to the frame exchange 1000, the frame exchange 1100 begins with a transmission of a SYNC frame from the AP 1102 to the client stations 1104. The SYNC frame 1106 is the same as or similar to the SYNC frame 1006 of FIG.

10, in various embodiments. In some embodiments, in addition to identifying a group of client stations that includes the client stations 1004-1, 1004-2, and, in some cases, providing sub-channel allocation to the client stations 1004-1, 1004-2, the SYNC frame 1002 includes respective indications modulation and coding schemes (MCS) to be used for downlink transmission to the respective client stations 1104 during the TXoP. Transmission of the SYNC frame 1106 is followed by transmission of an OFDMA data unit 1108 from the AP 1102 to the client stations 1104, wherein the OFDMA data unit 1108 includes respective OFDM data units 1110 transmitted to the client stations 1104 using respective sub-channel blocks allocated to the client stations 1104, in an embodiment. In an embodiment, the OFDM data units 1110 are the same as or similar to the OFDM data units 1008 of FIG. 10 except that whereas the OFDM data units 1008 are uplink data units transmitted by the client stations 1004, the OFDM data units 1110 are downlink data units transmitted to the client stations 1104.

Upon receiving the data unit 1110 directed to a client station 1104, the client station 1104 transits an Ack frame or a BlkAck frame to acknowledge successful receipt of the data unit 1104, in an embodiment. Then, the AP 1102 transmits a second SYNC frame 1112 to the plurality of client stations 1104 to announce subsequent transmission of a second OFDMA data unit to the client stations 1104, in an embodiment. The second SYNC frame 1112 is the same as or different from the initial SYNC frame 1106, in various embodiments. Transmission of the second SYNC frame 1112 is followed by transmission of a second OFDMA data unit 1114, wherein the OFDMA data unit 1114 includes respective OFDM data units 1116 transmitted to the client stations 1104 using respective sub-channel blocks allocated to the client stations 1104, in an embodiment. Upon receiving the data unit 1116 directed to a client station 1104, the client station 1104 transits a Ack frame or a BlkAck frame to acknowledge successful receipt of the data unit 1104, in an embodiment. In some embodiments, the initial SYNC frame 1106 includes a an indication of a number (e.g., 2) of OFDMA transmissions that can follow the SYNC frame 1106 during the TXoP corresponding to the SYNC frame 1106, and transmission of the second SYNC frame 1112 is omitted from the frame exchange 1100.

Figure 12:
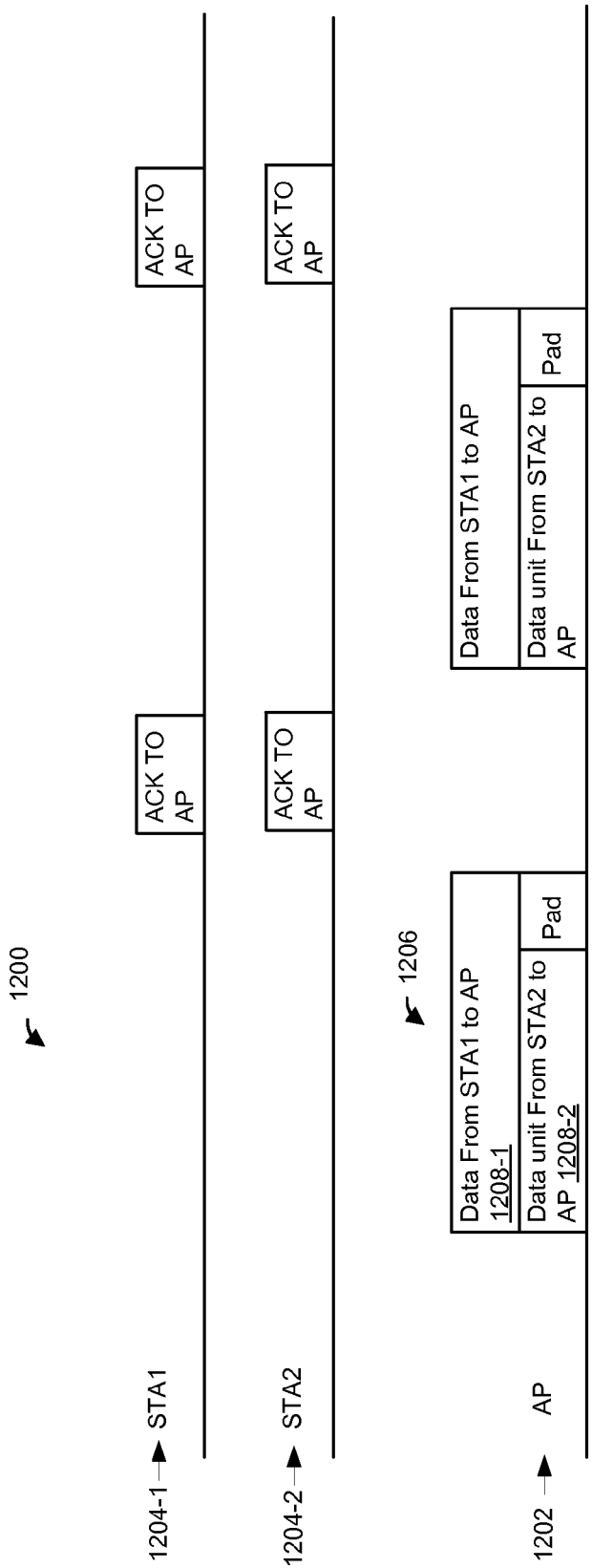
FIG. 12 is diagram illustrating a frame exchange between an AP and a plurality of client stations, according to yet another embodiment.

FIG. 12 is diagram illustrating a frame exchange 1200 between an AP and a plurality of client stations during a transmit opportunity (TxOP) obtained or scheduled for downlink OFDMA transmission to a plurality of client stations 1204 from an AP 1202, according to an embodiment. In particular, during the schedule or obtained TxOP, the AP 1202 transmits one or more OFDMA data units, each including OFDM data unit simultaneously transmitted to a plurality of client stations 1104, including a first client station STA1 1204-1 and a second client station STA2 1204-2, in the illustrated embodiment. With reference to FIG. 1, the AP 1202 corresponds to the AP 14 and the client stations 1204 correspond to different ones of the client stations 25, in an embodiment.

The frame exchange 1200 is generally similar to the frame exchange 1100 of FIG. 11, in an embodiment. Similar to the frame exchange 1100, the frame exchange 1200 includes transmission of a downlink OFDMA data unit 1206, wherein the OFDMA data unit 1206 includes respective OFDM data units 11208 transmitted to the client stations 1204 using respective sub-channel blocks allocated to the client stations 1204, in an embodiment. However, in the frame exchange 1200, the AP 1202 transmits the downlink OFDMA data unit 1206 without first transmitting a SYNC frame to indicate to the client stations 1204 the respective sub-channel blocks allocated to the client stations 1204. In an embodiment, indications of the respective sub-channel blocks allocated to the client stations 1204 have previously been provided to the client stations 1204 by a group management frame or a sub-channel allocation frame previously transmitted to the client stations 1204. In another embodiment, indications of the respective sub-channel blocks allocated to the client stations 1204 are included in a preamble of each OFDM data unit 1208. For example, the indications of the respective sub-channel blocks allocated to the client stations 1204 are included in a signal field (e.g., HEW-SIGA field and/or HEW-SIGB field) of the preambles of each of OFDM data unit 1208, in an embodiment. For example, a signal field of the preamble of each of OFDM data unit 1208 includes a sub-channel allocation field, such as the sub-channel allocation field 650 of FIG. 6B or the sub-channel allocation field 750 of FIG. 7B, wherein the group ID subfield (e.g., the group ID subfield 652 in FIG. 6B or the group ID subfield 752 in FIG. 7B) includes the group ID indicated to the client stations 1204-1 and 1204-2 by the group management frame previously transmitted to the client stations 1204-1 and 1204-2, in an embodiment. In some such embodiments, the sub-channel allocation field in the SYNC frame 1002 omits AID subfields that identify the client stations 1204-1 and 1204-2. For example, the sub-channel allocation field 650, when included in a signal field, omits the AID subfields 654, in some embodiments. As another example, the sub-channel allocation field 750, when included in a signal field, omits the AID subfields 754, in some embodiments. In such embodiments, the client station 1204-1, 1204-2 identifies allocation sub-fields directed to the client station 1204-1, 1204-2 based on a position of the client station 1204-1, 1204-2 within the group. For example, client station 1204-1, 1204-2 identifies allocation sub-fields directed to itself based on a position, or a sequence, indicator provided to the client station 1204-1, 1204-2 by the group management frame previously transmitted to the client stations 1204-1, 1204-2 (e.g., the corresponding group position indicator 808 in FIGS. 8A, 9A or the corresponding group position indicator 858 in FIG. 8B, 9B), in an embodiment. In some embodiments, in addition to identifying a group of client stations that includes the client stations 1204-1, 1204-2, and, in some cases, providing sub-channel allocation to the client stations 1204-1, 1204-2, a signal field of the preambles of the data units 1208 includes respective indications modulation and coding schemes (MCS) to be used for downlink transmission to the respective client stations 1204 during the TXoP.

Figure 13:
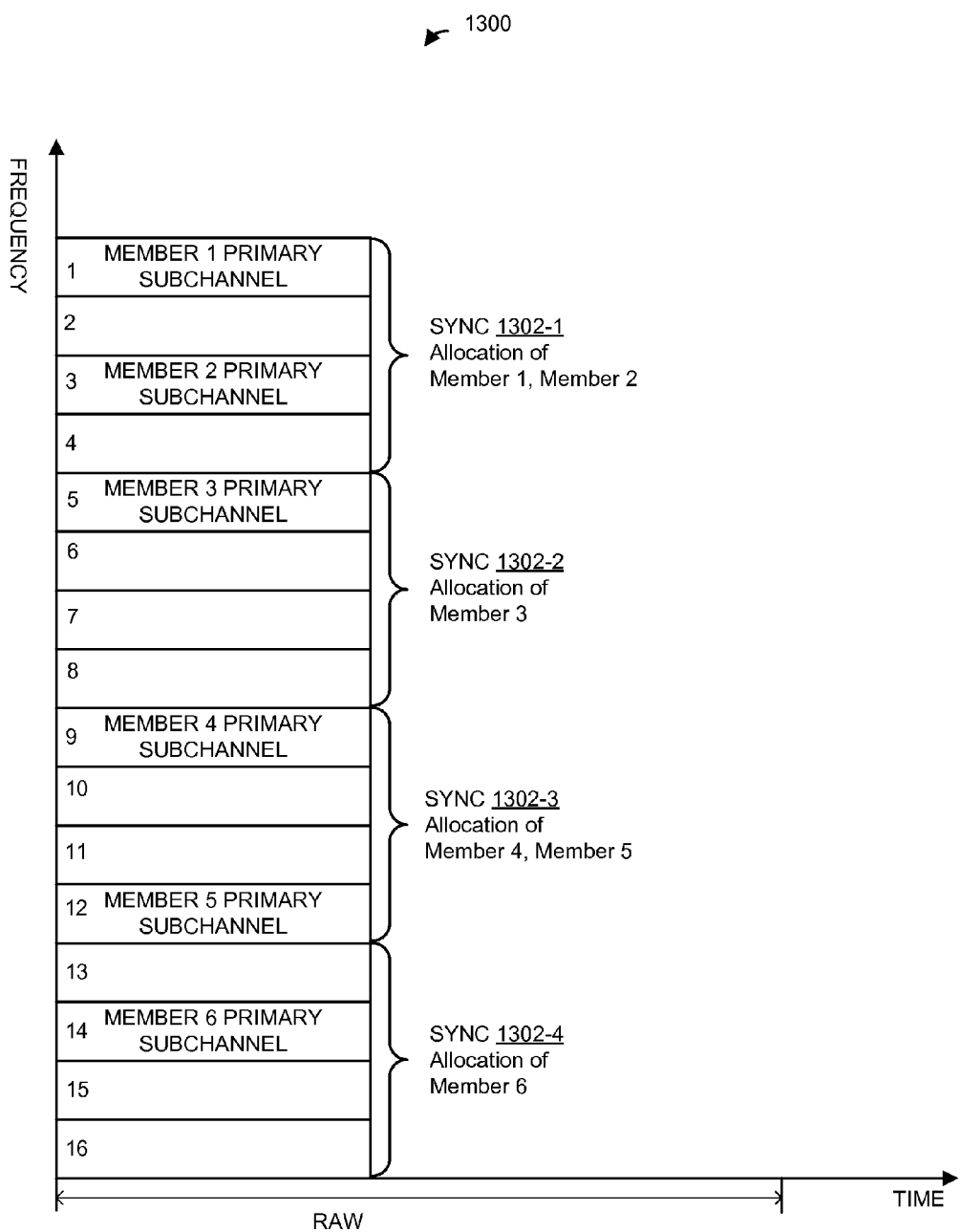
FIG. 13 is a block diagram illustrating a sub-channel indication scheme, according to an embodiment.

FIG. 13 is a block diagram illustrating a sub-channel indication scheme 1300 in which respective SYNC frames 1302 are transmitted in different channels of a network, such as the WLAN 10 of FIG. 1, wherein each SYNC frame 1302 includes sub-channel allocation information for one or more group members having primary sub-channel blocks within the corresponding channel of the network. In an embodiment, the SYNC frames 1302 collectively correspond to the SYNC frame 1006 of FIG. 10. In another embodiment, the SYNC frames 1302 collectively correspond to the SYNC frame 1106 of FIG. 11. In other embodiments, the SYNC frames 1302 are used in frame exchanges different from the frame exchange 1000 of FIG. 10 or the frame exchange 1100 of FIG. 11.

In the embodiment of FIG. 13, the communication channel in which the SYNC frames 1302 are transmitted is sub-divided into 16 sub-channel blocks, labeled in FIG. 13 as sub-channel blocks 1 through 16 for convenience, wherein respective subsets of the sub-channel blocks correspond to different channels of the network. More particularly, in the illustrated embodiment, the sub-channel blocks 1-4 correspond to a first channel of the network 10, the sub-channel blocks 5-8 correspond to a second channel of the network 10, the sub-channel blocks 9-12 correspond to a third channel of the network 10, and the sub-channel blocks 13-16 correspond to a fourth channel of the network 10. Respective sub-channel blocks 1-16 are allocated to six member client stations of an OFDMA group, in the illustrated embodiment. In an embodiment, each client station of the OFDMA group is assigned a primary sub-channel block that remains allocated to the client station at least for the life duration of the OFDMA group. In particular, in the illustrated embodiment, a first client station is assigned the sub-channel block 1 as the primary sub-channel block, a second client station is assigned the sub-channel block 3 as the primary sub-channel block, a third client station is assigned the sub-channel block 5 as the primary sub-channel block, a fourth client station is assigned the sub-channel block 9 as the primary sub-channel block, a fifth client station is assigned the sub-channel block 12 as the primary sub-channel block, and a sixth client station is assigned the sub-channel block 14 as the primary sub-channel block. Accordingly, the first client station and the second client station each has a primary sub-channel block within the first channel of the network 10, the third client station has a sub-channel block within the second channel of the network 10, the fourth client station and the fifth client station each has a primary sub-channel block within the third channel of the network 10, and the sixth client station has a primary sub-channel block within the fourth channel of the network 10, in this embodiment.

In an embodiment, at the beginning of a scheduled period for uplink OFDMA transmission by members of the group or downlink OFDMA transmission to the members of the group, each member of the group tunes to the channel, of the network 10, that includes the primary sub-channel block allocated to the member of the group. In this embodiment, each member of the group receives a SYNC frame 1302 in the corresponding channel that includes the primary sub-channel block allocated to the member of the group, and determines which remaining sub-channel blocks allocated to the member of the group, if any, based on the SYNC frame 1302 received in the channel that includes the primary sub-channel block allocated to the member of the group. In an embodiment, a SYNC frame transmitted in a particular channel of the network 10 includes sub-channel allocation information (e.g., such as sub-channel allocation field 650 of FIG. 6B or sub-channel allocation field 750 of FIG. 7B, for example) corresponding to only those members of the group which have primary sub-channel blocks within the corresponding channel of the network 10. Thus, for example, in the embodiment of FIG. 13, the SYNC frame 1302-1 transmitted in the first channel of the network 10 includes sub-channel allocation information only for the first client station and for the second client station, the SYNC frame 1302-2 transmitted in the second channel of the network 10 includes sub-channel allocation information only for the third client station, the SYNC frame 1302-3 transmitted in the third channel of the network 10 includes sub-channel allocation information only for the fourth client station and the fifth client station, and the SYNC frame 1302-4 transmitted in the fourth channel of the network 10 includes sub-channel allocation information only for the sixth client station.

Figure 14:
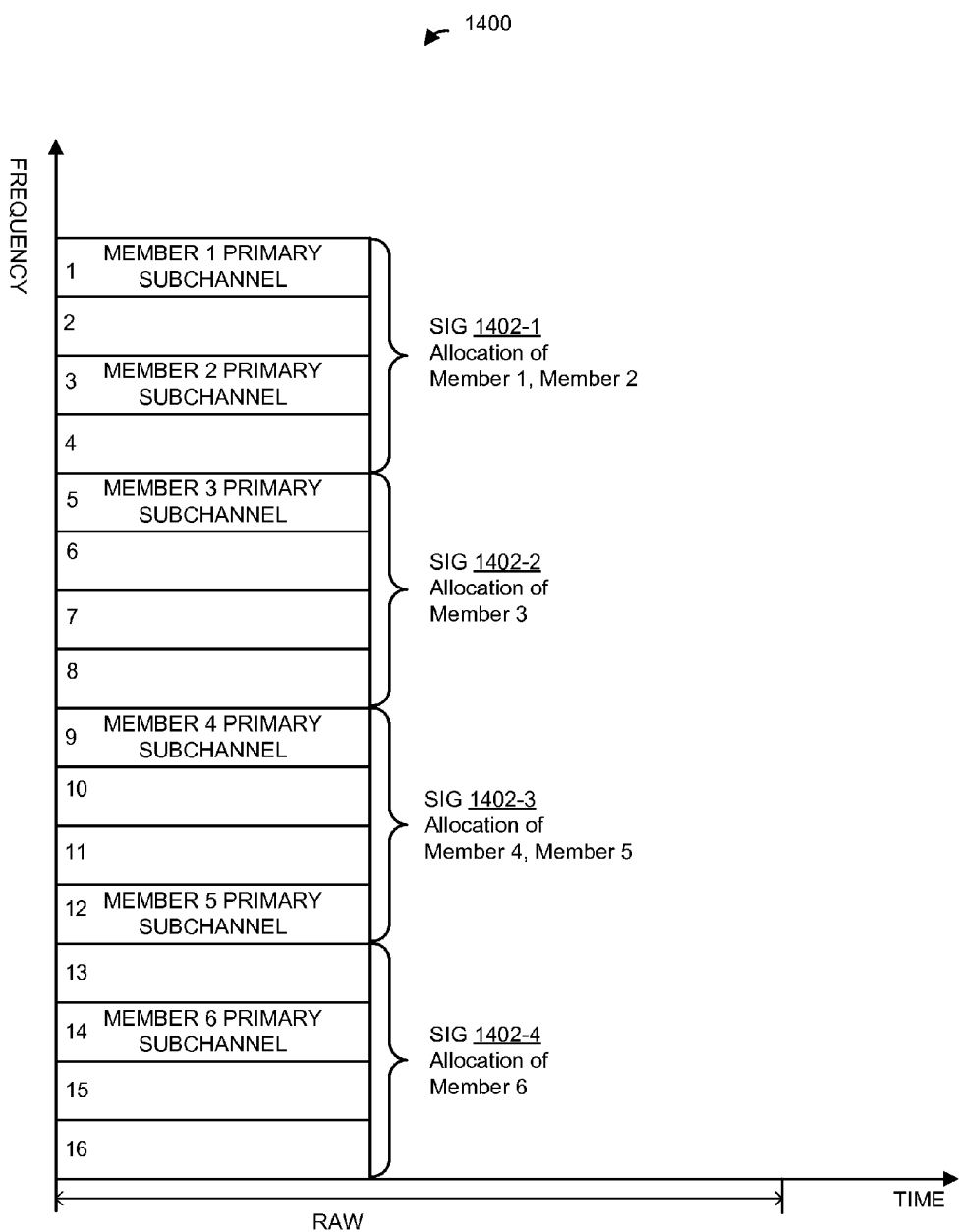
FIG. 14 is a block diagram illustrating a sub-channel indication scheme, according to another embodiment.

FIG. 14 is a block diagram illustrating a sub-channel indication scheme 1400 in which respective preambles are transmitted in different channels of a network, such as the WLAN 10 of FIG. 1, wherein each preamble includes sub-channel allocation information for one or more group members having primary sub-channels within the corresponding channel of the network, according to an embodiment. The sub-channel indication scheme 1400 is similar to the sub-channel indication scheme 1300 of FIG. 13, in an embodiment. In an embodiment, the sub-channel indication scheme 1400 is used with the frame exchange 1200 of FIG. 12. For example, the OFDMA data unit 1206 of FIG. 12 includes a preamble that utilizes the sub-channel indication scheme 1400, in an embodiment. In other embodiments, the sub-channel indication scheme 1400 is used with a data unit other than the data unit 1206 or is used in a frame exchange different from the frame exchange 1200.

In an embodiment, a preamble transmitted in respective channels of the network 10 includes sub-channel allocation information corresponding to only those members of the group which have primary sub-channel blocks within the corresponding channel of the network 10. For example, in the embodiment of FIG. 14, a SIG field 1402 transmitted in respective channels of the network 10 includes sub-channel allocation information corresponding to only those members of the group which have primary sub-channels within the corresponding channel of the network 10. Thus, for example, the SIG fields 1402-1 transmitted in the first channel of the network 10 includes sub-channel allocation information only for the first client station and for the second client station, the SIG fields 1402-2 transmitted in the second channel of the network 10 includes sub-channel allocation information only for the third client station, the SIG fields 1402-3 transmitted in the third channel of the network 10 includes sub-channel allocation information only for the fourth client station and the fifth client station, and the SYNC frame SIG fields 1402-4 transmitted in the fourth channel of the network 10 includes sub-channel allocation information only for the sixth client station, in an embodiment.

Figure 15:
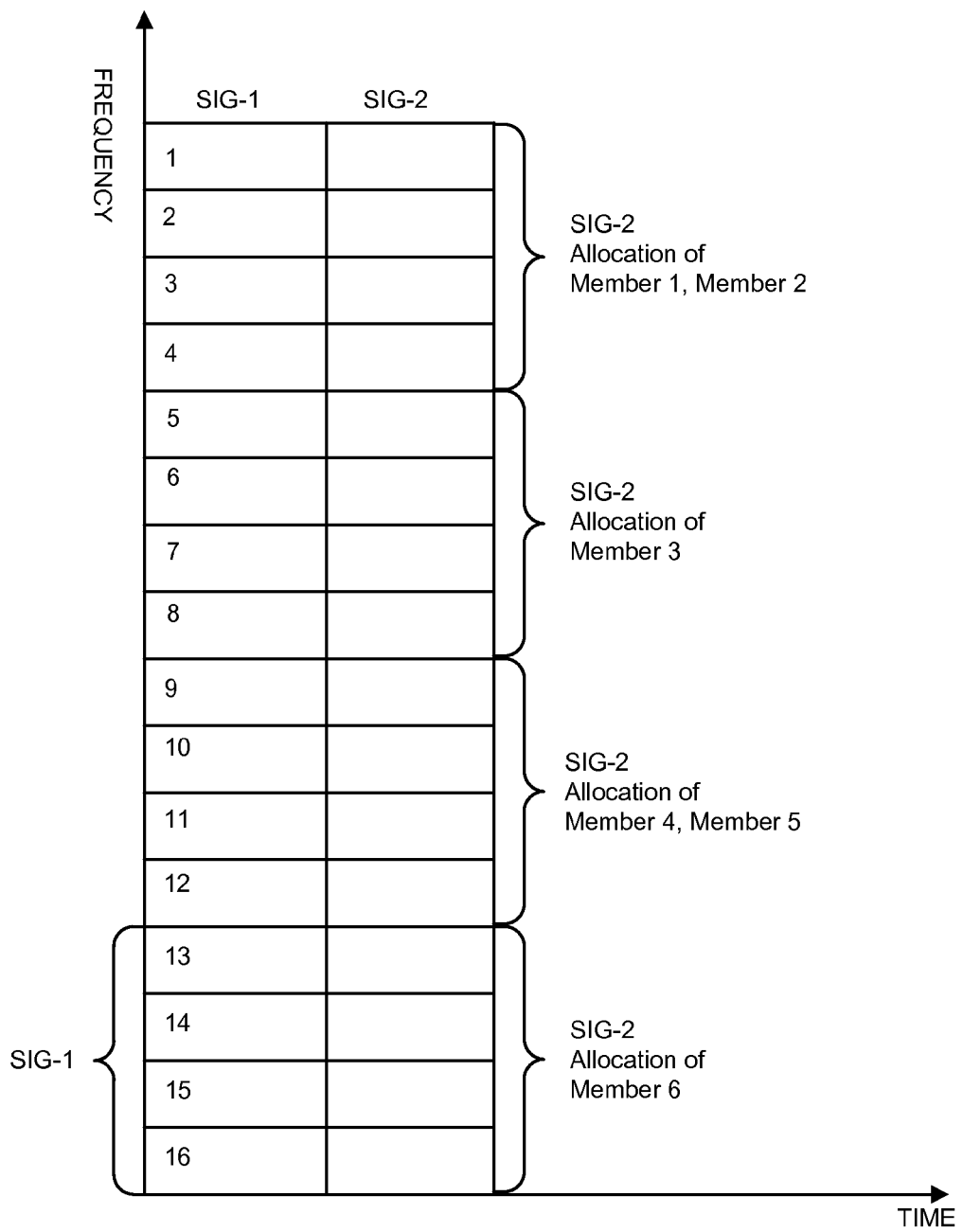
FIG. 15 is a block diagram illustrating a sub-channel indication scheme, according to yet another embodiment.

FIG. 15 is a block diagram illustrating a sub-channel indication scheme 1500 in which respective preambles are transmitted in different channels of a network, such as the WLAN 10 of FIG. 1, wherein preamble includes information for one or more group members having primary sub-channel blocks within the corresponding channel of the network, according to another embodiment. The sub-channel indication scheme 1500 is similar to the sub-channel indication scheme 1400 of FIG. 14, except that in the sub-channel indication scheme 1500 a first signal field is transmitted in each channel of the network 10 and includes indications of respective primary sub-channel blocks allocated to each client station in the group, and respective second signal fields are transmitted in respective channels of the network 10, wherein a particular second signal field transmitted in a channel that includes the primary sub-channel block allocated to a member of the group includes respective sub-channel allocation information for the member of the group, in an embodiment. As an example, in an embodiment, the first signal field in an HEW-SIGA field (e.g., an HEW-SIGA field 510 in FIG. 5), and the second signal field in an HEW-SIGB field (e.g., an HEW-SIGB field 516 in FIG. 5). As another example, in another embodiment, the first signal field in a first HEW-SIGA field (e.g., a first HEW-SIGA field 510 in FIG. 5), and the second signal field in a second HEW-SIGA field (e.g., a second HEW-SIGA field 510 that follows the first HEW-SIGA field 510 in FIG. 5).

Figure 16:
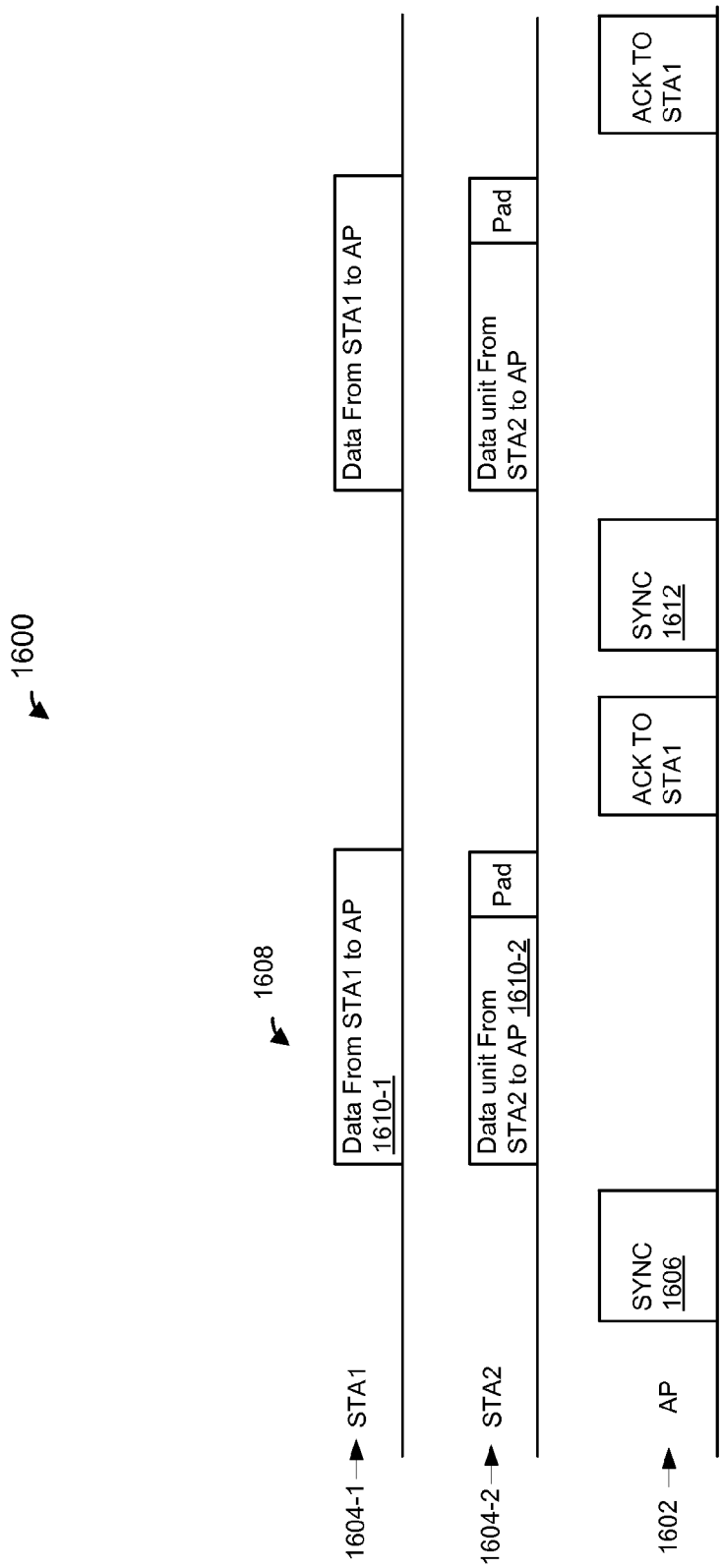
FIG. 16 is diagram illustrating a frame exchange between an AP and a plurality of client stations, according to an embodiment.

FIG. 16 is diagram illustrating a frame exchange 1600 between an AP and a plurality of client stations during a transmit opportunity (TxOP) obtained or scheduled for uplink MU MIMO transmission by a plurality of client stations 1604 to an AP 1602, according to an embodiment. In particular, during the schedule or obtained TxOP, the AP 1602 receives one or more MU MIMO data units, each including data simultaneously transmitted by a plurality of client stations 1604, including a first client station STA1 1004-1 and a second client station STA2 1604-2, wherein data from a respective client stations 1604-1, 1604-2 is transmitted using one or more respective spatial streams allocated to the client station 1604-1, 1604-2, in the illustrated embodiment. With reference to FIG. 1, the AP 1602 corresponds to the AP 14 and the client stations 1604 correspond to different ones of the client stations 25, in an embodiment.

The frame exchange 1600 is generally similar to the frame exchange 1000 of FIG. 10, in an embodiment. In an embodiment, the frame exchange 1600 begins with a transmission of a SYNC frame 1606. The SYNC frame 1606 includes indications of respective spatial streams allocated to the members of an MU MIMO group (the client stations 1604, in the illustrated embodiment). In an embodiment, transmission of the SYNC frame 1606 is subsequent to transmission of a group management frame and/or a spatial stream allocation frame, such as one of the group management frames and/or one of the spatial stream allocation frames described above. For example, in some embodiments in which static or semi-dynamic allocation is utilized to allocate respective spatial streams to the client stations 1604, the SYNC frame 1606 is transmitted subsequent to transmission of a group management frame that includes a group management field such the group management field 670 of FIG. 6C or the group management field 690 of FIG. 6D. In such embodiments, the SYNC frame 1606 prompts the client stations 1604 to transmit data streams to the AP 14, wherein respective data streams are to be transmitted by the client stations 1604 using respective spatial streams allocated to the client stations 1604 as indicated by a group management frame and/or spatial stream allocation frame previously transmitted to the client stations 1604 by the AP 1602. In one such embodiment, the SYNC frame 1602 includes a group ID field that includes a group ID corresponding to a group that includes the client station 1604-1 and the client station 1604-2, as indicated to the client stations 1604-1 and 1602-2 by the group management frame previously transmitted to the client stations 1604-1 and 1604-2.

As another example, in some embodiments in which dynamic or semi-dynamic allocation is utilized to allocate respective spatial streams to the client stations 1604, the SYNC frame 1606 is transmitted subsequent to transmission of a group management frame that includes a group management field such the group management field 800 of FIG. 8A, the group management field 850 of FIG. 8B, the group management field 900 of FIG. 9A, or the group management field 950 of FIG. 9B. In such embodiments, the SYNC frame 1602 includes a spatial stream allocation field, such as spatial stream allocation allocation field 690 of FIG. 7B, wherein the group ID subfield (e.g., the group ID subfield 692 in FIG. 6D) includes the group ID indicated to the client stations 1604-1 and 1604-2 by the group management frame previously transmitted to the client stations 1604-1 and 1604-2, in an embodiment. In some such embodiments, the sub-channel allocation field in the SYNC frame 1602 omits AID subfields that identify the client stations 1604-1 and 1604-2. For example, the spatial stream allocation field 690, when included in the SYNC frame 1602, omits the AID subfields 694, in some embodiments. In such embodiments, the client station 1604-1, 1604-2 identifies the number of spatial streams sub-field corresponding to the client station 1604-1, 1604-2 based on a position of the client station 1604-1, 1604-2 within the group. For example, client station 1604-1, 1604-2 identifies the number of spatial streams sub-field directed to itself based on a position, or a sequence, indicator provided to the client station 1604-1, 1604-2 by the group management frame previously transmitted to the client stations 1604-1, 1604-2 (e.g., the corresponding group position indicator 808 in FIGS. 8A, 9A or the corresponding group position indicator 858 in FIG. 8B, 9B), in an embodiment.

In some embodiments, the SYNC frame 1606, in addition to identifying a group of client stations that includes the client stations 1604-1, 1604-2, and, in some cases, providing spatial stream allocation information to the client stations 1604-1, 1604-2, the SYNC frame 1606 includes one or more of (i) an indication of a length of a data unit to be transmitted (e.g., PPDU length), and (ii) an indication of a number of transmissions (e.g., number of PPDUs) that can follow the SYNC frame 1606 during the TXoP corresponding to the SYNC frame 1606. In some embodiments and/or scenarios, the AP 1602 utilizes the SYNC frame 1606 to poll the client stations 1604 to provide indications of requested data unit lengths or indications of amount of buffered data (e.g., number of buffered frames) at the client stations 1604 to the AP 1602. For example, the AP 1602 polls the client stations 1604 by setting a PPDU length indication in the SYNC frame 1602 to a length of a control frame, such as a quality of service (QoS) Null frame or another suitable control frame), in an embodiment. In an embodiment, the AP 1602 determines a length (e.g., PPDU length) for an MU MIMO uplink transmission based on the requested lengths and/or indications of amount of buffered data that the AP 1602 receives from the client stations 1604 in response to the SYNC frame 1606, in an embodiment. The AP 1602 then includes an indication of the determined data unit length in a subsequent SYNC frame that the AP 1602 transmits to the client stations 1604, in an embodiment.

Figure 17:
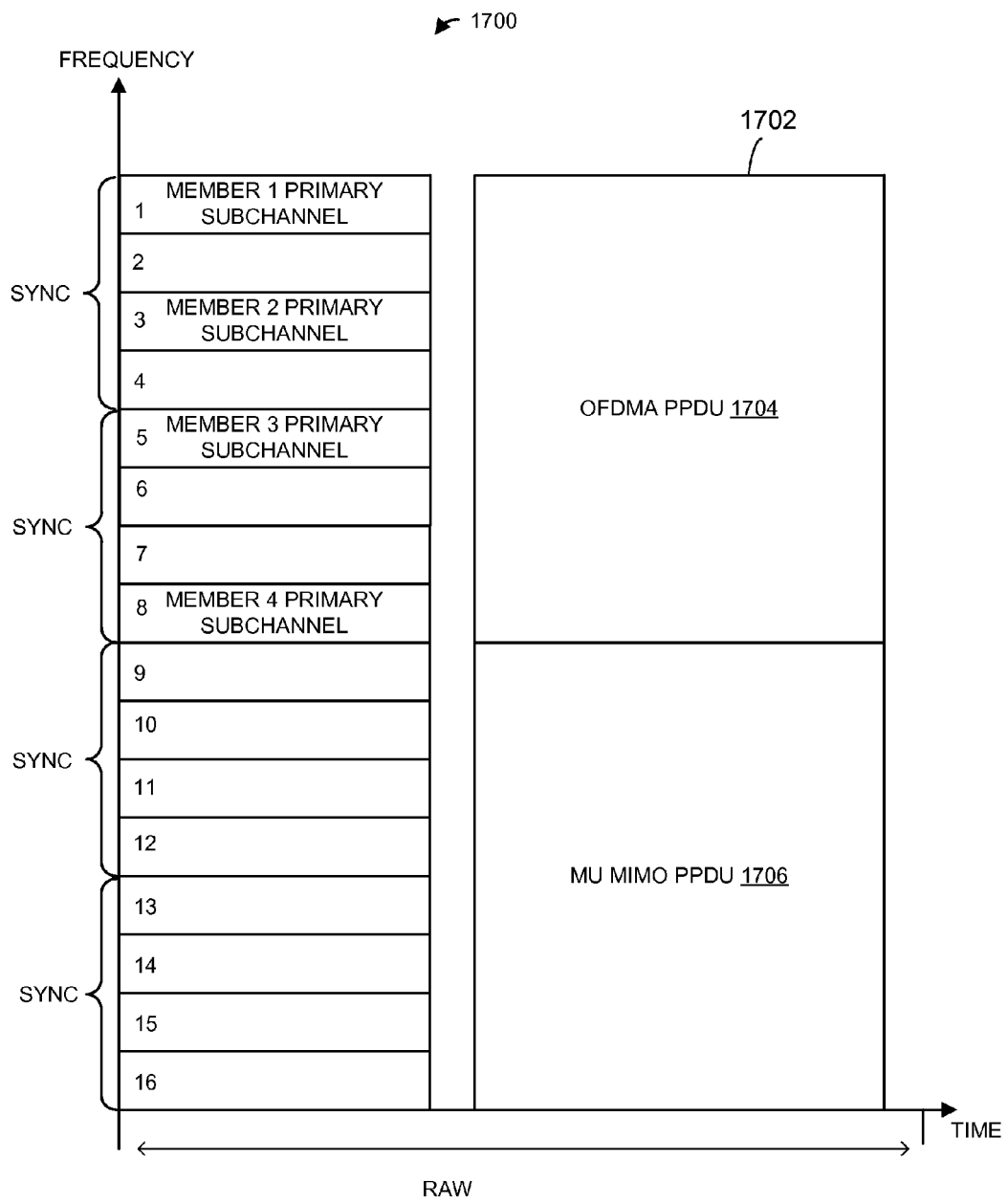
FIG. 17 is a block diagram illustrating a sub-channel and spatial stream allocation indication scheme, according to an embodiment.

In some embodiments, an uplink transmission from multiple client statins 25 to the AP 14 or a downlink transmission from the AP 14 to multiple client stations 25 combines an OFDMA transmission scheme, such as an OFDMA transmission scheme described above, and an MU MIMO transmission scheme, such as an MU MIMO transmission schemes described above. FIG. 17 is a block diagram illustrating a sub-channel and spatial stream allocation indication scheme 1700 used in an embodiment that combines OFDMA and MU MIMO transmission in a same physical layer (PHY) data unit 1702, according to an embodiment. The PHY data unit 1702 is an uplink PHY data unit transmitted by a plurality of client stations 25 to the AP 14, in an embodiment. The PHY data unit 1702 is a downlink PHY data unit transmitted by the AP 14 to a plurality of client stations, in another embodiment. The PHY data unit 1702 includes an OFDMA portion 1704 in which respective OFDM data units are transmitted to multiple client stations, or transmitted by multiple client stations, in an OFDMA group of client stations, and an MU MIMO portion 1706 in which respective data streams are transmitted to multiple client stations, or transmitted by multiple client stations, in an MU MIMO group of client stations, in various embodiments.

In an embodiment, each client station in the OFDMA group of client stations is allocated a primary sub-channel, wherein the primary sub-channels remain allocated to the client stations for a life duration of the OFDMA group (e.g., for transmission of at least two PHY data unit to or by the client stations). In an embodiment, respective first SYNC frames are transmitted in each smallest bandwidth channel of the network that is to be subsequently used for transmission of the OFDMA portion 1704, wherein a respective first SYNC frame transmitted in a particular smallest bandwidth channel includes sub-channel allocation information for those one or more client stations for which allocated primary sub-channel blocks are within the particular smallest bandwidth channel. In an embodiment, a second SYNC frame is transmitted in one or more smallest bandwidth channels of the network used for transmission of the MU MIMO portion 1706, wherein the second SYNC frame includes spatial stream allocation information for the client stations in the MU MIMO group to which the MU MIMO portion 1706 is directed. The second SYNC frame is duplicated in each of the one or more smallest bandwidth channels of the network used for transmission of the MU MIMO portion 1706, in an embodiment.

Figure 18:
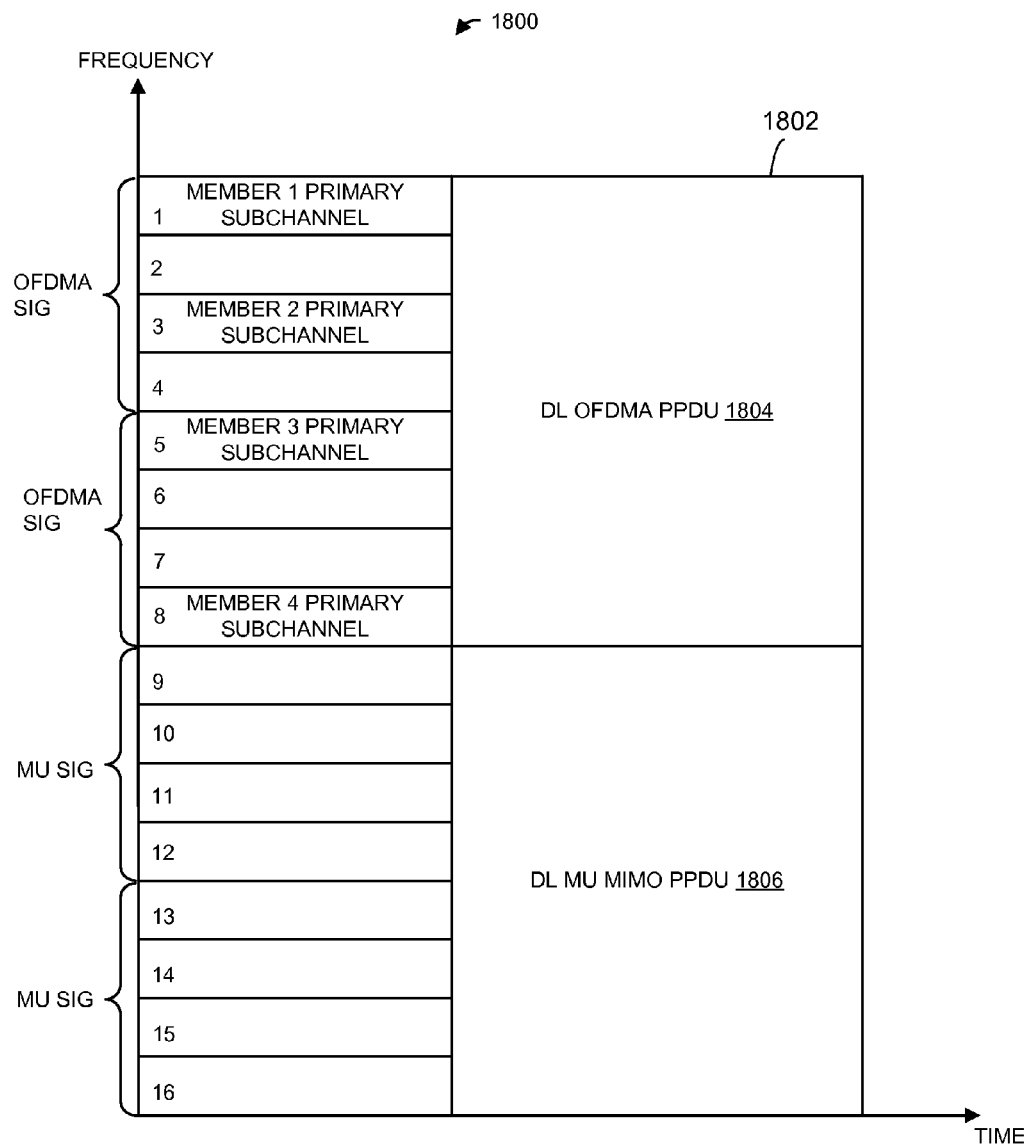
FIG. 18 is a block diagram illustrating a sub-channel and spatial stream allocation indication scheme, according to another embodiment.

FIG. 18 is a block diagram illustrating a sub-channel and spatial stream allocation indication scheme 1800 used in an embodiment that combines OFDMA and MU MIMO transmission in a same physical layer (PHY) data unit 1802, according to an embodiment. The PHY data unit 1802 is a downlink PHY data unit transmitted by the AP 14 to a plurality of client stations, in another embodiment. The PHY data unit 1802 includes an OFDMA portion 1804 in which respective OFDM data units are transmitted to multiple client stations in an OFDMA group of client stations, and an MU MIMO portion 1806 in which respective data streams are transmitted to multiple client stations, in an MU MIMO group of client stations, in an embodiment.

The sub-channel and spatial stream allocation indication scheme 1800 is generally similar to the sub-channel and spatial stream allocation indication scheme 1700 of FIG. 17 except that in the sub-channel and spatial stream allocation indication scheme 1800 allocation information is included in preamble portions of the PHY data unit 1800 rather than on SYNC frame transmitted prior to transmission of the PHY data unit 1700. In an embodiment, respective first signal fields of preamble portions transmitted in particular smallest bandwidth channels of the network used for transmission of the OFDMA portion 1804 include sub-channel allocation information for those one or more client stations for which allocated primary sub-channel blocks are within the particular smallest bandwidth channel. In an embodiment, a second signal field of a preamble transmitted in one or more smallest bandwidth channels of the network used for transmission of the MU MIMO portion 1806 includes spatial stream allocation information for the client stations in the MU MIMO group to which the MU MIMO portion 1806 is directed. The second signal field is duplicated in each of the one or more smallest bandwidth channels of the network used for transmission of the MU MIMO portion 1806, in an embodiment.

Figure 19:
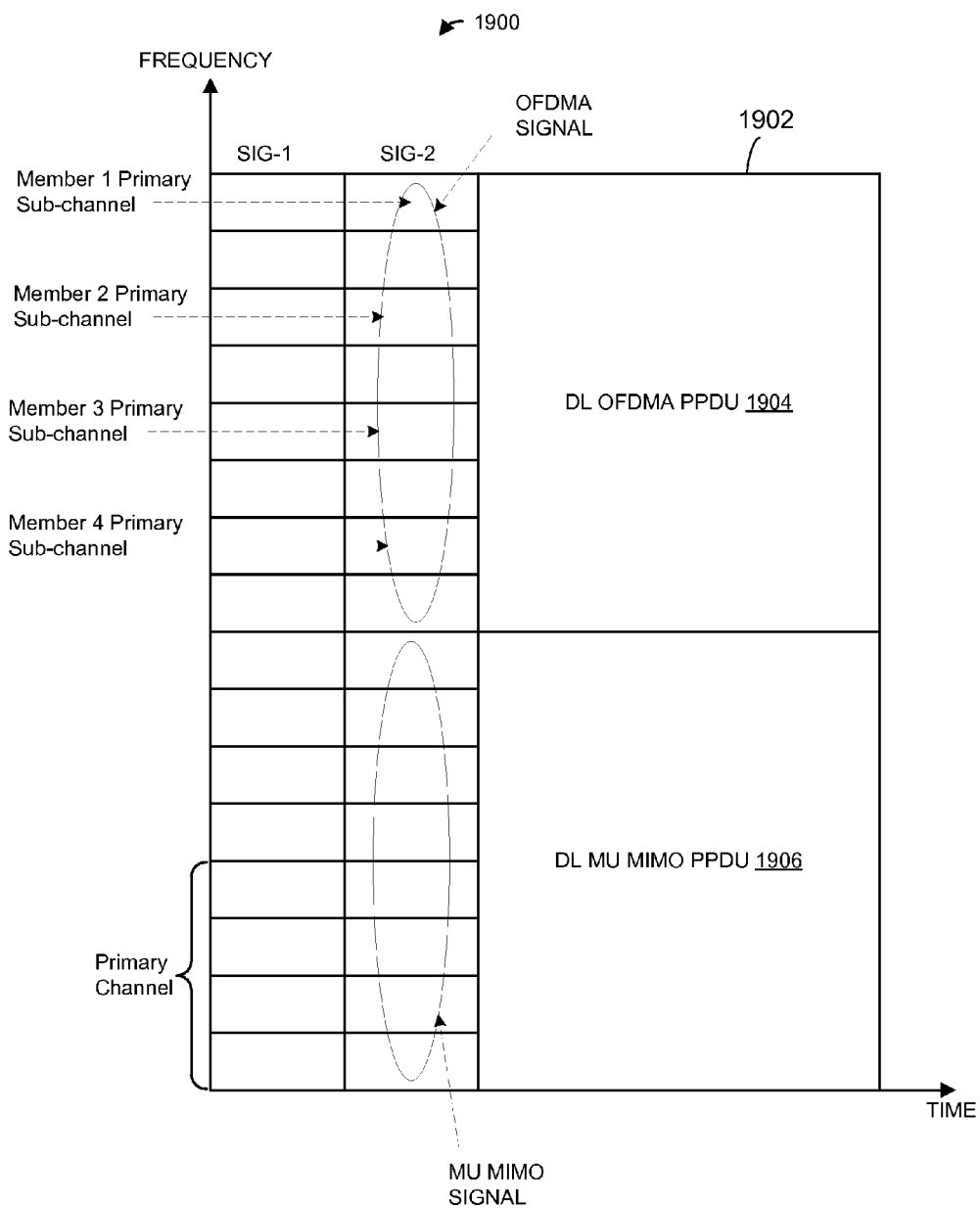
FIG. 19 is a block diagram illustrating a sub-channel and spatial stream allocation indication scheme, according to yet another embodiment.

FIG. 19 is a block diagram illustrating a sub-channel and spatial stream allocation indication scheme 1800 used in an embodiment that combines OFDMA and MU MIMO transmission in a same physical layer (PHY) data unit 1902, according to an embodiment. The PHY data unit 1902 is a downlink PHY data unit transmitted by the AP 14 to a plurality of client stations, in another embodiment. The PHY data unit 1902 includes an OFDMA portion 1904 in which respective OFDM data units are transmitted to multiple client stations in an OFDMA group of client stations, and an MU MIMO portion 1906 in which respective data streams are transmitted to multiple client stations, in an MU MIMO group of client stations, in an embodiment.

The sub-channel and spatial stream allocation indication scheme 1900 is generally similar to the sub-channel and spatial stream allocation indication scheme 1800 of FIG. 18 except that in the sub-channel and spatial stream allocation indication scheme 1800 allocation information is divided between a first signal field and a second signal field transmitted in each smallest bandwidth channel of the network. In an embodiment, a first signal field (e.g., HEW-SIG A field) is transmitted in each smallest bandwidth channel of the network and includes indications of primary sub-channels allocated to client stations in the OFDMA group to which the OFDMA portion 1906 is directed. Further, in an embodiment, respective second signal field transmitted the smallest bandwidth channels used for transmission of the OFDMA portion 1906 include sub-channel allocation information for those client stations 25 for which allocated primary sub-channel blocks are within the particular smallest bandwidth channel. In an embodiment, a second signal field transmitted in one or more smallest bandwidth channels used for transmission of the MU MIMO portion 1806 includes spatial stream allocation information for the client stations in the MU MIMO group to which the MU MIMO portion 1806 is directed. The second signal field is duplicated in each of the one or more smallest bandwidth channels of the network used for transmission of the MU MIMO portion 1906, in an embodiment.

Figure 20A:
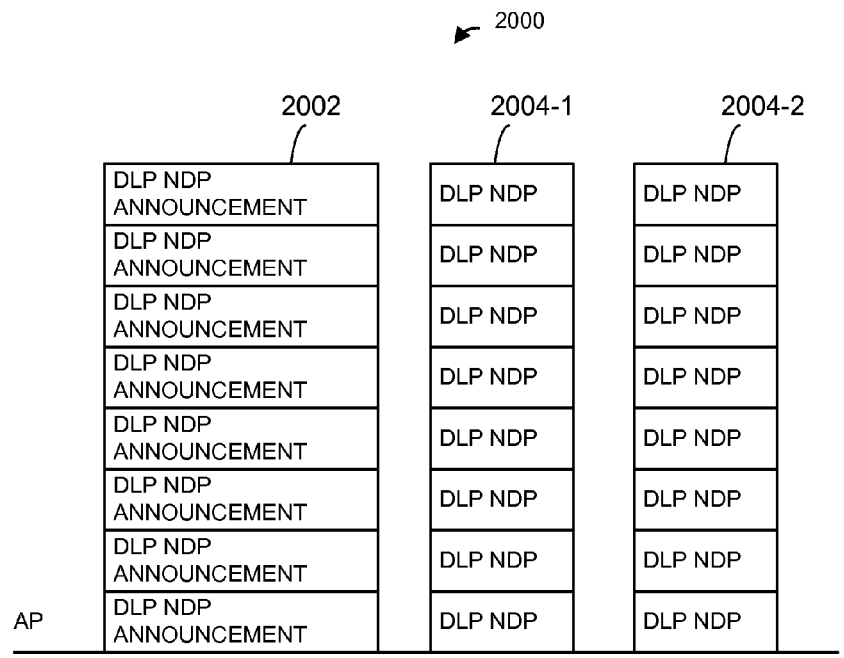
FIGS. 20A-20B are diagrams illustrating beamforming procedures, according to embodiments.
Figure 20B:
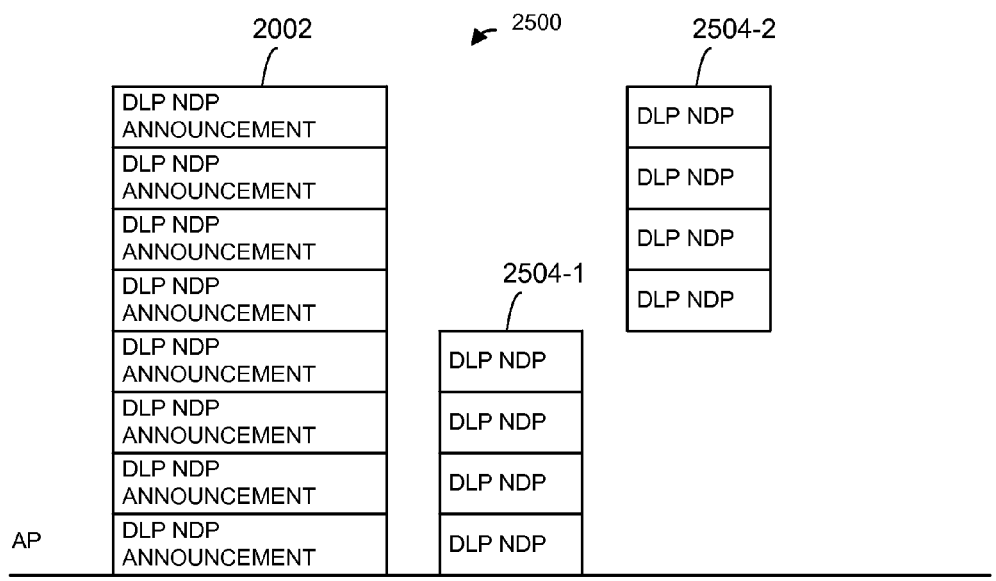

FIGS. 20A-20B are block diagrams illustrating explicit downlink beamforming procedures 2000, 2050, according to embodiments. Turning first to FIG. 20A, the beamforming procedure 2000 begins with transmission by an AP (e.g., the AP 14) of a downlink no data packet (DL NDP) announcement frame 2002. The DL NDP announcement frame 2002 is duplicated in each smallest bandwidth channel of the network (e.g., the network 10), in an embodiment. For example, in an embodiment in which the AP 14 operates with a 160 MHz channel and the smallest bandwidth channel of the network 10 is 20 MHz, the DL NDP announcement frame is transmitted in each of eight 20 MHz channels of the network. Transmission of the DL NDP announcement frame 2002 is followed by transmission of one or more DL NDP packets 2004, in an embodiment. For example, the AP 14 transmits a first DL NDP packet 2004-1 after a certain predetermined time period, such as short inter-frame spacing (SIFS), after the end of the DL NDP announcement frame 2000, in an embodiment. Similarly, the AP 14 transmits a second DL NDP packet 2004-$w$ after a certain predetermined time period, such as short inter-frame spacing (SIFS), after the end of the first DL NDP packet 2004-1, in an embodiment. In an embodiment, each of the one or more DL NDP packets 2004 is duplicated in each smallest bandwidth channel of the network 10.

In an embodiment, each of one or more client stations 25 receives the one or more DL NDP packets 2004 and obtains a measure (e.g., channel estimate, channel state information, signal to noise ratio (SNR), etc.) of the communication channel between the AP 14 and the client station 25 based on training fields in the one or more DL NDP packets 2004. In an embodiment, the AP 14 then polls the one or more client stations 25 to feed some form of the obtained channel measure back to the AP 14. For example, the AP 14 polls each client station 25 by transmitting a single user (SU) poll frame to the client station 25, in an embodiment. As another example, in another embodiment, the AP 14 polls multiple client stations 25 by transmitting a multi user (e.g., an MU MIMO or an OFDMA) poll frame to the multiple of client stations 25. In an embodiment, in response to receiving a poll frame from the AP 14, a client station 25 feeds the obtained channel measure, in some form, to the AP 14. The AP 14 then utilizes the channel measures obtained from one or more client stations 25 to form OFDMA and/or MU MIMO groups of client stations 25, to select channels and/or sub-channels to be used in communication with the client stations 25, to develop beamforming or steering matrices to be used in communication with the client stations 25, etc., in various embodiments.

Turning briefly to FIG. 20B, the beamforming procedure 2050 generally the same as the beamforming procedure 2000 of FIG. 20 except that in the beamforming procedure 2050, following transmission of the DL NDP announcement frame 2002, the AP 14 transits a first DL NDP packet 2054-1 in a first channel of the network 10 (e.g., in a first 80 MHz portion of the 160 MHz channel of the network 10), and then transmits a second DL NDP packet 2054-2 in a second channel of the network 10 (e.g., in a second 80 MHz portion of the 160 MHz channel of the network 10), in an embodiment. For example, the AP 14 transmits the first DL NDP packet 2054-1 after a certain predetermined period (e.g., SIFS) after the end of the announcement frame 2002, and transmits the second DL NDP packet 2054-2 after a certain predetermined period (e.g., SIFS) after the end of the first DL NDP packet 2054-1, in an embodiment.

Figure 21A:
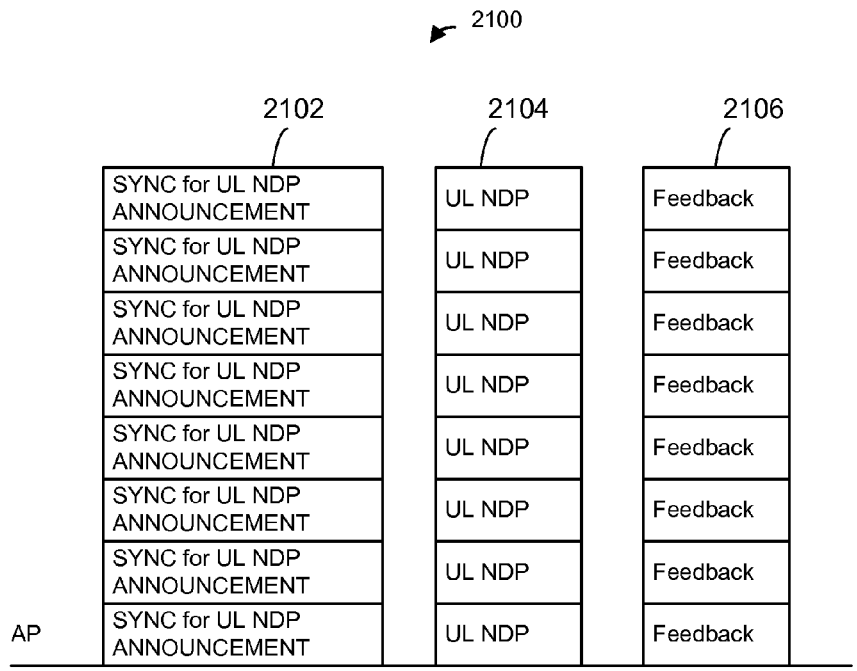
FIGS. 21A-21B are diagrams illustrating beamforming procedures, according to embodiments.
Figure 21B:
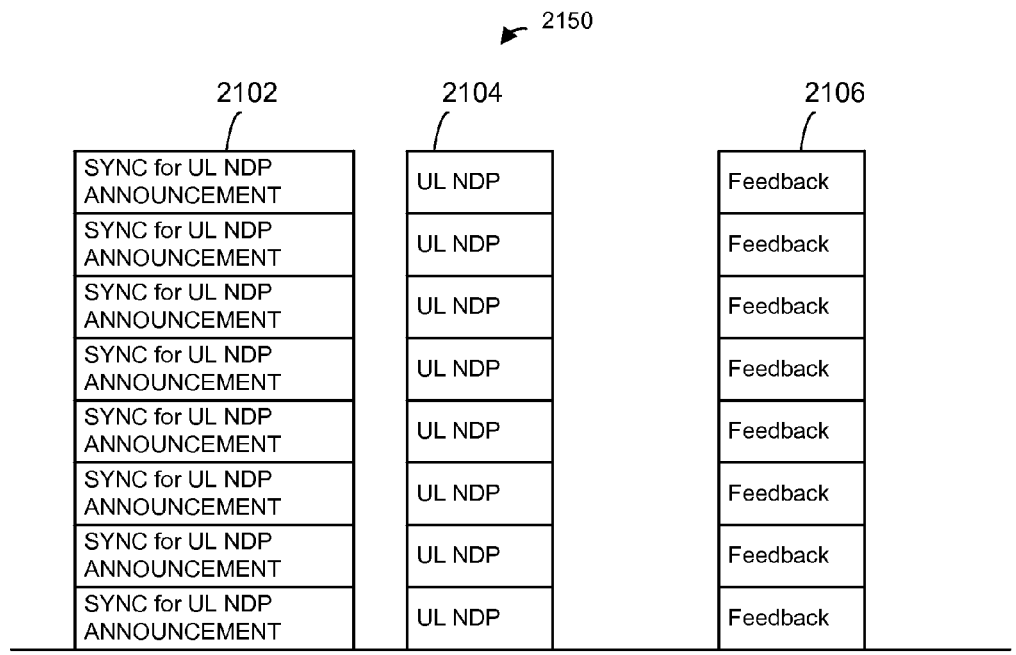

FIGS. 21A-21B are block diagrams illustrating explicit uplink beamforming procedures 2100, 2150, according to embodiments. Turning first to FIG. 21A, the beamforming procedure 2000 begins with transmission by an AP (e.g., the AP 14) of a SYNC frame 2102 to a group of client stations 25 to request that the client stations 25 transmit uplink non data packets (UL NDP) to the AP 14, in an embodiment. In response to receiving the SYNC frame 2102, the client stations 25 transmit respective UL NDP packets 2104 to the AP 14. In an embodiment, each of the client stations 25 transits its UL NDP packet 2104 to the AP 14 in a respective channel (e.g., a 20 MHz channel) of the network 10. In an embodiment, if two or more client stations 25 utilize OFDMA communication in sub-channels within a channel (e.g., a same 20 MHz channel), only one of these client stations 25 is requested to transmit an UL NDP packet by the SYNC frame 2002.

In an embodiment, the AP 14 receives the UL NDP packets 2104, the AP 14 obtains measures (e.g., channel estimate, channel state information, signal to noise ratio (SNR), etc.) of the communication channels between the client stations 25 and the AP 14. For example, the AP 14 obtains the channel measures based on training fields of the UL NDP packets 2104, in an embodiment. The AP 14 then feeds the channel measure, in some form, back to the client stations 25. For example, the AP 14 transmits a feedback packet (e.g., an OFDMA feedback packet) 2106, that contains some form of the obtained channel measures, to the client stations 25 after a certain predetermined time period, such as SIFS, after the end of the UL NDP packets 2104, such as in the procedure 2100 of FIG. 21A, or transmits the feedback packet 2106 at a later time after the end of the UL NDP packets 2104, such as in the procedure 2150 of FIG. 21B, in various embodiments. In an embodiment, client stations 25 receive the feedback packet (e.g., OFDMA feedback packet) 2106 and develop, based on the channel measure provided in the feedback packet 2016, beamforming or steering matrices to be used in communication with the AP 14, in an embodiment.

Figure 22:
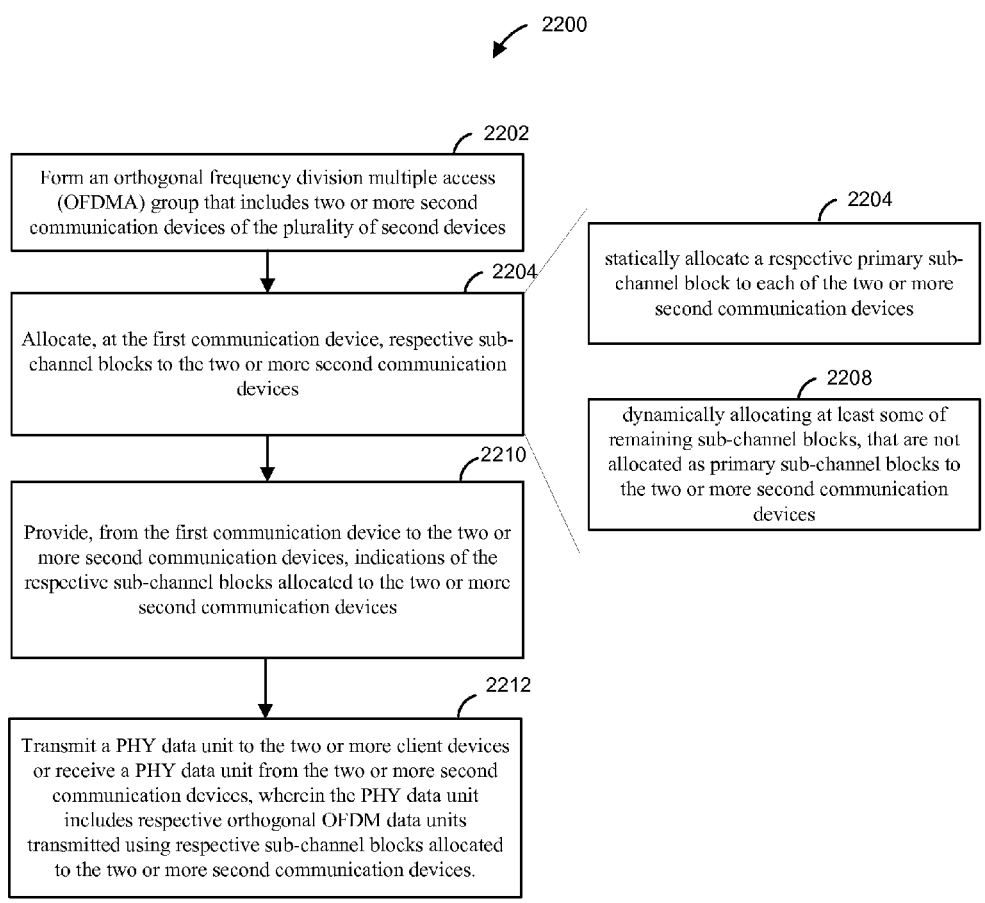
FIG. 22 is a flow diagram of an example method for simultaneous communication by multiple communication devices in a wireless local area network, according to an embodiment.

FIG. 22 is a flow diagram of an example method 2200 for simultaneous communication in a wireless local area network that includes a first communication device and a plurality of second communication devices, according to an embodiment. In an embodiment, the method 2200 is implemented by an AP in the WLAN, according to an embodiment. With reference to FIG. 1, the method 2200 is implemented by the network interface device 16 of the AP 14. For example, the method 2200 is implemented by the MAC processing unit 18 and/or by the PHY processing unit 20 of the network interface device 16, in an embodiment. In other embodiments, the method 2200 is implemented by other components of the AP 14, or is implemented by a suitable communication device other than the AP 14.

At block 2202, an OFDMA group of one or more second communication devices (e.g., one or more client stations 25) is formed. For example, the AP 14 forms the OFDMA group of client stations 25, in an embodiment. An entity other than the AP 14 forms the OFDMA group of client stations 25, in another embodiment.

At block 2204, respective sub-channel blocks are allocated to the client stations 25 in the OFDMA group formed at block 2202. In an embodiment, block 2204 includes blocks 2206 and 2208. At block 2206, a respective primary sub-channel block is allocated to each of the client stations 25 in the OFDMA group. The respective primary sub-channel blocks statically allocated at block 2206 remain allocated to client stations 25 for transmission of at least two PHY data units to the client stations 25 and/or for reception of at least two PHY data units from the client stations 25, in an embodiment. In an embodiment, at least some of remaining sub-channel blocks, that are not allocated as primary sub-channel blocks to the two or more client stations 25 at block 2206, are allocated among the two or more second communication client stations 25 at block 2208. At least some of the remaining sub-channel blocks that are dynamically allocated at block 2008 are dynamically reallocated for transmission of each of the at least two PHY data units, in an embodiment.

At block 2210, indications of the respective sub-channel blocks allocated to the two or more second communication devices are provided to the two or more client stations 25. For example, the indications are included in a group management frame and/or in a SYNC frame transmitted to the client stations 25 and/or one or more signal fields of a preamble of a data unit transmitted to the client stations 25, in various embodiments.

At block 2212, a PHY data unit is transmitted to the client stations 25 or a PHY data unit is received from the client stations 25, in various embodiments. The PHY data unit includes respective orthogonal frequency division multiplexing (OFDM) data units transmitted using respective sub-channel blocks allocated to the two or more client stations 25, in an embodiment.

Figure 23:
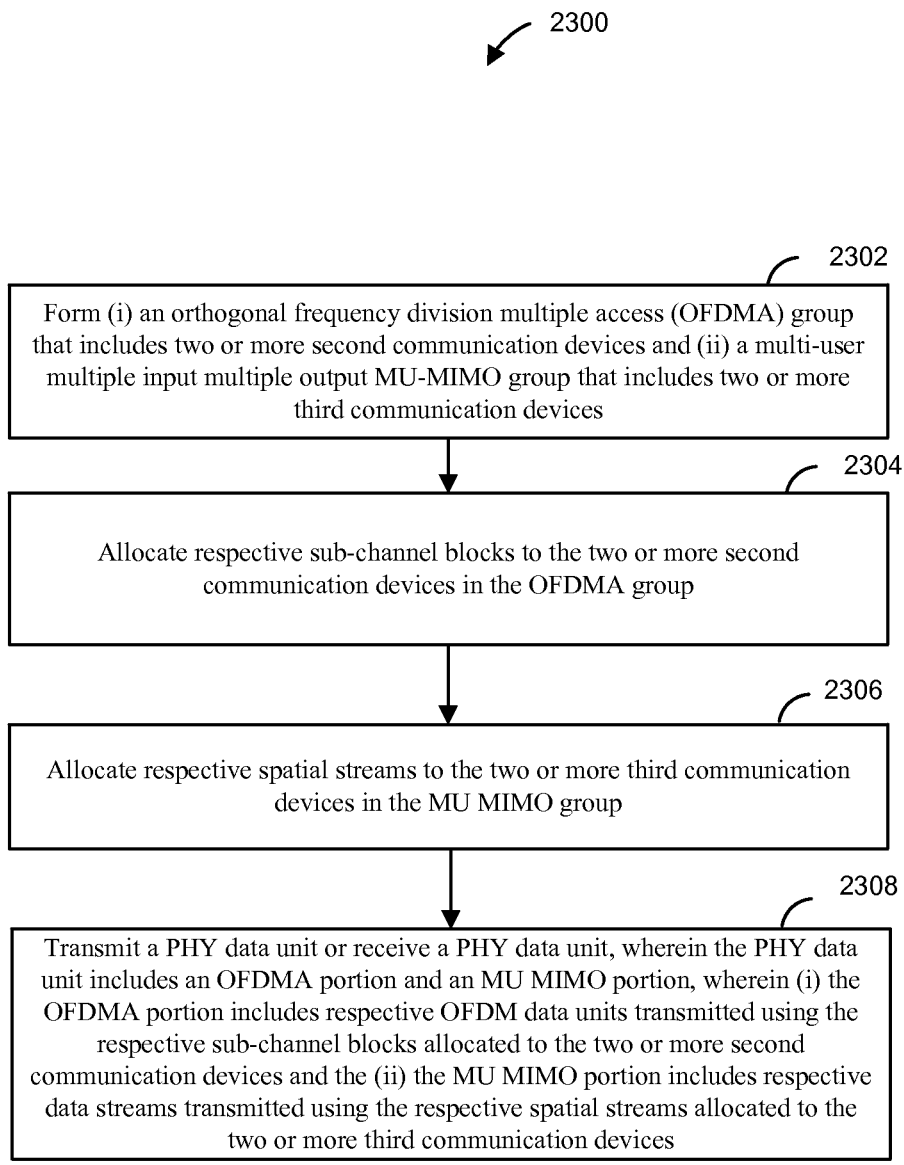
FIG. 23 is a flow diagram of another example method for simultaneous communication by multiple communication devices in a wireless local area network, according to another embodiment.

FIG. 23 is a flow diagram of an example method 2300 for simultaneous communication in a wireless local area network that includes a first communication device and a plurality of second communication devices, according to an embodiment. In an embodiment, the method 2300 is implemented by an AP in the WLAN, according to an embodiment. With reference to FIG. 1, the method 2300 is implemented by the network interface device 16 of the AP 14. For example, the method 2300 is implemented by the MAC processing unit 18 and/or by the PHY processing unit 20 of the network interface device 16, in an embodiment. In other embodiments, the method 2300 is implemented by other components of the AP 14, or is implemented by a suitable communication device other than the AP 14.

At block 2302, at a first communication device (e.g., the AP 14) an OFDMA group of that includes two or more second communication devices (e.g., client stations 25) is formed. Also at block 2302, an MU-MIMO group that includes two or more third communication devices (e.g., client stations 25) is formed.

At block 2304, at the first communication device, respective sub-channel blocks to the two or more second communication devices in the OFDMA group are allocated. At block 2306, respective spatial streams to the two or more third communication devices in the MU MIMO group are allocated.

At block 2308, a PHY data unit is transmitted to the two or more second communication devices and to the two or more third communication devices, or a PHY data unit is received from the two or more second communication devices and from the two or more third communication devices, in various embodiments. The PHY data unit includes an OFDMA portion and an MU MIMO portion, wherein (i) the OFDMA portion includes respective OFDM data units transmitted using the respective sub-channel blocks allocated to the two or more second communication devices and the (ii) the MU MIMO portion includes respective data streams transmitted using the respective spatial streams allocated to the two or more third communication devices, in an embodiment.

Further aspects of the present disclosure relate to one or more of the following clauses.

In an embodiment, a method for simultaneous communication in a wireless local area network that includes a first communication device and a plurality of second communication devices includes forming an orthogonal frequency division multiple access (OFDMA) group that includes two or more second communication devices of the plurality of second devices. The method also includes allocating, at the first communication device, respective sub-channel blocks to the two or more second communication devices, including statically allocating a respective primary sub-channel block to each of the two or more second communication devices, wherein the respective statically allocated primary sub-channel blocks remain allocated to the second communication devices for transmission of at least two PHY data units, and dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units. The method additionally includes providing, from the first communication device to the two or more second communication devices, indications of the respective sub-channel blocks allocated to the two or more second communication devices. The method further includes performing, at the first communication device, one of (i) transmitting a physical layer (PHY) data unit to the two or more second communication devices or (ii) receiving a physical layer (PHY) from the two or more second communication devices, wherein the PHY data unit includes respective orthogonal frequency division multiplexing (OFDM) data units transmitted using respective sub-channel blocks allocated to the two or more second communication devices.

In other embodiments, the method includes any suitable combination of one or more of the following features.

Providing the inactions of the sub-channel blocks allocated to a particular second communication device includes transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

The synchronization frame includes channel allocation information for only a subset of the two or more second communication devices, wherein the subset includes only one or more second communication devices for which allocated primary sub-channel blocks are within the smallest bandwidth channel of the wireless local area network.

Providing the inactions of the sub-channel blocks allocated to a particular second communication device includes transmitting the indications in one or more signal fields of a preamble of the PHY data unit transmitted to the particular second communication device.

The one or more signal fields include at least a first signal field and a second signal field.

The first signal field (i) is transmitted in each smallest bandwidth channel of the wireless local area network and (ii) includes respective indications of the primary sub-channel blocks allocated to each of the two or more second communication devices.

The second signal field (i) is transmitted in only a first smallest bandwidth channel of the wireless local area network, wherein the first smallest bandwidth channel includes the primary channel allocated to the particular second communication device and (ii) includes sub-channel allocation information for only a subset of the two or more second communication devices, wherein the subset includes only one or more second communication devices for which allocated primary sub-channel blocks are within the smallest bandwidth channel of the wireless local area network.

Providing, to the two or more second communication devices, indications of the respective sub-channel blocks allocated to the two or more second communication devices includes providing respective bitmaps corresponding to the two or more second communication devices, wherein a particular bitmap indicates a set of one or more sub-channel blocks allocated to the corresponding second communication device.

In another embodiment, an apparatus configured to operate in a wireless local area network (WLAN) includes a network interface device configured to form an orthogonal frequency division multiple access (OFDMA) group that includes two or more communication devices. The network interface is also configured to allocate respective sub-channel blocks to the two or more communication devices. Allocating the sub-channel blocks includes statically allocating a respective primary sub-channel block to each of the two or more second communication devices, wherein the respective statically allocated primary sub-channel blocks remain allocated to the second communication devices for transmission of at least two PHY data units, and dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units. The network interface device is further configure to provide, to the two or more communication devices, indications of the respective sub-channel blocks allocated to the two or more second communication devices. The network interface device is further configured to perform one of (i) transmit an OFDMA data unit to the two or more second communication devices or (ii) receive an OFDMA data unit from the two or more second communication devices, wherein the PHY data unit includes respective orthogonal frequency division multiplexing (OFDM) data units transmitted using respective sub-channel blocks allocated to the two or more second communication devices.

In other embodiments, the apparatus includes any suitable combination of one or more of the following features.

The network interface device is configured to provide, to a particular second communication device, the inactions of the sub-channel blocks allocated to the particular second communication device at least by transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

The synchronization frame includes channel allocation information for only a subset of the two or more second communication devices, wherein the subset includes only one or more second communication devices for which allocated primary sub-channel blocks are within the smallest bandwidth channel of the wireless local area network.

The network interface device is configured to provide the inactions of the sub-channel blocks allocated to a particular second communication device at least by transmitting the indications in one or more signal fields of a preamble of the OFDM data unit transmitted to the particular second communication device.

The one or more signal fields include at least a first signal field and a second signal field.

The first signal field (i) is transmitted in each smallest bandwidth channel of the wireless local area network and (ii) includes respective indications of the primary sub-channel blocks allocated to each of the two or more second communication devices.

The second signal field (i) is transmitted in only a first smallest bandwidth channel of the wireless local area network, wherein the first smallest bandwidth channel includes the primary channel allocated to the particular second communication device and (ii) includes sub-channel allocation information for only a subset of the two or more second communication devices, wherein the subset includes only one or more second communication devices for which allocated primary sub-channel blocks are within the first smallest bandwidth channel of the wireless local area network.

The network interface device is configured to provide, to the two or more second communication device, indications of the respective sub-channel blocks allocated to the two or more second communication devices at least by providing respective bitmaps corresponding to the two or more second communication devices, wherein a particular bitmap indicates a set of one or more sub-channel blocks allocated to the corresponding second communication device.

In yet another embodiment, a method for simultaneous communication by multiple communication devices in a wireless local area network includes forming, at a first communication device, (i) an orthogonal frequency division multiple access (OFDMA) group that includes two or more second communication devices and (ii) a multi-user multiple input multiple output MU-MIMO group that includes two or more third communication devices. The method also includes allocating, at the first communication device, respective sub-channel blocks to the two or more second communication devices in the OFDMA group. The method additionally includes allocating, at the first communication device, respective spatial streams to the two or more third communication devices in the MU MIMO group. The method further includes performing one of (i) transmitting a physical layer (PHY) data unit (ii) receiving a physical layer (PHY) data unit, wherein the PHY data unit includes an OFDMA portion and an MU MIMO portion, wherein (i) the OFDMA portion includes respective OFDM data units transmitted using the respective sub-channel blocks allocated to the two or more second communication devices and the (ii) the MU MIMO portion includes respective data streams transmitted using the respective spatial streams allocated to the two or more third communication devices.

In other embodiments, the method includes any suitable combination of one or more of the following features.

Allocating, at the first communication device, respective sub-channel blocks to the two or more second communication devices in the OFDMA group includes statically allocating a respective primary sub-channel block to each of the two or more second communication devices, wherein the respective statically allocated primary sub-channel blocks remain allocated to the second communication devices for transmission of at least two PHY data units, and dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units.

The method further includes, prior to transmitting the PHY data unit or receiving the PHY data unit, providing, to the two or more second communication devices, indications of the respective sub-channel blocks allocated to the two or more second devices, and providing, to the two or more third communication devices, indications of the respective spatial streams allocated to the two or more third communication devices.

Providing the inactions of the sub-channel blocks allocated to a particular second communication device includes transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

The synchronization frame includes channel allocation information for only a subset of the two or more second communication devices, wherein the subset includes only one or more second communication devices for which allocated primary sub-channel blocks are within the smallest bandwidth channel of the wireless local area network.

Providing the inactions of the sub-channel blocks allocated to a particular second communication device includes transmitting the indications in one or more signal fields of a preamble of the OFDM data unit transmitted to the particular second communication device.

The one or more signal fields include at least a first signal field and a second signal field.

The first signal field (i) is transmitted in each smallest bandwidth channel of the wireless local area network and (ii) includes respective indications of the primary sub-channel blocks allocated to each of the two or more second communication devices.

The second signal field (i) is transmitted in only a first smallest bandwidth channel of the wireless local area network, wherein the first smallest bandwidth channel includes the primary channel allocated to the particular second communication device and (ii) includes sub-channel allocation information for only a subset of the two or more second communication devices, wherein the subset includes only one or more second communication devices for which allocated primary sub-channel blocks are within the smallest bandwidth channel of the wireless local area network.

In still another embodiment, a first communication device configured to operate in a wireless local area network (WLAN) comprises a network interface device configured to form (i) an orthogonal frequency division multiple access (OFDMA) group that includes two or more second communication devices and (ii) a multi-user multiple input multiple output MU-MIMO group that includes two or more third communication devices. The network interface device is further configured to allocate respective sub-channel blocks to the two or more second communication devices in the OFDMA group and allocate respective spatial streams to the two or more third communication devices in the MU MIMO group. The network interface device is additionally configured to perform one of (i) transmitting a physical layer (PHY) data unit and (ii) receiving a physical layer (PHY) data unit, wherein the PHY data unit includes an OFDMA portion and an MU MIMO portion, wherein (i) the OFDMA portion includes respective OFDM data units transmitted using the respective sub-channel blocks allocated to the two or more second communication devices and the (ii) the MU MIMO portion includes respective data streams transmitted using the respective spatial streams allocated to the two or more third communication devices.

In other embodiments, the first communication device includes any suitable combination of one or more of the following features.

The network interface device is configured to statically allocate a respective primary sub-channel block to each of the two or more second communication devices, wherein each respective primary sub-channel block remains allocated to the second communication device for transmission of at least two PHY data units and dynamically allocate at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units.

The network interface device is further configured to, prior to transmitting the PHY data unit or receiving the PHY data unit, provide, to the two or more second communication devices, indications of the respective sub-channel blocks allocated to the two or more second devices, and provide, to the two or more third communication devices, indications of the respective spatial streams allocated to the two or more third communication devices.

The network interface device is configured to provide the inactions of the sub-channel blocks allocated to a particular second communication device at least by transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

The synchronization frame includes channel allocation information for only a subset of the two or more second communication devices, wherein the subset includes only one or more second communication devices for which allocated primary sub-channel blocks are within the smallest bandwidth channel of the wireless local area network.

The network interface device is configured to provide the inactions of the sub-channel blocks allocated to a particular second communication device at least by including the indications in one or more signal fields of a preamble of the OFDM data unit transmitted to the particular second communication device.

The one or more signal fields include at least a first signal field and a second signal field.

The first signal field (i) is transmitted in each smallest bandwidth channel of the wireless local area network and (ii) includes respective indications of the primary sub-channel blocks allocated to each of the two or more second communication devices.

The second signal field (i) is transmitted in only a first smallest bandwidth channel of the wireless local area network, wherein the first smallest bandwidth channel includes the primary channel allocated to the particular second communication device and (ii) includes sub-channel allocation information for only a subset of the two or more second communication devices, wherein the subset includes only one or more second communication devices for which allocated primary sub-channel blocks are within the smallest bandwidth channel of the wireless local area network.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneous communication in a wireless local area network that includes a first communication device and a plurality of second communication devices, the method comprising:
forming an orthogonal frequency division multiple access (OFDMA) group that includes two or more second communication devices of the plurality of second devices;
allocating, at the first communication device, respective sub-channel blocks to the two or more second communication devices, including
statically allocating a respective primary sub-channel block to each of the two or more second communication devices, wherein the respective statically allocated primary sub-channel blocks remain allocated to the second communication devices for transmission of at least two PHY data units, and
dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units;
providing, from the first communication device to the two or more second communication devices, indications of the respective sub-channel blocks allocated to the two or more second communication devices; and
performing, at the first communication device, one of (i) transmitting a physical layer (PHY) data unit to the two or more second communication devices or (ii) receiving a physical layer (PHY) from the two or more second communication devices, wherein the PHY data unit includes respective orthogonal frequency division multiplexing (OFDM) data units transmitted using respective sub-channel blocks allocated to the two or more second communication devices.

2. The method of claim 1, wherein providing the inactions of the sub-channel blocks allocated to a particular second communication device includes transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

3. The method of claim 2, wherein the synchronization frame includes channel allocation information for only a subset of the two or more second communication devices, wherein the subset includes only one or more second communication devices for which allocated primary sub-channel blocks are within the smallest bandwidth channel of the wireless local area network.

4. The method of claim 1, wherein providing the inactions of the sub-channel blocks allocated to a particular second communication device includes transmitting the indications in one or more signal fields of a preamble of the PHY data unit transmitted to the particular second communication device.

5. The method of claim 4, wherein the one or more signal fields include at least a first signal field and a second signal field, wherein
the first signal field
(i) is transmitted in each smallest bandwidth channel of the wireless local area network and
(ii) includes respective indications of the primary sub-channel blocks allocated to each of the two or more second communication devices, and the second signal field
(i) is transmitted in only a first smallest bandwidth channel of the wireless local area network, wherein the first smallest bandwidth channel includes the primary channel allocated to the particular second communication device and
(ii) includes sub-channel allocation information for only a subset of the two or more second communication devices, wherein the subset includes only one or more second communication devices for which allocated primary sub-channel blocks are within the smallest bandwidth channel of the wireless local area network.

6. The method of claim 1, wherein providing, to the two or more second communication devices, indications of the respective sub-channel blocks allocated to the two or more second communication devices includes providing respective bitmaps corresponding to the two or more second communication devices, wherein a particular bitmap indicates a set of one or more sub-channel blocks allocated to the corresponding second communication device.

7. An apparatus configured to operate in a wireless local area network (WLAN), the apparatus comprising:
a network interface device configured to
form an orthogonal frequency division multiple access (OFDMA) group that includes two or more communication devices;
allocate respective sub-channel blocks to the two or more communication devices, wherein allocating the sub-channel blocks includes
statically allocating a respective primary sub-channel block to each of the two or more second communication devices, wherein the respective statically allocated primary sub-channel blocks remain allocated to the second communication devices for transmission of at least two PHY data units, and
dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units;
provide, to the two or more communication devices, indications of the respective sub-channel blocks allocated to the two or more second communication devices; and
perform one of (i) transmit an OFDMA data unit to the two or more second communication devices or (ii) receive an OFDMA data unit from the two or more second communication devices, wherein the PHY data unit includes respective orthogonal frequency division multiplexing (OFDM) data units transmitted using respective sub-channel blocks allocated to the two or more second communication devices.

8. The apparatus of claim 7, wherein the network interface device is configured to provide, to a particular second communication device, the inactions of the sub-channel blocks allocated to the particular second communication device at least by transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

9. The apparatus of claim 8, wherein the synchronization frame includes channel allocation information for only a subset of the two or more second communication devices, wherein the subset includes only one or more second communication devices for which allocated primary sub-channel blocks are within the smallest bandwidth channel of the wireless local area network.

10. The apparatus of claim 7, the network interface device is configured to provide the inactions of the sub-channel blocks allocated to a particular second communication device at least by transmitting the indications in one or more signal fields of a preamble of the OFDM data unit transmitted to the particular second communication device.

11. The apparatus of claim 10, wherein the one or more signal fields include at least a first signal field and a second signal field, wherein the first signal field
 (i) is transmitted in each smallest bandwidth channel of the wireless local area network and
 (ii) includes respective indications of the primary sub-channel blocks allocated to each of the two or more second communication devices, and the second signal field
 (i) is transmitted in only a first smallest bandwidth channel of the wireless local area network, wherein the first smallest bandwidth channel includes the primary channel allocated to the particular second communication device and
 (ii) includes sub-channel allocation information for only a subset of the two or more second communication devices, wherein the subset includes only one or more second communication devices for which allocated primary sub-channel blocks are within the first smallest bandwidth channel of the wireless local area network.

12. The apparatus of claim 7, wherein the network interface device is configured to provide, to the two or more second communication device, indications of the respective sub-channel blocks allocated to the two or more second communication devices at least by providing respective bitmaps corresponding to the two or more second communication devices, wherein a particular bitmap indicates a set of one or more sub-channel blocks allocated to the corresponding second communication device.

13. A method for simultaneous communication by multiple communication devices in a wireless local area network, the method comprising:

forming, at a first communication device, (i) an orthogonal frequency division multiple access (OFDMA) group that includes two or more second communication devices and (ii) a multi-user multiple input multiple output MU-MIMO group that includes two or more third communication devices;

allocating, at the first communication device, respective sub-channel blocks to the two or more second communication devices in the OFDMA group;

allocating, at the first communication device, respective spatial streams to the two or more third communication devices in the MU MIMO group; and performing one of (i) transmitting a physical layer (PHY) data unit (ii) receiving a physical layer (PHY) data unit, wherein the PHY data unit includes an OFDMA portion and an MU MIMO portion, wherein (i) the OFDMA portion includes respective OFDM data units transmitted using the respective sub-channel blocks allocated to the two or more second communication devices and the (ii) the MU MIMO portion includes respective data streams transmitted using the respective spatial streams allocated to the two or more third communication devices.

14. The method of claim 13, wherein allocating, at the first communication device, respective sub-channel blocks to the two or more second communication devices in the OFDMA group includes statically allocating a respective primary sub-channel block to each of the two or more second communication devices, wherein the respective statically allocated primary sub-channel blocks remain allocated to the second communication devices for transmission of at least two PHY data units, and dynamically allocating at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units.

15. The method of claim 14, further comprising, prior to transmitting the PHY data unit or receiving the PHY data unit, providing, to the two or more second communication devices, indications of the respective sub-channel blocks allocated to the two or more second devices, and providing, to the two or more third communication devices, indications of the respective spatial streams allocated to the two or more third communication devices.

16. The method of claim 15, wherein providing the inactions of the sub-channel blocks allocated to a particular second communication device includes transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

17. The method of claim 16, wherein the synchronization frame includes channel allocation information for only a subset of the two or more second communication devices, wherein the subset includes only one or more second communication devices for which allocated primary sub-channel blocks are within the smallest bandwidth channel of the wireless local area network.

18. The method of claim 15, wherein providing the inactions of the sub-channel blocks allocated to a particular second communication device includes transmitting the indications in one or more signal fields of a preamble of the OFDM data unit transmitted to the particular second communication device.

19. The method of claim 18, wherein the one or more signal fields include at least a first signal field and a second signal field, wherein the first signal field
 (i) is transmitted in each smallest bandwidth channel of the wireless local area network and (ii) includes respective indications of the primary sub-channel blocks allocated to each of the two or more second communication devices, and the second signal field
(i) is transmitted in only a first smallest bandwidth channel of the wireless local area network, wherein the first smallest bandwidth channel includes the primary channel allocated to the particular second communication device and
(ii) includes sub-channel allocation information for only a subset of the two or more second communication devices, wherein the subset includes only one or more second communication devices for which allocated primary sub-channel blocks are within the smallest bandwidth channel of the wireless local area network.

20. A first communication device configured to operate in a wireless local area network (WLAN), the first communication device comprising:
a network interface device configured to
form (i) an orthogonal frequency division multiple access (OFDMA) group that includes two or more second communication devices and (ii) a multi-user multiple input multiple output MU-MIMO group that includes two or more third communication devices;
allocate respective sub-channel blocks to the two or more second communication devices in the OFDMA group;
allocate respective spatial streams to the two or more third communication devices in the MU MIMO group; and
perform one of (i) transmitting a physical layer (PHY) data unit and (ii) receiving a physical layer (PHY) data unit, wherein the PHY data unit includes an OFDMA portion and an MU MIMO portion, wherein (i) the OFDMA portion includes respective OFDM data units transmitted using the respective sub-channel blocks allocated to the two or more second communication devices and the (ii) the MU MIMO portion includes respective data streams transmitted using the respective spatial streams allocated to the two or more third communication devices.

21. The first communication device of claim 20, wherein the network interface device is configured to
statically allocate a respective primary sub-channel block to each of the two or more second communication devices, wherein each respective primary sub-channel block remains allocated to the second communication device for transmission of at least two PHY data units and
dynamically allocate at least some of remaining sub-channel blocks, that are not allocated as primary sub-channel blocks to the two or more second communication devices, among the two or more second communication devices, wherein the at least some of the remaining sub-channel blocks are dynamically allocated for transmission of each of the at least two PHY data units.

22. The first communication device of claim 21, wherein the network interface device is further configured to, prior to transmitting the PHY data unit or receiving the PHY data unit,
provide, to the two or more second communication devices, indications of the respective sub-channel blocks allocated to the two or more second devices, and
provide, to the two or more third communication devices, indications of the respective spatial streams allocated to the two or more third communication devices.

23. The first communication device of claim 21, wherein the network interface device is configured to provide the inactions of the sub-channel blocks allocated to a particular second communication device at least by transmitting a synchronization frame to the particular second communication device, wherein the synchronization frame is transmitted in a smallest bandwidth channel of the wireless local area network, wherein the smallest bandwidth channel includes the primary channel allocated to the particular second communication device.

24. The first communication device of claim 21, wherein the synchronization frame includes channel allocation information for only a subset of the two or more second communication devices, wherein the subset includes only one or more second communication devices for which allocated primary sub-channel blocks are within the smallest bandwidth channel of the wireless local area network.

25. The first communication device of claim 22, wherein the network interface device is configured to provide the inactions of the sub-channel blocks allocated to a particular second communication device at least by including the indications in one or more signal fields of a preamble of the OFDM data unit transmitted to the particular second communication device.

26. The first communication device of claim 21, wherein the one or more signal fields include at least a first signal field and a second signal field, wherein
the first signal field
(i) is transmitted in each smallest bandwidth channel of the wireless local area network and
(ii) includes respective indications of the primary sub-channel blocks allocated to each of the two or more second communication devices, and
the second signal field
(i) is transmitted in only a first smallest bandwidth channel of the wireless local area network, wherein the first smallest bandwidth channel includes the primary channel allocated to the particular second communication device and
(ii) includes sub-channel allocation information for only a subset of the two or more second communication devices, wherein the subset includes only one or more second communication devices for which allocated primary sub-channel blocks are within the smallest bandwidth channel of the wireless local area network.

* * * * *